United States Patent
Choi et al.

(10) Patent No.: US 10,314,106 B2
(45) Date of Patent: Jun. 4, 2019

(54) METHOD AND APPARATUS FOR CHANNEL ACCESS IN WIRELESS COMMUNICATION SYSTEM USING UNLICENSED SPECTRUM

(71) Applicant: Samsung Electronics Co., Ltd., Suwon-si, Gyeonggi-do (KR)

(72) Inventors: Seunghoon Choi, Seongnam-si (KR); Jinyoung Oh, Seoul (KR); Donghan Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/031,500

(22) Filed: Jul. 10, 2018

(65) Prior Publication Data
US 2018/0324893 A1 Nov. 8, 2018

Related U.S. Application Data

(63) Continuation of application No. 15/233,215, filed on Aug. 10, 2016.
(Continued)

(51) Int. Cl.
*H04W 76/28* (2018.01)
*H04L 5/00* (2006.01)
(Continued)

(52) U.S. Cl.
CPC ............. *H04W 76/28* (2018.02); *H04L 1/00* (2013.01); *H04L 5/0053* (2013.01);
(Continued)

(58) Field of Classification Search
CPC ... H04W 16/14; H04W 24/10; H04W 72/085; H04W 84/18; H04W 24/00;
(Continued)

(56) References Cited

U.S. PATENT DOCUMENTS

| | | | |
|---|---|---|---|
| 2008/0167089 A1* | 7/2008 | Suzuki | H04L 1/1829 455/574 |
| 2008/0181159 A1 | 7/2008 | Metzler et al. | |

(Continued)

FOREIGN PATENT DOCUMENTS

| | | |
|---|---|---|
| EP | 2757850 A1 | 7/2014 |
| EP | 3 297 192 A1 | 3/2018 |

(Continued)

OTHER PUBLICATIONS

Samsung, Further Discussion on LBT for LAA DL Transmission, R1-152874, 3GPP TSG RAN WG1 Meeting #81, May 15, 2015, Fukuoka, Japan.
(Continued)

*Primary Examiner* — Fred A Casca
(74) *Attorney, Agent, or Firm* — Jefferson IP Law, LLP

(57) ABSTRACT

A method and an apparatus for channel access in a wireless communication system related to a 5th generation (5G) or pre-5G communication system for supporting a data rate higher than that of the 4G communication system such as long term evolution (LTE) are disclosed. The method includes receiving a feedback corresponding to data transmitted in a first subframe arriving after a first sensing period in an unlicensed band from at least one terminal, checking data reception state of the at least one terminal as one of acknowledgement (ACK), negative acknowledgement (NACK), and discontinuous transmission (DTX) based on the feedback, and determining a length of a second sensing period based on the data reception state of the at least one terminal.

12 Claims, 13 Drawing Sheets

Related U.S. Application Data

(60) Provisional application No. 62/204,694, filed on Aug. 13, 2015, provisional application No. 62/240,270, filed on Oct. 12, 2015.

(51) Int. Cl.
*H04L 1/00* (2006.01)
*H04W 74/08* (2009.01)
*H04L 27/00* (2006.01)
*H04W 16/14* (2009.01)

(52) U.S. Cl.
CPC ........ *H04L 5/0055* (2013.01); *H04L 27/0006* (2013.01); *H04W 74/0808* (2013.01); *H04W 16/14* (2013.01)

(58) Field of Classification Search
CPC ......... H04W 28/0231; H04W 28/0252; H04W 36/06; H04W 88/04; H04W 76/048
USPC ...... 455/509, 454, 11.1, 101, 434, 501, 507; 370/329, 252, 328, 341
See application file for complete search history.

(56) References Cited

U.S. PATENT DOCUMENTS

| | | |
|---|---|---|
| 2011/0199985 A1 | 8/2011 | Cai et al. |
| 2014/0198663 A1 | 7/2014 | Xu et al. |
| 2015/0085777 A1 | 3/2015 | Seok |
| 2015/0098397 A1 | 4/2015 | Damnjanovic et al. |
| 2015/0334592 A1 | 11/2015 | Choi et al. |
| 2016/0119384 A1 | 4/2016 | Karimli et al. |
| 2016/0127104 A1* | 5/2016 | Levy ..................... H04L 5/0055 455/422.1 |
| 2017/0055296 A1* | 2/2017 | Cheng ............... H04W 74/0841 |

FOREIGN PATENT DOCUMENTS

| | | |
|---|---|---|
| WO | 2013-157787 A1 | 10/2013 |
| WO | 2017/004256 A1 | 1/2017 |

OTHER PUBLICATIONS

Samsung, Discussion on UL Transmission for LAA, R1-152872, 3GPP TSG RAN WG1 Meeting #81, May 16, 2015, Fukuoka, Japan.

LG Electronics: "DL LBT operation with variable contention window size", 3GPP Draft; R1-15273, May 24, 2015, XP050972716, Retrieved from the Internet: URL:http://www.3gpp.org/ftp/Meetings_3GPP SYNC/RAN1 /Docs/.

CATT: "Design of LBT Category 4", 3GPP Draft; R1-152577, May 24, 2015, XP050972241, Retrieved from the Internet: URL:http://www.3gpp.org/ftp/Meetings_3GPP SYNC/RAN1/Docs/.

Alcatel-Lucent Shanghai Bell et al: "LBT and Frame Structure Design for DL-Only LAA", 3GPP Draft; R1-153385, May 24, 2015, XP050976634, Retrieved from the Internet: URL:http://www.3gpp.org/ftp/Meetings_3GPPSYNC/RAN1 /Docs/.

Samsung: "Discussion on LBT for LAA UL", 3GPP Draft; R1-151 049,Mar. 18, 2015, XP050951413, Retrieved from the Internet: URL:http://www.3gpp.org/ftp/tsg_ran/WG1_RL 1/TSGR1_AH/LTE_ LAA_ 1503/Docs/.

European Search Report dated Jun. 25, 2018, issued in European Application No. 16835450.4.

* cited by examiner

METHOD AND APPARATUS FOR CHANNEL ACCESS IN WIRELESS COMMUNICATION SYSTEM USING UNLICENSED SPECTRUM

CROSS-REFERENCE TO RELATED APPLICATION(S)

This application is a continuation application of prior application Ser. No. 15/233,215, filed on Aug. 10, 2016, which claimed priority under 35 U.S.C. § 119(e) of a U.S. Provisional application No. 62/204,694, filed on Aug. 13, 2015, in the U.S. Patent and Trademark Office and U.S. Provisional application No. 62/240,270, filed on Oct. 12, 2015, in the U.S. Patent and Trademark Office, the entire disclosure of each of which is hereby incorporated by reference herein in its entirety.

TECHNICAL FIELD

The present disclosure relates to a channel access method and apparatus for sensing and occupying an unlicensed band channel in a mobile communication system operating in an unlicensed band.

BACKGROUND

In order to meet the increasing wireless data traffic demand since the commercialization of 4th generation (4G) communication systems, the development focus is on the $5^{th}$ generation (5G) or pre-5G communication system. For this reason, the 5G or pre-5G communication system is called beyond 4G network communication system or post long term evolution (LTE) system.

In order to accomplish high data rates, consideration is being given to implementing the 5G communication system on the millimeter Wave (mm Wave) band (e.g., 60 GHz band). In order to mitigate propagation loss and increase propagation distance, the 5G communication system is likely to accommodate various techniques such as beamforming, massive multiple input multiple output (MIMO), full dimensional MIMO (FD-MIMO), array antenna, analog beamforming, and large scale antenna.

Also, for throughput enhancement of the 5G communication system, research is being conducted on various techniques such as small cell, advanced small cell, cloud radio access network (cloud RAN), ultra-dense network, device to device (D2D) Communication, wireless backhaul, moving network, cooperative communication, coordinated multipoints (CoMP), and interference cancellation.

Furthermore, the ongoing research includes the use of hybrid frequency shift keying (FSK) and quadrature amplitude modulation (QAM) modulation and sliding window superposition coding (SWSC) as advanced coding modulation (ACM), filter bank multi carrier (FBMC), non-orthogonal multiple access (NOMA), and sparse code multiple access (SCMA). Meanwhile, there is a need of a method for configuring a contention window (CW) for channel sensing to use an unlicensed band.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for occupying a channel in the unlicensed band.

In accordance with an aspect of the present disclosure, a method of a base station is provided for use in a wireless communication system. The method includes receiving a feedback corresponding to data transmitted in a first subframe arriving after a first sensing period in an unlicensed band from at least one terminal, checking data reception state of the at least one terminal as one of acknowledgement (ACK), negative acknowledgement (NACK), and discontinuous transmission (DTX) based on the feedback, and determining a length of a second sensing period based on the data reception state of the at least one terminal.

In accordance with another aspect of the present disclosure, a base station of a wireless communication system is provided. The base station includes a transceiver for transmitting/receiving signals and at least one processor configured to control for receiving, by the transceiver, feedback corresponding to data transmitted in a first subframe arriving after a first sensing period in an unlicensed band from at least one terminal, checking data reception state of the at least one terminal as one of ACK, NACK, and DTX based on the feedback, and determining a length of a second sensing period based on the data reception state of the at least one terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
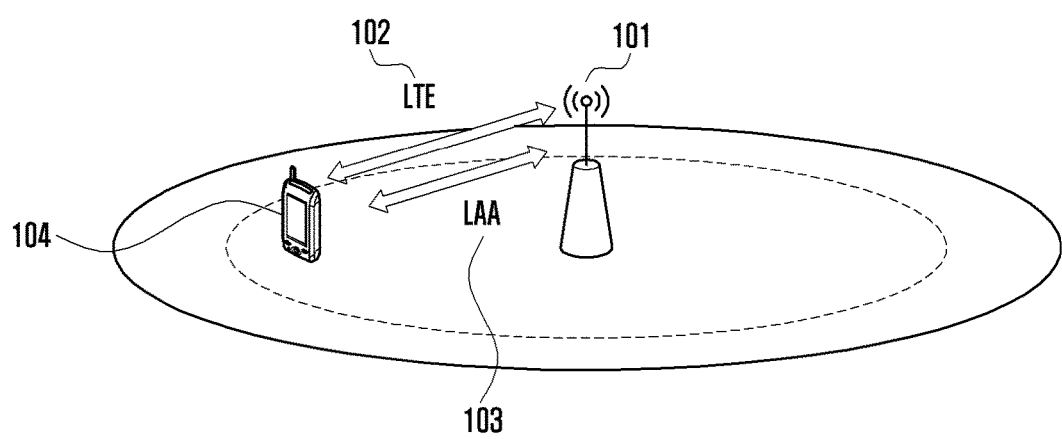
FIGS. 1A and 1B are diagram illustrating a communication system to which the present disclosure is applied according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to the long term evolution (LTE) and LTE-advanced (LTE-A) systems, the present disclosure can be applied to other communication systems operating on both the licensed and unlicensed bands with or without modification.

The mobile communication system has evolved to a high-speed, high-quality wireless packet data communication system capable of providing data and multimedia services beyond the early voice-oriented services. in order to support the high speed, high quality wireless packet data transmission service, various mobile communication standards (such as high speed downlink packet access (HSDPA), high speed uplink packet access (HSUPA), long term evolution (LTE), and LTE-A of 3rd generation partnership project (3GPP), high rate packet data (HRPD) of 3rd generation partnership project-2 (3GPP2), and 802.16 of Institute of Electrical and Electronics Engineers (IEEE)) have been developed. Particularly, the development of LTE/LTE-A (hereinafter, referred to as LTE) continues at a considerable pace to improve system throughput and frequency efficiency. The LTE system is capable of increasing data rate and system throughput with carrier aggregation (CA) which makes it possible to use multiple frequency bands. Typically, a current LTE system operates in a licensed band (licensed spectrum or licensed carrier) of which usage right belongs to the network operator. In the case of the frequency bands (e.g. frequency bands below 5 GHz), it has already been occupied by other operators or other communication systems, it is difficult for an operator to secure multiple licensed frequency bands and this makes it difficult to extend the system throughput with the CA technology. In this respect, recent researches are conducted on the technologies of using unlicensed band (unlicensed spectrum or unlicensed carrier) to process the significantly increasing mobile data in the licensed frequency spectrum shortage environment (e.g. LTE in unlicensed (LTE-U) and licensed assisted access (LAA)). Particularly, since the 5 GHz band is an unlicensed band in which relatively small number of communication devices operate in comparison to another unlicensed band of 2.4 GHz and has very broad bandwidth, it is relatively easy to secure additional frequency band. That is, the LTE technology for aggregating multiple frequency bands, i.e. the CA technology, can be used to aggregate licensed and unlicensed band frequencies. This makes it possible to configure a licensed band LTE cell as the primary cell (PCell) and an unlicensed band LTE cell (LAA cell or LTE-U cell) as a secondary cell (SCell) such that the LTE system operates in both the licensed and unlicensed band using the legacy CA technology. Although such a system can be applied to a dual connectivity environment in which the licensed and unlicensed band cells are connected to each other through a non-ideal backhaul as well as the CA environment in which the licensed and unlicensed band cells are connected to each other through an ideal backhaul, the present disclosure is directed to the CA environment in which the licensed and unlicensed band cells are connected to each other through the ideal backhaul.

Typically, the LTE/LTE-A system uses orthogonal frequency division multiple access (OFDM) for data transmission. In the OFDM scheme, the modulation signal is positioned in a 2-dimensional space represented by time-frequency grid. The time domain resource is divided into OFDM symbols that are orthogonal. The frequency domain resource is divided into subcarriers that are orthogonal. Accordingly, in the OFDM scheme, it is possible to indicate a smallest unit resource by indicating an OFDM symbol on the time axis and a subcarrier on the frequency axis, and the smallest resource unit is referred to as resource element (RE). Since the REs are orthogonal even after the signal has passed a frequency selective channel, the signals transmitted through different REs can be received by a receiver without causing interference with each other. In the OFDM communication system, a downlink (DL) bandwidth is comprised of a plurality of resource blocks (RBs), and each physical resource block (PRB) consists of 12 consecutive subcarriers on the frequency axis and 14 or 12 consecutive OFDM symbols on the time axis. Here, the PRB is a basic unit of resource allocation The reference signal (RS) is the signal transmitted by the eNB in order for the user equipment (UE) to estimate channels, and the LTE system has common reference signal (CRS) and demodulation reference signal (DMRS) as a dedicated reference signal. The CRS is the reference signal transmitted across the whole DL band such that all UEs can receive for use in configuring feedback information or demodulating the control and data channels. The DMRS is also the reference signal transmitted across the whole DL band such that a specific UE can receive for use in data channel demodulation and channel estimation but not for use in configuring feedback information. Accordingly, the DMRS is transmitted on the PRB in which the UE is scheduled.

In the time domain, a subframe consists of two slots, i.e. first and second slots, of which each spans 0.5 ms. The physical downlink control channel (PDCCH) is transmitted in a control channel region, and the enhanced PDCCH (ePDCCH) is transmitted in a data channel region, the two regions being separated on the time axis. This aims to receive and modulate the control channel signal quickly. The PDCCH regions are spread across the whole bandwidth of the downlink (DL) band in such a way that a control channel is divided into small controls channels which are distributed across the whole bandwidth of the DL band. The uplink (UL) is divided into a control channel (PUCCH) and a data channel (PUSCH), and the acknowledgement (ACK) channel corresponding to the DL link data channel and other feedback information are transmitted through the control channel if there is no data channel and, otherwise if there is a data channel, through the data channel.

Figure 1B:
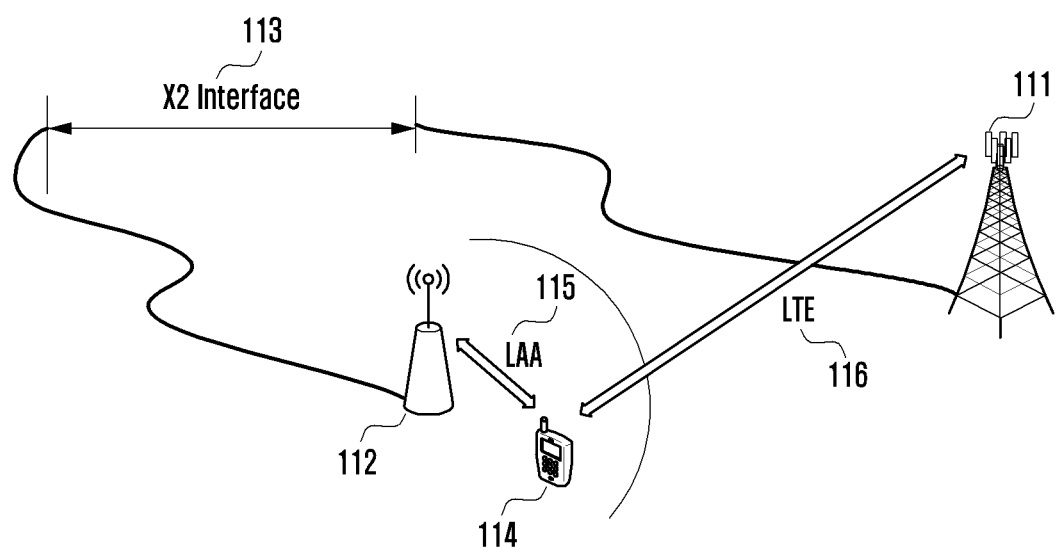

FIGS. 1A and 1B are diagrams illustrating communication systems to which the present disclosure is applied according to various embodiments of the present disclosure.

Referring to FIGS. 1A and 1B, FIG. 1A is directed to a case where an LTE cell 102 and a license assisted access (LAA) cell 103 coexist in the coverage of a small eNB 101 in a network and the UE 104 (or UE 114 in FIG. 1B) communicates data with the eNB through the LTE cell 102 and the LAA cell 103. In this case, the LTE cell 102 and LAA cell 103 are not limited to any duplex mode, and it may be assumed that the LTE cell 102 as the PCell performs data communication through the licensed band and the LAA cell 130 as the SCell performs data communication through the unlicensed band. However, if the LTE cell is the PCell, uplink (UL) data transmission is permitted only through the LTE cell 102.

FIG. 1B is directed to a case where an LTE macro eNB 111 for securing a large coverage and a small eNB 112 for increasing data transmission amount are installed and, in this case, the LTE cell 116 and LAA cell 115 are not limited to any duplex mode. At this time, the LTE macro eNB or LTE eNB 111 may be replaced by an LTE small eNB. If the LTE eNB has the PCell, it may be configured that the uplink (UL) transmission is performed only through the LTE eNB 111. At this time, it is assumed that the LTE eNB 111 and LAA eNB 112 are connected through an ideal backhaul network. Accordingly, the X2 interface 113 allows for fast communication between the eNBs and, although UL transmission is available to only the LTE eNB 111, it is possible for the LAA eNB 112 to receive the relevant control information from the LTE eNB 111 through the X2 interface 113 in real time. The methods proposed in the present disclosure can be applied to both the systems configured as shown in FIGS. 1A and 1B.

Typically, an unlicensed frequency band or channel is shared by a plurality of devices. At this time, the devices using the unlicensed band may be different system devices. In order for the various devices to operate in the unlicensed band, they follow normal operations as follows.

A transmitting device which wants to transmit a signal including data or control information checks whether the unlicensed band or channel is occupied by other devices before attempting to transmit the signal and may occupy the channel or not depending on the channel occupancy state. Such an operation is referred to as listen-before-talk (LBT). That is, the transmitting device has to check whether the corresponding channel is preoccupied according to a predetermined or preconfigured method. The channel sensing method may be predefined or preconfigured. The channel sensing time period may be predefined, preconfigured, or set to a value selected in a predetermined range. The channel sensing time period may be configured in proportion to a predetermined maximum channel occupancy time. At this time, the channel sensing operation for checking whether the channel can be occupied may be configured differently depending on the unlicensed band frequency, area, and country regulation. For example, it is allowed to use the 5 GHz frequency band without any channel sensing operation with the exception of the radar detection operation in the US.

A transmitting device which wants to use the unlicensed band senses the corresponding channel through a channel sensing operation (or LBT) to determine whether the channel is occupied by other devices and, if the channel is not preoccupied by any device, it occupies the channel to use. At this time, the device using unlicensed band predefines or configures the maximum channel occupancy time after the channel sensing operation. At this time, the maximum occupancy time may be predefined according to the regulation stipulated per frequency band and area or configured by another device, e.g. the eNB. At this time, the channel occupancy time may be configured differently depending on the unlicensed band, area, or country regulation. For example, the maximum occupancy time for the 5 GHz band unlicensed spectrum is 4 ms in Japan. In Europe, however, the channel can be occupied continuously up to 10 ms or 13 ms. At this time, the devices occupied the maximum occupancy time may perform the channel sensing operation again to re-occupy the channel according to the channel sensing result.

A description is made of the unlicensed band channel sensing and occupancy operation hereinafter with reference to FIG. 2.

Figure 2:
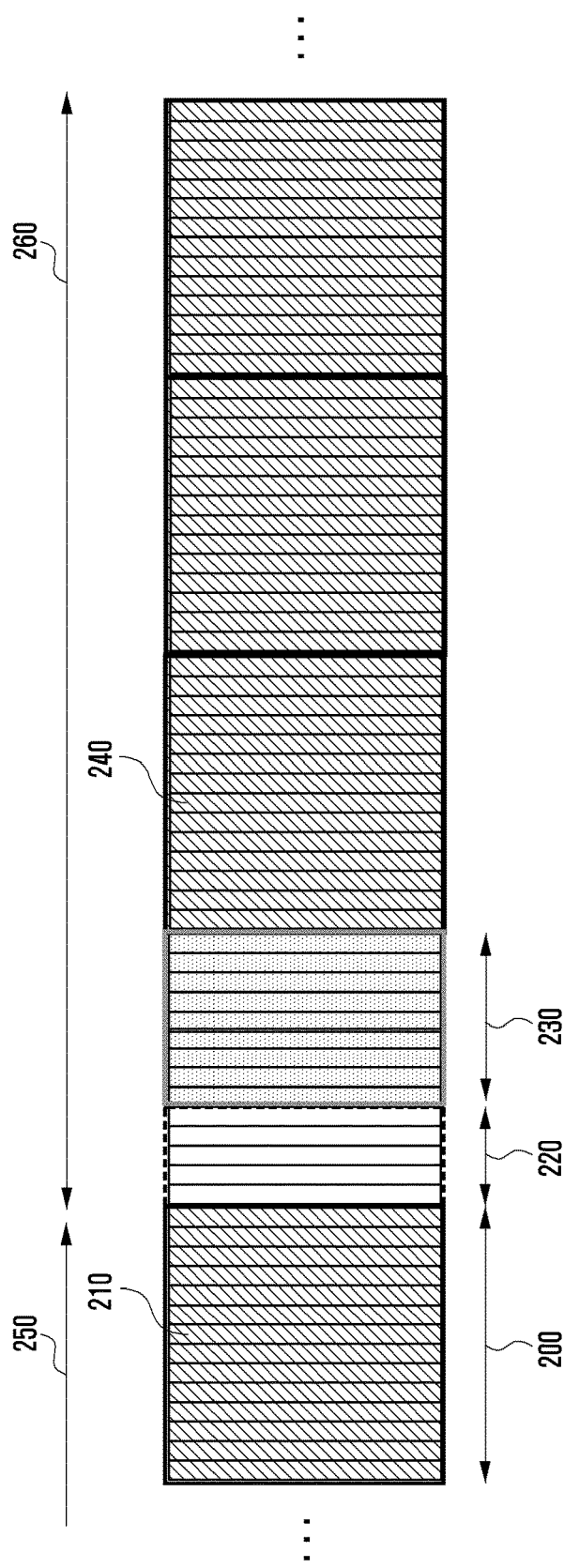
FIG. 2 is a diagram illustrating a channel occupancy operation according to a channel operation according to various embodiments of the present disclosure.

FIG. 2 is diagram illustrating DL data and control signal transmission from an eNB to an UE, and this may be applicable to UL signal transmission from the UE to the eNB according to various embodiments of the present disclosure.

Referring to FIG. 2, an LTE subframe 200 has a length of 1 ms and consists of a plurality of OFDM symbols. The eNB and UE that are capable of communicating on an unlicensed band may occupy the corresponding channel during a predetermined channel occupancy time (or transmission opportunity (TXOP)) 250 and 260 for communication. If the eNB which occupied the channel during the channel occupancy time 250 needs further channel occupancy, it performs channel occupancy operation, e g channel sensing period 220, and occupies the channel or not depending on the channel sensing operation result. At this time, the channel sensing period (or length) may be predefined or configured to the UE by the eNB through higher layer signaling, or may be configured depending on the result of data transmission/reception on the unlicensed band.

Also, at least one of the variables for performing the channel sensing operation again may be set to a value different from that of the previous channel sensing operation.

The channel sensing and occupancy operations may be configured differently depending on the frequency band, area, or country regulation. A description is made of the channel sensing and occupancy hereinafter in detail operation with an example of Load-based equipment as one of the channel access schemes in the 5 GHz band regulation EN301 893 of Europe.

If the eNB need to use the channel additionally after the maximum channel occupancy time 250, it has to determine whether the channel is occupied by other devices during the minimum channel sensing period 220. At this time, the minimum channel sensing period 220 may be determined depending on the maximum channel occupancy period as follows.

maximum channel occupancy period: $13/32 \times q$, ($q=4, \ldots, 32$)

minimum channel sensing period: ECCA slot length×rand (1, q)

Here, the ECCA slot length is a smallest channel sensing period unit (or length) predefined or configured. That is, if q=32, the transmitting device may occupy the unlicensed band during up to 13 ms. At this time, the minimum required channel sensing period is selected randomly in the range of 1~q (i.e., 1~32), and the total channel sensing period becomes ECCA slot length x selected random value. Accordingly, if the maximum channel occupancy period increases, the minimum channel sensing period increases too. The maximum channel occupancy period and minimum channel sensing period are just examples and may be configured differently depending on the frequency band, area, and country regulation, and changed according to the revision of the frequency regulation in the future. Also, additional operations (e.g. introduction of additional channel sensing period) may be included in addition to the channel sensing operation according to the frequency regulation.

If it is determined that the unlicensed band is not occupied by other devices during the channel sensing period 220, i.e. if the channel is in the idle state, the eNB may occupy the channel immediately. At this time, whether the channel is occupied by other devices during the channel sensing period 220 may be determined based on a predefined or preconfigured reference value. For example, if the signal strength received from other devices during the channel sensing period is greater than a predetermined threshold value (e.g. −62 dBm), it may be determined that the channel is occupied by other devices. If the received signal strength is equal to or less than the threshold value, it may be determined that the channel is in the idle state. At this time, the channel occupancy determination may be performed in various ways such as detecting a predefined signal with the received signal strength as described above.

The normal LTE operation is performed in unit of subframe (e.g. signal transmission/reception starts from the first OFDM symbol of a subframe), it may fail to transmit or receive a signal transmitted at an arbitrary OFDM symbol. Accordingly, the eNB which has detected the idle channel during the channel sensing period 220 in the subframe may transmit a specific signal for channel occupancy from time when the channel sensing period 220 ends till right before the first OFDM symbol of the next subframe, i.e. the duration 230. That is, the eNB may transmit the second signal (e.g. primary synchronization signal(s) (PSS)/secondary synchronization signal(s) (SSS)/cell-specific reference signal(s) CRS and newly defined signal) for the unlicensed band channel occupancy and UE synchronization before transmitting the first signal (e.g. legacy enhanced physical downlink control channel (EPDCCH) and physical downlink shared channel (PDSCH)) in the subframe 210 or 240. At this time, at least one of the second signals may not be transmitted depending on the channel sensing period end time. If the corresponding channel occupancy start time is set before a specific OFDM symbol, it is possible to transmit the second signal or the first signal after transmitting the third signal (newly defined signal), before the start of the next OFDM symbol. Although the channel sensing operation period is described using the unit of OFDM symbol for explanation convenience in the present disclosure, the channel sensing operation period may be configured regardless of the OFDM symbol of the LTE system.

Here, the second signal may be generated by reusing the PSS/SSS used in the legacy LTE system or at least one of the PSS and SSS generated with a sequence different from the root sequence used in the licensed band. The second signal may also be generated with a sequence with the exception of the PSS/SSS sequence necessary for generating unlicensed band eNB identifier (physical cell identifier (PCID)) so as not to be confused with the unique value of the eNB. The second signal may also include at least one of the CRS and channel state information reference signal (CSI-RS) used in the legacy LTE system or a (E)PDCCH or PDCCH or signal modified therefrom.

At this time, since the second signal transmission duration 230 is included in the channel occupancy time, the frequency utilization efficiency can be maximized by delivering the least information in the second signal transmitted in the duration 230.

The LTE system operating in an unlicensed band (LAA or LAA cell) has to use a new type of channel access scheme LBT different from the legacy licensed band channel access scheme to share the unlicensed band with other systems (e.g. Wi-Fi) as well as to meet the regulation requirement for use of the unlicensed band. A brief description is made of the channel access scheme of a Wi-Fi system for use of the unlicensed band hereinafter using FIG. 3.

Figure 3:
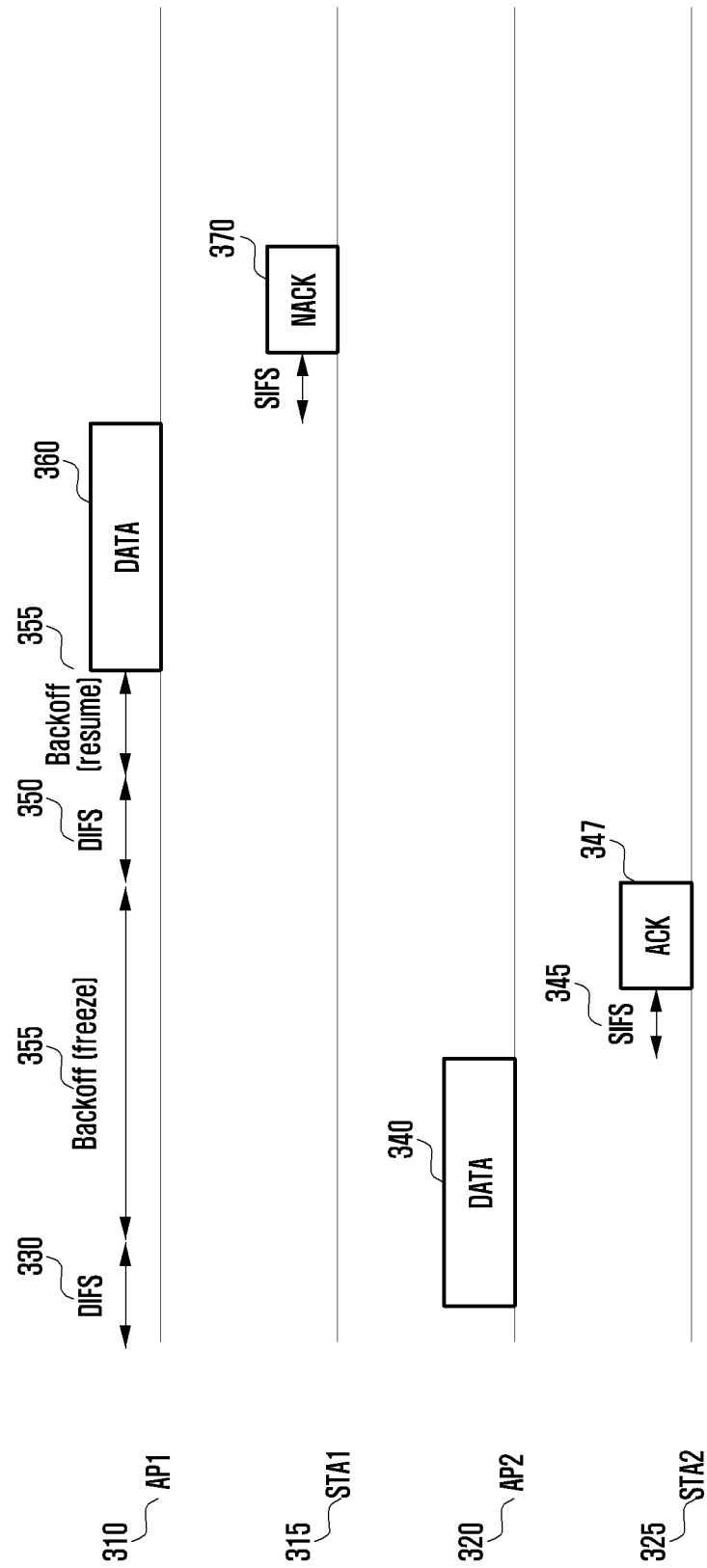
FIG. 3 is a diagram illustrating an unlicensed band channel access scheme of a wireless fidelity (Wi-Fi) system according to various embodiments of the present disclosure.

FIG. 3 is a diagram illustrating an unlicensed band channel access scheme of a wireless fidelity (Wi-Fi) system according to various embodiments of the present disclosure.

Referring to FIG. 3, if a Wi-Fi application processor (AP) 310 has data to transmit to Station 1 (STA1) or UE 1 315, it performs a channel sensing operation to occupy the corresponding channel. At this time, the channel sensing operation is performed during a distributed coordination function (DCF) interframe space (DIFS) 330. Whether the channel is occupied by other devices can be determined in various ways, e.g. measurement of received signal strength and detection of a predetermined signal in the corresponding duration. If it is determined that the channel is occupied by other device 320, the AP1 310 selects a random variable 335, e.g. N, within a predetermined contention window (CW) (e.g. 1~16). Typically, this operation is referred to as backoff operation. Afterward, the AP1 310 senses the channel during a predetermined time period (e.g. 9 us) and, if it is determined that the channel is idle, decrements the random variable N 355 by 1. That is, N is updated (N=N−1). If it is determined that the channel is occupied by another device in the time period, the AP1 310 freezes the variable N 355. If the data 340 transmitted by the AP2 320 is received, the STA2 325 sends the AP2 320 an acknowledgment (ACK)/negative acknowledgement (NACK) 347 corresponding to the data 340 after short interframe space (SIFS) 345. At this time, the STA2 325 may transmit the ACK/NACK 347 without channel sensing operation. After the STA2 325 transmits ACK 347, the AP1 310 is aware that the channel is idle. If it is determined that the channel is idle during the DIFS 350, the AP1 310 performs channel sensing during the period (e.g. 9 us) predefined or preconfigured for backoff operation and, if it is determined that the channel is idle, decrements the variable N 355 again. That is, it updates N (N=N−1). At this time, if N=0, the AP1 310 occupies the channel to transmit data 360 to the STA1 315. If the data 360 is received, the STA1 transmits ACK/NACK acknowledging the receipt of the data to the AP1 310 after SIFS. If NACK is received from the STA1 315, the AP1 310 may select the variable N for use in the next backoff operation during the extended contention period. That is, assuming the previous contention period [1,16], if the NACK is received, the STA1 315 may increase the contention period to [1,32]. If ACK is received, the AP1 310 may initialize the contention period to the initial value (e.g. [1,16]) or decrease or maintain a preconfigured contention period.

In the case of a Wi-Fi system, however, one AP (or eNB) and one STA (or UE) communicate in the same period. As denoted by reference number 347 and 370, the STA (or UE) transmits the data reception result (e.g. ACK or NACK) to the AP (or eNB) immediately upon receipt of the data. At this time, the AP 310 or 320 performs the channel sensing operation for next data transmission after receiving the ACK or NACK from the terminal 315 or 325. In the case of the LAA system, however, one eNB may transmit data to multiple UEs simultaneously. If the data are received by the UEs at the same time point (e.g. time n), the UEs may transmit ACK or NACK to the eNB at the same time point (e.g. n+4 in frame structure type 1 (FDD)). Accordingly, the LAA eNB may receive the ACK/NACK transmitted by one or more UEs simultaneously unlike the Wi-Fi system. There may be at least 4 ms time difference between the ACK/NACK transmission time point of the UE and the data transmission time point of the eNB. Thus, if the LAA eNB configures (or reconfigures) the contention period based on the ACK/NACK received from the UE as in Wi-Fi, it may receive the ACK/NACK from multiple UEs at a certain time point, resulting in contention period configuration ambiguity. Also, the ACK/NACK transmission delay of the UE makes it ambiguous to determine the (re)configured contention period. The present disclosure proposes a method for an LAA eNB to configure a contention period clearly based on the ACK/NACK information transmitted by the UEs.

Although the description is directed to the CA environment for explanation convenience, the present disclosure is not limited thereto but can be applied to the dual-connectivity or stand-alone environment of the unlicensed band operation.

Figure 4:
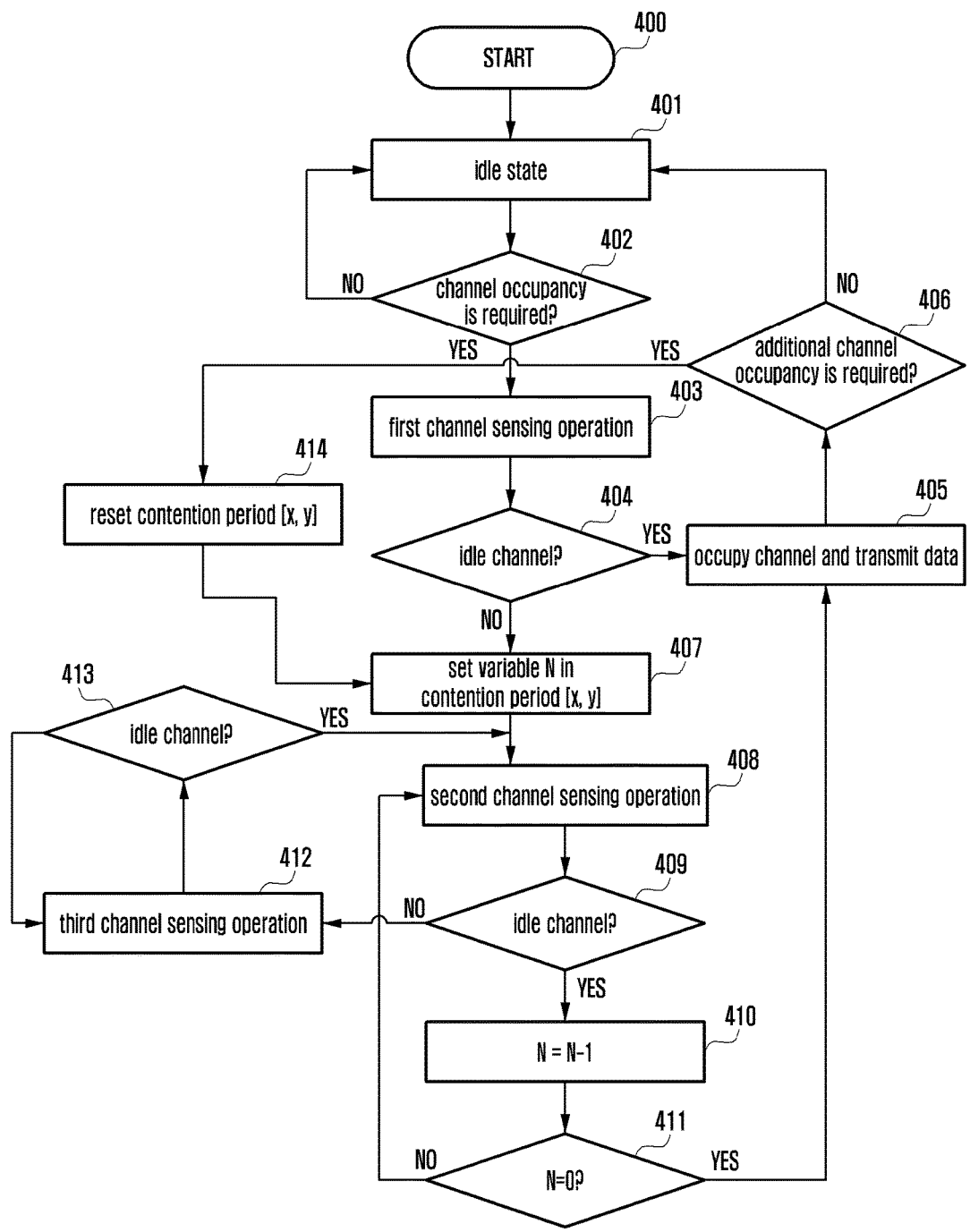
FIG. 4 is a flowchart illustrating an unlicensed channel access scheme of a licensed assisted access (LAA) system according to various embodiments of the present disclosure.

FIG. 4 is a flowchart illustrating an unlicensed channel access scheme of a LAA system according to various embodiments of the present disclosure.

Referring to FIG. 4, a description is made of the unlicensed band channel occupancy method in an LAA system hereinafter with reference to FIG. 4. The LAA cell (LAA SCell or LAA eNB) having no data to transmit stays in the idle state at operation 401. At this time, the idle state is the state where the LAA cell transmits no data in the unlicensed band. For example, after the start state 400, the idle state 401 is the state where the LAA cell has no data to transmit to the UE or, if it has data to transmit to the UE, suspends transmitting the data to the UE. If it is required for the LAA cell in the idle state to occupy a channel to transmit data or control signal to the UE at operation 402, the LAA cell performs the first channel sensing operation at operation 403. At this time, the first channel sensing operation may be configured differently depending on at least one of a time period (e.g. 34 us) preconfigured or configured by another device and type of data or control signal to be transmitted by the LAA cell. For example, in the case of transmitting only the control signal without data, the first channel sensing operation period may be set to a value different from that for the first channel sensing operation execution for transmitting data from the LAA cell to the UE (e.g. shorter than the first channel sensing operation period for the case of transmitting data). At this time, the first channel sensing operation configuration values may be predefined. At least one of the other parameters (e.g. received signal strength threshold for determining whether to sense the channel), as well as the first channel sensing operation period, may be configured differently for the case of transmitting only the control signal and for the case of transmitting data from the LAA cell to a specific UE. At this time, the LAA cell may set the contention period for the second channel sensing operation to an initial value. The first channel sensing operation is the operation of determining whether the corresponding channel is occupied by other devices using various methods including at least one of measuring received signal strength or detecting a predefined signal during the first channel sensing operation period. At this time, the first channel sensing operation-related parameters including the first channel sensing period may be preconfigured or configured by other devices. If it is determined that the channel is idle at operation 404, the LAA cell occupies the channel to transmit signals at operation 405. If it is determined that the channel is occupied by other devices at operation 404, the LAA cell selects a random variable N in the configured contention period [x, y]. At this time, the initial contention period may be preconfigured or (re)configured by the eNB. The contention period may be configured based on various parameters including the number of channel occupancy times, channel occupancy rate (e.g. traffic load), and ACK about data transmitted during the channel occupancy (e.g. ACK/NACK). For example, if it is determined at operation 406 that further channel occupancy is necessary, the LAA may reset or configure the contention period based on the ACK about the data transmitted at operation 414 or at least one of the aforementioned methods. The contention period determination method based on the ACK about the data transmission result at operation 414 is just an example, and it is also possible to configure the contention period based on the value set in the previous channel occupancy and data transmission operation or a preconfigured value. For example, if a NACK is received from the UE after the LAA cell has transmitted data to the UE in the channel occupancy period, the LAA cell may increase or maintain the contention period. If an ACK is received from the UE after the LAA which has occupied the channel in the increased or maintained contention period transmits data, it may be possible to decrease or maintain the contention period or initialize the contention period. Here, the ACK/NACK-based contention period configuration method is just an example, and it is possible to configure the contention period using the aforementioned other criteria.

If the random variable N is configured in the preconfigured contention period at operation 407, the LAA cell may perform the second channel sensing operation using the configured N at operation 408. At this time, the second channel sensing operation is performed through at least one of received signal strength measurement and predetermined channel detection during the configured period based on the determination criteria different from those for the first channel sensing operation. That is, the second channel sensing operation reference time may be set to a value equal to or less than the first channel sensing time. For example, the first channel sensing time may be set to 34 us while the second channel sensing time is set to 9 us. The second channel sensing operation threshold may be set to a value different from the first channel sensing operation threshold value.

If it is determined that the channel sensed at operation 408 is idle at operation 409, the LAA decreases N by 1 at operation 410. At time, decrementing N by 1 is just an example, and it is possible to decrement N differently depending on the configuration value or to configure N differently depending on the type or characteristic of the signal. If the decremented N is 0 at operation 411, the LAA cell occupies the channel to transmit data at operation 405. Otherwise if N is not 0, the LAA cell performs the second channel sensing operation again at operation 408. If it is determined that the channel sensed at operation 408 is not idle at operation 409, the LAA cell performs the third channel sensing operation at operation 412. At this time, the third channel sensing operation may be configured in the same manner as the first or second channel sensing operation. For example, the first and third channel sensing reference times may be set to 34 us identically. At this time, the first and second channel sensing thresholds may be set to different values. The channel sensing operation reference time and threshold value are just an example, and it is possible to set the third channel sensing operation-related parameters and criteria to values identical to or different from those for the first channel sensing operation.

The third channel sensing operation may be configured to incur time delay without channel sensing or channel occupancy operation. Also, the third channel sensing time may be configured to be identical with or different from at least one of the first and second channel sensing times. The LAA cell determines whether the channel is occupied by other devices based on the threshold configured for the third channel sensing operation. If it is determined that the channel is idle, the LAA cell may perform the second channel sensing operation again at operation 408. If it is determined that the channel is not idle at operation 413, the LAA cell performs the third channel sensing operation at operation 412. At this time, at least one of the first to third channel sensing operations may be omitted depending on the type and characteristic of the data or control signal to be transmitted by the LAA cell. For example, in the case of transmitting a control signal (e.g. discovery reference signal (DRS), the LAA cell may perform the first channel sensing operation and occupy the channel immediately according the channel sensing operation result. At this time, omitting at least one of the first to third channel sensing operations in the case of transmitting the DRS is just an example, and it is possible to omit at least one of the first to third channel sensing operations for transmitting in the case of transmitting other control signals.

As described above, a contention period may be configured. The contention period may be configured based on at least one of the number of channel occupancy attempts, channel occupancy rate (e.g. traffic load), and ACK about data transmitted during the channel occupancy (e.g. ACK/NACK). In the case of configuring the contention period based on the signal reception ACK of the eNB or the UE, however, if one or more UEs transmit ACK/NACK simultaneously or if the LAA cell transmits ACK/NACK to one or more UEs simultaneously, it is ambiguous to configure the contention period. Thus the present disclosure proposes a method for configuring the contention period based on the ACK transmitted by the eNB/UE in correspondence to the data transmitted by the UE/eNB in the unlicensed band.

Embodiment 1

Figure 5:
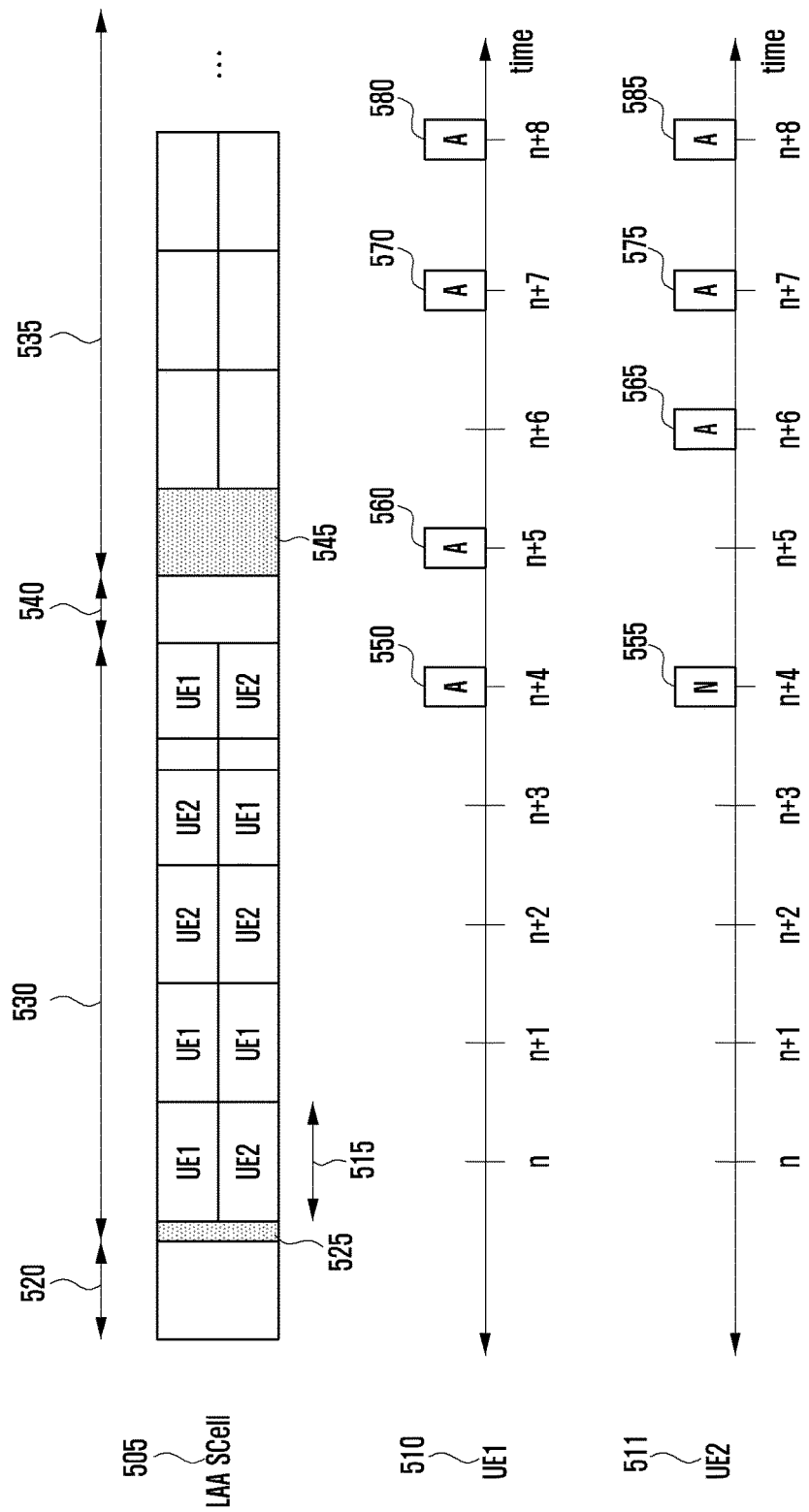
FIG. 5 is a diagram illustrating a contention period configuration method according to various embodiments of the present disclosure.

FIG. 5 is a diagram illustrating a contention period configuration method according to various embodiments of the present disclosure.

Referring to FIG. 5, descriptions are made of the DL channel sensing operation and the channel access method from the viewpoints of the LAA cell 505 and the UE1 510 which is receiving data from the LAA cell 505 hereinafter with reference to FIG. 5. The LAA cell 505 performs channel sensing operation 520 to occupy the channel in the idle state. At this time, the channel sensing operation 520 may be performed using at least one of the operations at operations 403, 408, and 413 of FIG. 4. At this time, the maximum occupancy time allowed for the channel is denoted by reference number 530. The signal 525 may be transmitted until the start point of the subframe 515 according to the channel occupancy start time. Afterward, the LAA cell 505 may transmit data scheduled to the UEs in the channel occupancy duration 530. From the viewpoint of UE1 510, it receives data in subframes n, n+1, n+3, and n+4 in the channel occupancy time 530. At this time, the LAA cell 505 may transmit data to UE1 510 and UE2 511 simultaneously using different frequency resources (e.g. different resource blocks). In the FDD system, the UE1 510 and UE2 511 receive data in subframe n and transmit data reception results 550 and 555 respectively to the eNB at subframe n+4. The eNB may retransmit the data according to the data reception results. That is, after transmitting the data to the UE1 510 and UE2 511 in the channel occupancy time 530, the eNB may receive the data reception results from the UEs during the period from subframe n+4 to subframe n+8. At this time, the eNB may configure a contention period for channel sensing operation depending on the data reception results from the UEs.

Although the description is made based on the transmission relationship between data transmission time of the LAA cell and the data reception result transmission time of the UEs assuming the LAA cell and UE operating in the FDD mode for explanation convenience, the methods according to the above embodiment can be applied to the LAA cell and UE operating in the TDD mode identically according to the predefined time (e.g. Hybrid Automatic-Repeat-Request (HARQ) feedback timing specified in TS36.213).

In the case of the LAA cell operating in the FDD mode, the UE1 510 and UE2 511 which receive data at subframe n transmit corresponding data reception results 550 and 555 to the eNB at subframe n+4 respectively. The eNB may receive the data reception results from the UEs in the duration [n+4~n+8] (e.g., for results 560, 570, and 580 with regard to UE1 510, and results 565, 575, and 585 with regard to UE2 511 shown in FIG. 5). At this time, the period for receiving A/N from the UEs for contention period configuration (hereinafter, referred to as contention period configuration reference time) is configured as follows.

Method A-1: Time at which the LAA cell receives data reception results from part or all of the UEs in correspondence to all data transmitted within the channel occupancy time of the LAA cell.

Method A-2: Time at which the LAA cell receives data reception results from part or all of the UEs in correspondence to the data transmitted at the last data transmission timing within the channel occupancy time of the LAA cell.

Method A-3: Time at which the LAA cell receives data perception ACKs from part or all of the UEs in correspondence to the data transmitted at the first data transmission timing within the channel occupancy time of the LAA cell.

Method A-4: Time at which the LAA cell receives data reception results from part or all of the UEs in correspondence to the data transmitted at a specific timing within the channel occupancy time of the LAA cell.

Method A-5: Time at which the LAA cell receives data reception results from part or all of the UEs in correspondence to the data transmitted before or after a specific time within the channel occupancy time of the LAA cell.

Method A-6: Predefined or configured time

Method A-7: Time at which the LAA cell receives data reception results or the latest data reception result from part or all of the UEs before a new channel sensing operation start time Although the channel sensing operation start time has been described under the assumption that a random variable is selected, right before the channel sensing operation start time, to configure the channel sensing period necessary for perform new channel sensing operation, if the real channel sensing operation start time and the time at which the random variable is selected in the contention period for the channel sensing period configuration mismatch, the above described method may be applied based on the time of selecting the random variable within the contention period for configuring the channel sensing period configuration.

For the case where the LAA cell does not receive all data reception results from the UEs in correspondence to the downlink (DL) data transmitted in the channel occupancy duration before the new channel sensing operation start time and the case where the LAA cell receives all data reception results from the UEs in correspondence to the DL data transmitted in the channel occupancy duration before the new channel sensing operation start time, it may be possible to apply different contention period configuration methods. A description thereof is made hereinafter. If the LAA cell receives all data reception results from the UEs in correspondence to the DL data transmitted in the channel occupancy duration before the new channel sensing operation start time, it may configure the contention period for a new channel occupancy period based on the all or part of the data reception results in correspondence to the DL data transmitted in the channel occupancy period (e.g. Method A-1). If the LAA cell does not receive all data reception results from the UEs in correspondence to the DL data transmitted in the channel occupancy duration before the new channel sensing operation start time, it may configure the contention period for a new channel occupancy period based on part of the data reception results from the UEs in correspondence to the DL data transmitted in the previous channel occupancy period like Method A-7.

It is also possible to configure such that the new channel sensing operation start time of the LAA cell arrives after receiving all of the acknowledgements (ACKs) corresponding to the DL data transmitted in the previous channel occupancy period.

Referring to FIG. 5, a description is made of Method A-1. The LAA cell 505 receives the data reception result (ACK/NACK) corresponding to the data transmitted by the LAA cell in the channel occupancy duration 530 cell from the UEs in the duration [n+4~n+8]. Accordingly, the period in which the LAA cell receives the data reception result corresponding to the data transmitted in a specific channel occupancy period can be configured as the contention period configuration time. At this time, the DL data reception result corresponding to the DL data transmitted during a period shorter than a normal LTE subframe (1 ms) may not be included in the contention period configuration reference time for configuring the contention period. If there is at least one NACK among the DL data reception results corresponding to the data transmitted in the channel occupancy period of the LAA cell, the LAA cell may increase or maintain the contention period. If there is no NACK among the DL data reception results corresponding to the data transmitted in the channel occupancy period of the LAA cell, the LAA cell may maintain or decrease the contention period. At this time, it may be possible to use the initial contention period.

A description is made of Method A-2 hereinafter with reference to FIG. 5. The LAA cell 505 receives data reception results corresponding to the data transmitted by the LAA in the channel occupancy duration 530 from the UEs in the duration [n+4~n+8]. At this time, the LAA cell may configure the last data transmission time requiring A/N transmission in the channel occupancy period 530 or the subframe n+8 at which the data reception result corresponding to the data transmitted at last subframe n+4 having the length of 1 ms as the contention period configuration reference time for contention period configuration. At this time, the reception result corresponding to the data transmitted in a time period shorter than a normal LTE subframe (1 ms) is not included in the contention period configuration reference time for configuring the contention period. If at least one NACK is received at the contention period configuration reference time for configuring the contention period, the LAA cell may increase or maintain the contention period. If no NACK is received at the contention period configuration reference time for configuring the contention period, the LAA cell may maintain or decrease the contention period. At this time, it may be possible to use the initial contention period.

Referring to FIG. 5, a description is made of Method A-3. The LAA 505 receives data reception results corresponding to the data transmitted by the LAA in the channel occupancy period 530 from the UEs in the duration [n+4~n+8]. At this time, the LAA cell configures the first data transmission time required for transmitting A/N in the channel occupancy period 530 or a time point when the data reception result corresponding to the data transmitted at the first subframe n is received as the contention period configuration reference time for configuring the contention period. At this time, the reception result corresponding to the data transmitted in a time period shorter than a normal LTE subframe (1 ms) is not included in the contention period configuration reference time for configuring the contention period. If at least one NACK is received at the contention period configuration reference time for configuring the contention period, the LAA cell may increase or maintain the contention period. If no NACK is received at the contention period configuration reference time for configuring the contention period, the LAA cell may maintain or decrease the contention period. At this time, it may be possible to use the initial contention period.

Referring to FIG. 5, a description is made of Method A-4 and method A-5. The LAA cell 505 receives the data reception results corresponding to the data transmitted in the channel occupancy period 530 from the UEs in the duration [n+4 n+8]. At this time, the LAA cell may configure a duration for receiving the data reception results corresponding to the data transmitted in a specific subframe at the data transmission time requiring A/N transmission in the channel occupancy duration 530 or transmitted before or after the specific subframe as the contention period configuration reference time. For example, the contention period configuration reference time may be configured according to the A/N transmission time relationship of the UE which is predefined between the LAA cell and the UE. That is, in the case of FDD, the A/N transmission time of the UE which is predefined between the LAA cell and UE is 4 ms after data transmission time of the LAA cell. Accordingly, the LAA cell may configure the contention period configuration reference time using the A/N transmission time relationship of the UE based on the channel occupancy period 530. For example, a subframe before the A/N transmission time relationship of the UE which is defined based on the last data transmission time (or the last subframe having the length of 1 ms) of the channel occupancy period 530 may be configured as the contention period configuration reference time. That is, the subframe before the A/N transmission relationship (4 m) corresponding to the last channel occupancy time n+4 as denoted by reference number 530 of FIG. 5, i.e. the A/N transmission time n+4 corresponding to subframe n, may be configured as the contention period configure reference time. That is, if the LAA cell occupies the channel for 10 ms (n~n+10), it is possible to configure the contention period using the reception result corresponding to the data transmitted to the UE at n+6. If at least one NACK is received in the contention period configuration reference time for configuring the contention period, the LAA cell may increase or maintain the contention period. If no NACK is received at the contention period configuration reference time for configuring the contention period, the LAA cell may maintain or decrease the contention period. At this time, it may be possible to use the initial contention period.

A description is made of Method A-6 hereinafter with reference to FIG. 5. The LAA cell 505 may configure the A preconfigured based on the time n when data transmission starts in the channel occupancy period 530 and the time n+4 when the data reception results are transmitted by the UEs or configured by the LAA as the contention period configuration reference time. For example, if A=100 ms, the LAA cell may configure the duration (n+100 or n+104) in the range of 100 ms based on the time n when the LAA transmits data of the time n+4 when the data reception result corresponding to the transmitted data is received as the contention period configuration reference time.

A description is made of the Method of A-7 with reference to FIG. 5. The LAA 505 operating in the FDD mode receives the channel reception results in the duration [n+4~n+8] in correspondence to the data transmitted by the LAA 505 to the UEs 510 and 511 in the channel occupancy time 530.

At this time, the LAA cell 505 may configure the contention period for a new channel sensing operation 540 based on the reception results received from the UEs in the duration starting from the previous channel sensing operation start time till right before the new channel sensing operation 540 in correspondence to the DL data transmitted by the LAA in the unlicensed band or the most recently received data reception results 550 and 555. That is, the LAA cell may configure time n+4 when the reception results corresponding to the DL data transmitted by the LAA cell in the unlicensed band as the contention period configuration reference time for configuring the contention period. In other words, the LAA cell 505 may configure the contention period for the new channel sensing operation 540 based on the data reception results received from the UEs before the new channel sensing operation 540 is started for reoccupying the unlicensed band (e.g. before the random variable N necessary for performing the new channel sensing operation 540 at operation 407 of FIG. 4 is selected) or the latest one of the data reception results. That is, if at least one NACK 555 is included in the data reception results 550 and 555 or in the most recent data reception results 550 and 555 received between the previous channel sensing period 520 and the new channel sensing period 540, the LAA cell may configure the contention period to be longer than or equal to the previous contention period. If no NACK is included in the data reception results 550 and 555 or in the most recent data reception results 550 and 555 received between the previous channel sensing period 520 and the new channel sensing period 540, the LAA cell may configure the contention period to be equal to or less than the previous contention period. At this time, the LAA cell may initialize the contention period for the new channel sensing period 540 to the initial contention period.

At this time, the LAA cell may use the A/N information received from part or all of the UEs at the configured contention period configuration reference time for configuration of the contention period. For example, it is possible to configure all UEs transmitting the data reception results in the contention configuration time as the contention period change reference UEs. In another example, it is possible to configure UEs selected, based on the channel quality information (or allocated MCS value), among all UEs transmitting the data reception results in the contention period configuration reference time as the contention period change reference UEs. For example, it may be possible to configure the UEs configured with the lowest MCS or preconfigured or allocated an MCS in the range selected by the LAA as the contention period change reference UE. That is, the UE having a low MCS may be regarded as a victim of significant interferences from the neighboring devices so as to be used as the contention period change reference. It may be also possible to configure the UE which transmits measured channel information to the LAA most recently or which transmits a signal predefined for reporting the UE channel condition (e.g. RSSI) among the UEs transmitting data reception results in the contention period configuration reference time as the contention period change reference UE. The contention period configuration reference UE may be configured based on one or any combination of the above methods.

Also, the contention period configuration reference time may be configured in such a way of combining or extending the aforementioned method as well as applying each method without modification. For example, the contention period configuration reference time may be configured based on the channel occupancy time of at least one LAA cells in Method A-1. For example, a period corresponding to two channel occupancy periods 530 and 535 may be configured as the contention period configuration reference time. The aforementioned methods and cases are just examples but the present disclosure is not limited thereto. That is, although Methods A-1 to A-6 are directed to the cases of configuring the contention period configuration reference time for contention period configuration based on one channel occupancy time, it may be possible to configure the contention period configuration reference time corresponding to at least one channel occupancy period as the contention period configuration reference time for the contention period configuration.

The LAA cell may configure the contention period for the second channel sensing operation based on part or all of the data reception results transmitted by the UEs using at least one or any combination of the above method. At this time, the contention period change method is described in association with the application to the channel sensing operation based on the ACK/NACK received from the UEs in association with the second channel sensing operation, but it may also be used to change at least one of the first and third channel sensing operation criteria using the contention period change method or at least one of the criteria. For example, it is determined that it is necessary to change the contention period using the methods to be described hereinafter, it may be possible to change at least one of the first or third channel sensing operation criteria (e.g channel sensing reference time) according to a predetermined method or set to other values. The LAA cell applies a contention period change method to the second channel sensing operation using the contention period configuration reference time and ACK/NACK received from the contention period configuration reference UE as follows.

Method B-1: If at least one NACK is received from the contention period configuration reference UE during the contention period configuration reference time, then maintain or change the contention period applied to the next second channel sensing operation.

Method B-2: Maintain or change the contention period applied to the next second channel sensing operation based on the number or ratio of NACKs (or ACKs) received from the contention period configuration reference UE during the contention period configuration reference time.

Referring to FIG. 5, a description is made of Method B-1 in detail. In the case that the contention period configuration reference time is configured to [n+4~n+8] corresponding to the channel occupancy time 530 as in Method A-1 and all UEs which transmit data reception results in the contention period configuration reference time as the contention period configuration reference UEs, the LAA cell receives the NACK 555 from the UE2 511 during the configured contention period configuration reference time and thus may change (e.g. increase) the contention period. At this time, the contention period may be changed exponentially (i.e., 16→32→64→128, . . . , →1024). That is, the contention period may increase exponentially from the minimum contention period value (or initial value) of 16 to the maximum contention period value of 1024. The exponential increment method is just an example, and it is possible to use a linear increment method or a method of selecting one of the preconfigured contention period candidate values (or a set of values {16, 32, 64, 256, 1024}) sequentially or randomly. If neither ACK nor NACK is received from the contention period configuration reference UEs in the configured contention period configuration reference time, the LAA cell may assume receipt of NACK and increase the contention period. If neither ACK nor NACK is received from the contention period configuration reference UEs in the contention period configuration reference time configured as above, the LAA cell may reuse the previously configured contention period without change or initialize the content period to the initial length. If no ACK is received from the contention period configuration reference UEs in the configured contention period configuration reference time or if all of the received are ACK, the LAA cell may change (e.g. decrease) the contention period. At this time, the contention period may be maintained as a predetermined length or decreased exponentially (e.g., 1024→512→ . . . →32→16). At this time, the exponential decrement method is just an example, and it may be possible to use a linear decrement method or a method of selecting one of the preconfigured contention period candidate values (or a set of values {16, 32, 64, 256, 1024}) sequentially or randomly. The aforementioned contention period value denotes the maximum value of the contention period. However, the minimum contention period value may also be configured in the aforementioned method. For example, a description thereof is made under the assumption of the initial contention period configuration period of [1, 16]. If at least one NACK is received from the contention period configuration reference UE during the contention period configuration reference time, the LAA may change the contention period to be applied to the subsequent channel sensing operation to [1, 32]. Alternatively, it may be possible to change the maximum value of the previous contention period with the maximum value of the contention period. In the above example, the contention period may be set to [16, 32]. Changing from the maximum value of the contention period to the minimum value of the contention period is just an example, and it may also be possible to configure the contention period to the minimum value in various ways. For example, it is possible to set the contention period to a fixed minimum value of 0 or 1 which is predefined.

Referring to FIG. 5, a description is made of Method B-2 in detail. If the contention period configuration reference time of the LAA cell is set to (n+4~n+8) corresponding to the channel occupancy time 530 of the LAA cell and if all UEs which transmit data reception results in the contention period configuration reference time as the contention period configuration reference UEs, the eNB receives 1 NACK 555 from the UE2 511 during the contention period configuration reference time configured as shown in FIG. 5. If it is determined that when the number of NACKs is equal to or greater than K (e.g. K=2) or when the percentage of NACKs is equal to or greater than P % (e.g. 10%) the contention period change reference is configured in Method B-2, the contention period may not be changed but be maintained or may be decreased or initialized to the initial length in the example of FIG. 5. If the number or percentage of the NACKs received from the contention period configuration reference UEs during the contention period configuration reference time configured as above is equal to or greater than K or P %, the LAA cell may maintain or increase the contention period. The contention period may be increased exponentially (e.g., 16→32→64→128→ . . . 4 1024) or decreased exponentially (e.g., 1024→512→ . . . →32→16). The exponential increment and decrement methods are just examples, and it may be possible to use a linear increment or decrement method or a method of selecting one of the preconfigured contention period candidate values (or a set of values {16, 32, 64, 256, 1024}) sequentially or randomly. If neither ACK nor NACK is received from the contention period configuration UEs during the contention period configuration reference time as configured above, the LAA cell may assume the receipt of NACK to increase the contention period or reuse the preconfigured contention period. At this time, the LAA cell may change the contention period even when the condition of Method B-2 is not fulfilled. That is, although the contention period change condition is configured to be fulfilled when the number of NACKs received from the contention period configuration reference UE during the contention period configuration reference time is equal to or greater than 2 in Method B-2, if neither ACK nor NACK is received from the contention period configuration reference UEs during the contention period configuration reference time, the LAA may change the contention period according to the configured threshold or regardless of the configured threshold. Also, if it is configured that when the number or percentage of the received NACKs is equal to or greater than K or P % the contention period is changed in Method B-2, the contention period may be changed according to the number or percentage of the received NACKs. For example, if the percentage of NACKs among the data reception results received from the UEs during the previous data transmission period is P % or if the percentage of the NACKs among the data reception results received during the period starting from the previous channel sensing period start time and ending right before the new channel sensing period start time or starting from the time when generating a random variable (e.g. random backoff number) for the previous channel sensing period and ending right before the time when generating a random variable (e.g., random backoff number) of the new channel sensing period operation is P %, the contention period may increase as much as P % from the previous contention period. In more detail, if an exponential increment method (e.g., 16→32→64→128→ . . . →1024) or an exponential decrement method (e.g., 1024→512→ . . . →32→16) is used for the contention period and if the percentage of NACKs among the data reception results received from part or all of the UEs during the period from the previous channel sensing operation start time to the new channel sensing operation start time is 40% (e.g., 4 of 10 A/N values are NACKs) as in Method A-7, it may be possible to increase the contention period for the new channel sensing operation as much as 40% (22.4, 22, or 23) in comparison to the previous channel contention period (e.g., 16). At this time, the increased contention period may be rounded off to an integer. If the percentage of NACKs of the data reception results received from part or all of the UEs during a period from the previous channel sensing operation start time to the new channel sensing operation start time is higher than a predetermined threshold value (e.g. 50%), it may be possible to increase the contention period (16→32) regardless of the percentage of NACKs. At this time, if the number of NACKs is equal to or less than (or less than) K or the percentage of the NACKs is equal to or less than (or less than) P % (K and P may be 0), the contention period for the new channel sensing operation is set to the same value as the previous contention period or initialized to the initial length.

As described above, if neither ACK nor NACK is received from the contention period configuration reference UEs during the contention period configuration reference time (discontinuous transmission (DTX)) the LAA cell assumes receipt of NACK to increase the contention period according to the contention period determination criteria or reuse the previously configured contention period. A description is made of the case where the LAA cell receives neither ACK nor NACK from the contention period configuration reference UEs during the configured contention period configuration reference time in more detail hereinafter. The LAA cell performs DL data transmission to the UE in the channel occupancy period, and the UE which receives the data transmits to the LAA cell the data reception result through one of the licensed band or the unlicensed band through which the data has been received or another unlicensed band. Typically, the LAA cell sends the UE a DL control channel (PDCCH) carrying DL data scheduling information for transmitting DL data (PDSCH). The UE checks the scheduling information included in the UL control channel and performs DL data reception operation as scheduled. However, if the UE does not receive the control channel carrying the scheduling information through the DL control channel, it determines that it has not been scheduled by the LAA cell and thus the terminal neither performs the downlink (DL) data reception operation nor transmits any data reception result. Also, it may be possible that the LAA cell has transmitted the scheduling information to the UE through the DL control channel and the UE checks the scheduling information received through the DL control channel and transmits the data reception result to the LAA cell through a licensed band or an unlicensed band but the LAA cell does not receive the data reception result. At this time, if the UE is configured to transmit the data reception result through the licensed band and if the LAA cell receives neither ACK nor NACK from the contention period configuration reference UEs during the contention period configuration reference time (DTX), it may be possible not to increase the contention period for unlicensed band channel sensing but to maintain the previous contention period or use the initial value. Also, if the LAA cell receives the DTX or NACK/DTX from the contention period configuration reference UEs during the contention period configuration reference time, it regards the receipt of the DTX or NACK/DTX as the receipt of NACK or distinguishes between the NACK/DTX and DTX. For example, since LAA cell cannot identify whether the NACK/DTX information is NACK or DTX transmitted by the LAA UE, it interprets the NACK/DTX as NACK and the DTX as not receiving ACK/NACK so as not to be included in determining the contention period. That is, the DTX may be excluded in determining the contention period. For more details on ACK, NACK, NACK/DTX, and DTX configuration and transmission method, see TS36.211, TS36.212, and TS36.213.

For example, a UE configured to transmit ACK/NACK information to the LAA with 2 antenna ports and PUCCH format 1b with channel selection can transmit to the LAA cell four types of reception status information of ACK, NACK, DTX, and NACK/DTX.

In the UE configuration method based on the PUCCH format 1b with channel selection, the eNB may configure the UE which is capable of supporting carrier aggregation (CA) of up to two carriers to use the PUCCH format 1b with channel selection always when configuring two carriers to the UE.

In the case that more than two carriers are configured to the UE capable of supporting CA of more than two carriers, it may be possible to configure to use the UE to use one of the PUCCH format 1b with channel selection and the PUCCH format 3.

Meanwhile, the LAA cell may transmit to the UE a control message for configuring the PUCCH format 1b with channel selection. The UE configured with the PUCCH format 1b with channel selection may transmit the reception status information to the LAA cell according to the configuration included in the control message.

At this time, the LAA cell may interpret the DTX and NACK/DTX information as NACK or distinguish NACK/DTX and DTX among the ACK/NACK status information types. For example, single the LAA cell cannot identify whether the NACK/DTX information is NACK or DTX, it interprets the NACK/DTX as NACK and the DTX as not receiving ACK/NACK so as to be excluded in determining the contention period. At this time, it may be possible to interpret both the NACK/DTX and DTX as not receiving ACK/NACK so as to be excluded in determining the contention period. At this time, it may be possible to interpret both the NACK/DTX and DTX as not receiving ACK/NACK so as to be excluded in determining the contention period.

If the LAA UE which is configured with the ACK/NACK information transmission scheme for cell 1 and cell 2 with the PUCCH format 1b with channel selection does not receive PDCCH scheduling PDSCH to the cell 1 and cell 2 (DTX) or if the combination of ACK/NACK information for cell 1 and cell 2 include only DTX or NACK/DTX without ACK and NACK, the LAA cell does not transmit any ACK/NACK information to the LAA cell (not transmission). The LAA UE configured with the PUCCH format 1b with channel selection does not transmit ACK/NACK information, and the LAA cell which has not received the ACK/NACK information from the LAA UE interprets the DTX or NACK/DTX as not receiving ACK/NACK so as not to be included in determining the contention period. At this time, it may be possible to interpret both the DTX and NACK/DTX for the LAA cell as NACK or distinguish between NACK/DTX and DTX. For example, since the LAA cell cannot identify whether the NACK/DTX information is NACK or DTX transmitted by the LAA UE, it interprets the NACK/DTX as NACK and the DTX as not receiving ACK/NACK so as not to be included in determining the contention period. At this time, assuming that cell 1 is a licensed band cell (licensed carrier) and cell 2 as an LAA cell, if the LAA UE configured with the PUCCH format 1b with channel selection determines cell 1 as DTX and cell 2 as NACK/DTX, the LAA UE may transmit no ACK/NACK information to the LAA cell. In this case, the LAA cell cannot identify whether the NACK/DTX information is NACK or DTX for cell 2 of the LAA UE, it interprets the NACK/DTX as NACK so as to be included in determining the contention period.

In detail, the LAA UE may be configured with the ACK/NACK information transmission scheme for cell 1 and cell 2 using the PUCCH format 1b with channel selection in the LAA cell as shown below in table 1.

TABLE 1

| HARQ-ACK(0) | HARQ-ACK(1) | $n_{PUCCH}^{(1)}$ | b(0)b(1) |
|---|---|---|---|
| ACK | ACK | $n_{PUCCH, 1}^{(1)}$ | 1, 1 |
| ACK | NACK/DTX | $n_{PUCCH, 0}^{(1)}$ | 1, 1 |
| NACK/DTX | ACK | $n_{PUCCH, 1}^{(1)}$ | 0, 0 |
| NACK | NACK/DTX | $n_{PUCCH, 0}^{(1)}$ | 0, 0 |
| DTX | NACK/DTX |  | No Transmission |

As shown in table 1, if no ACK/NACK is received, the LAA UE may assume that the feedback to cell 1 is DTX and the feedback to cell 2 is NACK/DTX.

The LAA cell may ignore the DTX to do not include it in the contention period determination criteria and assume the receipt of NACK/DTX as the receipt of NACK. In detail, the DTX may not be used in determining the length of the next LBT because it is not included in the contention period determination criteria.

In the case that the UE is configured to transmit the data reception result in the unlicensed band, if the LAA cell receives neither ACK nor NACK from the contention period configuration reference UEs during the contention period configuration reference time (DTX), it may be possible to increase the contention period for unlicensed band channel sensing. That is, if it is determined that the reason why the LAA cell receives ACK nor NACK from the contention period configuration reference UEs during the contention period configuration reference time (DTX) is the collision of the devices on the unlicensed band or hidden node which is not detected by the LAA cell or UE, it may be possible to increase the contention period for unlicensed band channel sensing. If the LAA cell receives neither ACK nor NACK from the contention period configuration reference UEs during the contention period configuration reference time (DTX) without consideration of the influence of the hidden node, it may be possible to maintain the contention period for the unlicensed band channel sensing. At this time, if the UEs transmit the data reception results in the licensed band, it may be possible to maintain the contention period for unlicensed band channel sensing regardless whether the LAA cell receives neither ACK nor NACK from the contention period configuration reference UEs during the contention period configuration reference time (DTX). If the UEs transmit the data reception results in the unlicensed band and if the LAA cell receives neither ACK nor NACK from the contention period configuration reference UEs during the contention period configuration reference time (DTX), the UE may assume that no downlink (DL) scheduling information is received from the LAA cell through the DL control channel and increase the contention period for new unlicensed band channel sensing.

The contention period may be changed according to the above described criteria and schemes in such a way of comparing the data reception results received from the contention period configuration reference UEs during the configuration period configuration reference time with the contention period channel threshold set by the LAA cell to determine whether to change the contention period and changing the contention period based on the determination result and contention period change scheme. However, since a new channel sensing operation 630 may be executed before the change of the contention period, there is a need of a contention period configuration method for the channel sensing operation 630 executed before the contention period change time point.

The LAA cell 600 performs the channel sensing operation 610 during the preconfigured contention period to determine whether the channel is occupied, for data transmission to the UE 605. If it is determined that the channel is idle, the LAA cell 600 occupies the channel during the configured channel occupancy period 620 or predetermined or preconfigured maximum channel occupancy period to transmit data to the UE 605. At this time, it is assumed that the contention period configuration reference time of the LAA cell is configured with Method A-2, the contention period configuration reference UEs are all UEs which transmit data reception results during the contention period configuration reference time, and the contention period change method is Method B-1. That is, the LAA cell 600 changes the contention period based on the A/N 674 corresponding to the last subframe among the A/N's corresponding to data transmitted during the channel occupancy period 620 (and similarly for A/N 675, 676 and 677 shown in FIG. 6). The LAA cell 600 may perform the channel sensing operation 630 to secure further channel occupancy period 640 before receipt of the A/N 674 for the channel sensing period 620, i.e. before the changed contention period application timing. In the typical Wi-Fi operation, the contention period is changed for reoccupying the channel. That is, the contention period may increase or decrease according to the data reception results of the UEs during the channel occupancy period. However, since the LAA cell 600 may perform the channel sensing operation 630 before the contention period is changed, it is necessary to configure the contention period for the channel sensing operation 630 which is performed before the changed contention period application timing.

The contention period may be configured for the channel sensing operation 630, which is performed before the contention period change timing, as follows.

Method C-1: Reuse contention period configured for previous channel occupancy

Method C-2: Use initial value of contention period

Method C-3: Change according to UE reception performance received before channel sensing operation Method C-4: Use predefined contention period FIG. 6 is a diagram illustrating a method for applying a changed contention period according to various embodiments of the present disclosure.

Figure 6:
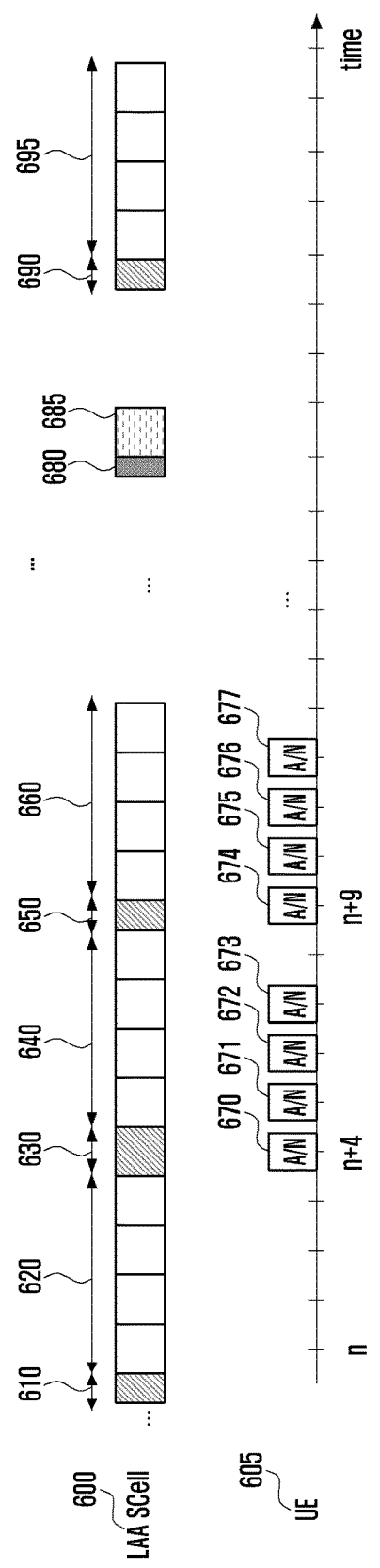
FIG. 6 is a diagram illustrating a method for applying a changed contention period according to various embodiments of the present disclosure.

Referring to FIG. 6, method C-1 is described hereinafter in more detail. As shown in FIG. 6, the contention period for the channel sensing operation 630 executed before the changed contention period application timing may be configured to be identical with the contention period used for the latest channel sensing operation 610. Alternatively, the contention period for the channel sensing operation 630 which is performed before the changed contention period application timing is configured to use the initial value of the contention period as in Method C-2 or to use a predetermined period as in Method C-4. Alternatively, the contention period may be changed based on the A/N information received from the UEs before the channel sensing operation 630 which is performed before the changed contention period application timing. At this time, it may be possible to change the contention period based on the A/N information received from the UEs by excluding at least one of the configured contention period configuration reference time and the contention period configuration reference UE or changing the method.

The LAA cell may perform the channel sensing operation 650 to further occupy the channel after the channel occupancy period 640. At this time, the channel sensing operation 650 may be performed based on the previously changed contention period.

In addition, with reference to FIG. 6, the LAA cell 600 may use another contention period, other than the previously changed contention period, for the channel sensing operation after the contention period change time point. That is, it may be possible to perform the channel sensing operation by not using the previously changed contention period or using a separately defined contention period according to the type of the signal which the LAA 600 wants to transmit on the occupied channel.

For example, it may be possible to perform the channel sensing operation with another contention period configured for the channel occupancy to transmit a control channel (e.g. (E)PDCCH, Discovery RS, SRS, and CSI-RS as denoted by reference number 685 of FIG. 6) without common data transmission (PDSCH/PUSCH) as denoted by reference numbers 620, 640, and 660 and UE-specific data transmission. For example, in the case of attempting channel occupancy for transmitting a control channel (e.g. (E)PDCCH, Discovery RS, SRS, and CSI-RS as denoted by reference number 685 of FIG. 6) without UE-specific data transmission, it may be possible to use another contention period 680 different from the previously changed contention period. For example, it may be possible to perform the channel sensing operation using the initially configured contention period or the contention period configured separately for transmitting control information (e.g. (E)PDCCH, Discovery RS, SRS, and CSI-RS as denoted by reference number 685 of FIG. 6) without UE-specific data transmission. At this time, it may be possible to occupy the channel to transmit the control channel without extra channel sensing operation. It may also be possible to occupy the channel without at least one of the first to third channel sensing operations. It may also be possible to perform the channel sensing operation for transmitting control information (e.g. (E)PDCCH, Discovery RS, SRS, and CSI-RS as denoted by reference number 685 of FIG. 6) without UE-specific data transmission by setting at least one of the first to third channel sensing operation thresholds to the minimum value. If it is necessary to occupy the channel for normal data transmission 695 after the channel occupancy for control channel transmission (e.g., reference element 690), the LAA cell 600 may perform the channel sensing operation with the previously configured contention period (e.g., contention period changed through the channel occupancy period 660), the contention period 650 used for channel occupancy for previous data transmission, or the initial contention period.

Method C-3 is described hereinafter in more detail with reference to FIG. 6. The LAA cell 600 operating in the FDD mode may receive the data reception results 670,671,672, and 673 corresponding to the data, which have transmitted to the UE 605 during the channel occupancy period 620, within the period [n+4~n+8]. Although the description is made with a relationship between the data transmission time of the LAA cell and the data reception result transmission time of the UE under the assumption of the LAA cell and LAA UE, it may be possible to apply all of the methods proposed in the above embodiments to the communication between the LAA cell and UEs operating in the TDD mode according to a predefined timing (e.g., HARQ feedback timing defined in TS36.213).

At this time, it may be possible to configure the contention period for the channel sensing operation 630 based on the data reception results received from the UEs till before performing the new channel sensing operation 630 including the previous channel sensing operation 610. At this time, since the LAA cell 600 does not receive the data reception result from the UEs in the duration from the start time of the previous channel sensing operation 610 till just before the start time of the new channel sensing operation 630, it may be possible to reuse the contention period configured for the previous channel sensing operation 610, the initial contention period, or a predetermined contention period as the contention period for the new channel sensing operation 630. A description is made of a case where the LAA cell 600 performs the channel sensing operation 630 to occupy the unlicensed band as denoted by reference number 640. The LAA cell 600 receives the data reception results 670, 671, 672, and 673 from the UE 605 in the channel sensing and occupancy periods 630 and 640. If it is necessary to reoccupy the unlicensed band after the channel occupancy period, the LAA cell may perform the new channel sensing operation 650 to reoccupy the unlicensed and. At this time, according to Method C-3, the contention period for the channel sensing operation 650 may be configured based on the data reception results 670, 671, 672, and 673 received in the duration from the start time of the previous channel sensing operation 630 to the start time of the new channel sensing operation 650 or the most recently received data reception result 673. For example, if the data reception result 673 received most recently from the UE in the duration from the start time of the previous channel sensing operation 630 to the start time of the new channel sensing operation 650 is NACK, it may be possible to configure the contention period for the new channel sensing operation 650 by maintaining or increasing the contention period of the previous channel sensing operation exponentially or linearly or selecting one of the preconfigured contention period candidate values. If the data reception result 673 transmitted by the UE is ACK, it may be possible to configure the contention period by maintaining or decreasing the contention period of the previous channel sensing operation 630 exponentially or linearly or selecting one of the preconfigured contention period candidate values.

In addition, the LAA cell may configure at least one of the minimum and maximum values of the contention period differently depending on the service quality requirements (quality of service (QoS)) of the data to be transmitted in the channel occupancy period. In more detail, in the case of providing a real time service such as voice of IP (VoIP) and streaming service of which service quality drops due to the data transmission delay, it may be possible to configure the minimum and maximum values of the contention period so as to minimize the contention period for channel sensing required for data transmission. For example, it may be possible to set the minimum and maximum contention period values for VoIP service to 7 and 15 respectively. In the case of providing a file transfer protocol (FTP) service or hypertext transfer protocol secure (HTTP) service of which service quality is less influenced by data transmission delay, it may be possible to set the minimum and maximum contention periods to values greater than those for the VoIP service. For example, it may be possible to set the minimum and maximum values of the contention period for the FTP service to 12 and 1023 respectively. At this time, if the data transmitted from the LAA cell to the UE in the channel occupancy period include two or more different QoSs, the contention period for the channel sensing operation of the LAA cell may be configured differently depending on the QoS. That is, if the LAA cell transmits multiple data having different QoSs to multiple UEs in the channel occupancy period, the contention period for the channel occupancy operation of the LAA cell may be configured differently as follows.

Method G-1: Configure contention period according to QoS having the least contention period configuration value among multiple QoSs Method G-2: Configure contention period according to QoS having maximum contention period configuration value among multiple QoSs Method G-3: Configure contention period using contention period configuration values of part or all of multiple QoSs For example, it is assumed that the LAA cell transmit data to two UEs. At this time, UE1 is receiving data for a VoIP service, and UE2 is receiving data for a FTP service. The minimum and maximum contention periods for VoIP service are 7 and 15 respectively, and the minimum and maximum contention periods for the FTP service are 15 and 1023 respectively according to QoS. That is, the maximum and minimum contention periods are determined based on the QoS of the service. In the case of transmitting the data for VoIP and FTP services to UE1 and UE2 during the channel occupancy period of the LAA cell, Method G-1 determines the contention period for the channel sensing operation necessary for the channel occupancy period based on the QoS having the least contention period configuration values among the contention period configuration values for the VoIP and FTP services (e g minimum and maximum contention period values of 7 and 15). That is, the contention period may be configured with the minimum contention period value of 7 and maximum contention period value of 15. Method G-2 determines the contention period for the channel sensing operation necessary for the channel sensing period based on the QoS having the greatest contention period configuration value among the contention period configuration values for the VoIP and FTP services (e g minimum and maxim contention periods of 15 and 1023). That is, the contention period may be configured with the minimum contention period value of 15 and maximum contention period value of 1023. Method G-3 determines the contention period by averaging the contention period configuration values for the VoIP and FTP services. That is, it may be possible to determine the contention period for the channel sensing operation necessary for the channel occupancy period based on the contention period configuration values for the VoIP and FTP services, e.g. values of (11, 519) obtained by averaging the minimum contention period value (7, 15) and the maximum contention period value (15, 1023).

At this time, the QoS of the data transmitted in the previous channel occupancy period and the QoS of the data to be transmitted in the new channel occupancy period may differ from each other. At this time, it may be possible to configure the contention period for the channel sensing operation performed to occupy the channel newly based on the QoS of the data to be transmitted in the new channel occupancy period. At this time, the contention period for the new channel sensing operation may be configured differently depending on the data reception results transmitted in the previous channel occupancy period. A description is made thereof with reference to FIG. 5. It is assumed that the FTP service data are transmitted to UE1 and UE2 in the previous channel occupancy period 530, as shown in FIG. 5. At this time, if the contention period for the case of performing the channel sensing operation 520 for the channel occupancy period 530 is configured according to Method G-1 among Methods G-1, G-2, and G-3, the minimum and maximum values of the contention period may be set to 15 and 1023 respectively. If the contention period for the channel sensing operation 520 is set to the minimum value of the contention period, the LAA cell 505 selects a random value in the contention period [0, 15] or [1, 15] and senses the channel during the channel sensing operation period corresponding to the selected value. In the case that the LAA cell transmits data to UE1 and UE2 in the channel occupancy period 530 and then wants to occupy the channel again during the channel occupancy period 535, the LAA cell has to perform the channel sensing operation 540. However, if the VoIP service data are transmitted to the UE3 and UE4 in the channel occupancy period 535, the contention period for the channel sensing operation 540 may be configured with the minimum value of 7 and the maximum value of 15 according to Method G-1. That is, the LAA cell 505 selects a random value in the contention period [0, 7] or [1, 7] and senses the channel during the channel sensing operation period. In the case of using Method A-7, if there is a NACK among the data reception results received from the UEs in the duration from the previous channel sensing period 520 to the new channel sensing period 540 or the most recently received data reception result is NACK, the new channel contention period 540 may increase according to Method B-1 or B-2. That is, if the new channel contention period is configured with the exponential increment scheme, it has to increase [0, 15] or [1, 15] to [1, 15] or [0, 31]. In the case of transmitting data having different QoSs, however, the contention period configuration value may vary according to QoS of the data to be transmitted in the new channel occupancy period and the contention period configuration method (e.g. contention period is configured as [0, 7] or [1, 7] with Method G-1) but the number of contention period increments may be maintained. That is, if the VoIP service data are transmitted in the new channel occupancy period, the contention period for the new channel sensing operation may be configured according to the channel sensing period configuration for the VoIP service. In the case of using Method A-7, however, if there is a NACK among the data reception results received from the UEs in the duration from the previous channel sensing period 520 till right before the new channel sensing period 540 or the most recently received data reception result is NACK, the new channel contention period 540 should be increased and thus the contention period for the new channel sensing operation increases from [0, 7] or [1, 7] to [0, 15] or [1, 15]. That is, the contention period for the channel sensing operation may be configured differently depending on QoS, but the number of contention period increments may be configured regardless of QoS. For example, if the contention period is increased from [0, 15] to [0, 31] and then to [0, 63], the number of contention period increments is 2. If the contention period is initialized from [0, 63] to the initial value, the number of contention period increments is 0. That is, in the case that there is a NACK among the data reception results received from the UEs in the duration from the previous channel sensing period 520 till right before the new channel sensing period 540 or the most recently received data reception result is NACK, if it is necessary to increase the contention period according to Method B-1 or B-2, it may be possible to configure the new channel contention period 540 by applying the number of contention period increments which is increase by 1 in comparison to the number of previous contention period increments. That is, if the number of contention period increments in the previous channel sensing period 520 is 2, if there is a NACK among the data reception results received from the UEs in the duration from the previous channel sensing period 520 till right before the new channel sensing period 540 or the most recently received data reception result is NACK, and if it is necessary to increase the contention period according to Method B-1 or B-2, it may be possible to configure the new channel contention period 540 by applying the number of contention period increments of 3. That is, the contention period becomes [0, 127].

Embodiment 2

Referring to FIGS. 4 and 5, descriptions are made of the DL channel sensing operation and channel access method for DL transmission of the LAA cell and the channel sensing operation for UL transmission and channel access method of the LAA UE from the viewpoint of the UE 510 which is receiving data from the LAA cells 505 and 510 with reference to FIG. 5. The LAA cell 505 performs channel sensing operation 520 to occupy the channel in the idle state. At this time, the channel sensing operation 520 may be performed using at least one of the operations at operations 403, 408, and 413 of FIG. 4. At this time, the maximum occupancy time allowed for the channel is denoted by reference number 530. The signal 525 may be transmitted until the start point of the subframe 515 according to the channel occupancy start time. Afterward, the LAA cell 505 may transmit data scheduled to the UEs in the channel occupancy duration 530. From the viewpoint of UE1 510, it receives data in subframes n, n+1, n+3, and n+4 in the channel occupancy time 530. At this time, the LAA cell 505 may transmit data to UE1 510 and UE2 511 simultaneously using different frequency resources (e.g. different resource blocks). In the FDD system, the UE1 510 and UE2 511 receives data in subframe n and transmits data reception results 550 and 555 respectively to the eNB at subframe n+4. The eNB may retransmit the data according to the data reception results. That is, after transmitting the data to the UE1 510 and UE2 511 in the channel occupancy time 530, the eNB may receive the data reception results from the UEs during the period from subframe n+4 to subframe n+8. At this time, the eNB may configure a contention period for channel sensing operation depending on the data reception results from the UEs.

Although the description is made based on the transmission relationship between data transmission time of the LAA cell and the data reception result transmission time of the UEs assuming the LAA cell and UE operating in the FDD mode for explanation convenience, the methods according to the above embodiment can be applied to the LAA cell and UE operating in the TDD mode identically according to the predefined time (e.g. HARQ feedback timing specified in TS36.213).

In the case of the LAA cell operating in the FDD mode, the UE1 510 and UE2 515 which receive data at subframe n transmit corresponding data reception results 550 and 555 to the eNB at subframe n+4 respectively. The eNB may receive the data reception results from the UEs in the duration [n+4~n+8]. At this time, the period for receiving A/N from the UEs for contention period configuration (hereinafter, referred to as contention period configuration reference time) is configured as follows.

Method A-1: Time at which the LAA cell receives data reception results from part or all of the UEs in correspondence to all data transmitted within the channel occupancy time of the LAA cell.

Method A-2: Time at which the LAA cell receives data reception results from part or all of the UEs in correspondence to the data transmitted at the last data transmission timing within the channel occupancy time of the LAA cell.

Method A-3: Time at which the LAA cell receives data perception ACKs from part or all of the UEs in correspondence to the data transmitted at the first data transmission timing within the channel occupancy time of the LAA cell.

Method A-4: Time at which the LAA cell receives data reception results from part or all of the UEs in correspondence to the data transmitted at a specific timing within the channel occupancy time of the LAA cell.

Method A-5: Time at which the LAA cell receives data reception results from part or all of the UEs in correspondence to the data transmitted before or after a specific time within the channel occupancy time of the LAA cell.

Method A-6: Predefined or configured time

Method A-7: Time at which the LAA cell receives data reception results or the latest data reception result from part or all of the UEs before a new channel sensing operation start time Although the channel sensing operation start time has been described under the assumption that a random variable is selected, right before the channel sensing operation start time, to configure the channel sensing period necessary for perform new channel sensing operation, if the real channel sensing operation start time and the time at which the random variable is selected in the contention period for the channel sensing period configuration mismatch, the above described method may be applied based on the time of selecting the random variable within the contention period for configuring the channel sensing period configuration.

For the case where the LAA cell receives no data reception results corresponding to data which it has transmitted in the channel occupancy period before the new channel sensing operation execution time point or the UE receives no data reception result corresponding to the UL data or the LAA cell receives all data reception results corresponding to the DL data transmitted in the channel occupancy period before the new channel sensing operation execution time point, it may be possible to apply different contention period configuration methods. A description is made with a DL example hereinafter. If the LAA cell receives all data reception results from the UEs in correspondence to the DL data transmitted in the channel occupancy duration before the new channel sensing operation start time, it may configure the contention period for a new channel occupancy period based on the all or part of the data reception results in correspondence to the DL data transmitted in the channel occupancy period (e.g. Method A-1). If the LAA cell does not receive all data reception results from the UEs in correspondence to the DL data transmitted in the channel occupancy duration before the new channel sensing operation start time, it may configure the contention period for a new channel occupancy period based on part of the data reception results from the UEs in correspondence to the DL data transmitted in the previous channel occupancy period like Method A-7.

It is also possible to configure such that the new channel sensing operation start time of the LAA cell arrives after receiving all of the ACKs corresponding to the DL data transmitted in the previous channel occupancy period.

A description is made of Method A-1 hereinafter with reference to FIG. 5. The LAA cell 505 receives the data reception result (ACK/NACK) corresponding to the data transmitted by the LAA in the channel occupancy duration 530 cell from the UEs in the duration [n+4~n+8]. Accordingly, the period in which the LAA cell receives the data reception result corresponding to the data transmitted in a specific channel occupancy period can be configured as the contention period configuration time. At this time, the DL data reception result corresponding to the DL data transmitted during a period shorter than a normal LTE subframe (1 ms) may not be included in the contention period configuration reference time for configuring the contention period. If there is at least one NACK among the DL data reception results corresponding to the data transmitted in the channel occupancy period of the LAA cell, the LAA cell may increase or maintain the contention period. If there is no NACK among the DL data reception results corresponding to the data transmitted in the channel occupancy period of the LAA cell, the LAA cell may maintain or decrease the contention period. At this time, it may be possible to use the initial contention period.

A description is made of Method A-2 hereinafter with reference to FIG. 5. The LAA cell 505 receives data reception results corresponding to the data transmitted by the LAA in the channel occupancy duration 530 from the UEs in the duration [n+4~n+8]. At this time, the LAA cell may configure the last data transmission time requiring A/N transmission in the channel occupancy period 530 or the subframe n+8 at which the data reception result corresponding to the data transmitted at last subframe n+4 having the length of 1 ms as the contention period configuration reference time for contention period configuration. At this time, the reception result corresponding to the data transmitted in a time period shorter than a normal LTE subframe (1 ms) is not included in the contention period configuration reference time for configuring the contention period. If at least one NACK is received at the contention period configuration reference time for configuring the contention period, the LAA cell may increase or maintain the contention period. If no NACK is received at the contention period configuration reference time for configuring the contention period, the LAA cell may maintain or decrease the contention period. At this time, it may be possible to use the initial contention period.

Referring to FIG. 5, a description is made of Method A-3. The LAA 505 receives data reception results corresponding to the data transmitted by the LAA in the channel occupancy period 530 from the UEs in the duration [n+4~n+8]. At this time, the LAA cell configures the first data transmission time required for transmitting A/N in the channel occupancy period 530 or a time point when the data reception result corresponding to the data transmitted at the first subframe n is received as the contention period configuration reference time for configuring the contention period. At this time, the reception result corresponding to the data transmitted in a time period shorter than a normal LTE subframe (1 ms) is not included in the contention period configuration reference time for configuring the contention period. If at least one NACK is received at the contention period configuration reference time for configuring the contention period, the LAA cell may increase or maintain the contention period. If no NACK is received at the contention period configuration reference time for configuring the contention period, the LAA cell may maintain or decreases the contention period. At this time, it may be possible to use the initial contention period.

A description is made of Method A-4 and method A-5 hereinafter with reference to FIG. 5. The LAA cell 505 receives the data reception results corresponding to the data transmitted in the channel occupancy period 530 from the UEs in the duration [n+4~n+8]. At this time, the LAA cell may configure a duration for receiving the data reception results corresponding to the data transmitted in a specific subframe at the data transmission time requiring A/N transmission in the channel occupancy duration 530 or transmitted before or after the specific subframe as the contention period configuration reference time. For example, the contention period configuration reference time may be configured according to the A/N transmission time relationship of the UE which is predefined between the LAA cell and the UE. That is, in the case of FDD, the A/N transmission time of the UE which is predefined between the LAA cell and UE is 4 ms after data transmission time of the LAA cell. Accordingly, the LAA cell may configure the contention period configuration reference time using the A/N transmission time relationship of the UE based on the channel occupancy period 530. For example, a subframe before the A/N transmission time relationship of the UE which is defined based on the last data transmission time (or the last subframe having the length of 1 ms) of the channel occupancy period 530 may be configured as the contention period configuration reference time. That is, the subframe before the A/N transmission relationship (4 m) corresponding to the last channel occupancy time n+4 as denoted by reference number 530 of FIG. 5, i.e. the A/N transmission time n+4 corresponding to subframe n, may be configured as the contention period configure reference time. That is, if the LAA cell occupies the channel for 10 ms (n~n+10), it is possible to configure the contention period using the reception result corresponding to the data transmitted to the UE at n+6. If at least one NACK is received in the contention period configuration reference time for configuring the contention period, the LAA cell may increase or maintain the contention period. If no NACK is received at the contention period configuration reference time for configuring the contention period, the LAA cell may maintain or decrease the contention period. At this time, it may be possible to use the initial contention period.

Referring to FIG. 5, a description is made of Method A-6. The LAA cell 505 may configure the time A preconfigured based on the time n when data transmission starts in the channel occupancy period 530 or the time n+4 when the data reception results are transmitted by the UEs or configured by the LAA as the contention period configuration reference time. For example, if A=100 ms, the LAA cell may configure the duration (n+100 or n+104) in the range of 100 ms based on the time n when the LAA transmits data of the time n+4 when the data reception result corresponding to the transmitted data is received as the contention period configuration reference time.

A description is made of the Method of A-7 with reference to FIG. 5. The LAA 505 operating in the FDD mode receives the channel reception results in the duration [n+4~n+8] in correspondence to the data transmitted by the LAA 505 to the UEs 510 and 511 in the channel occupancy time 530.

At this time, with reference to FIG. 5, the LAA cell 505 may configure the contention period for a new channel sensing operation 540 based on the reception results received from the UEs in the duration starting from the previous channel sensing operation start time till right before the new channel sensing operation 540 in correspondence to the DL data transmitted by the LAA cell in the unlicensed band, or the latest data reception results 550 and 555. That is, the LAA cell may configure time n+4 when the reception results corresponding to the DL data transmitted by the LAA cell in the unlicensed band are received as the contention period configuration reference time for configuring the contention period. In other words, the LAA cell 505 may configure the contention period for the new channel sensing operation 540 based on the data reception results received from the UEs before the new channel sensing operation 540 is started for reoccupying the unlicensed band (e.g. before the random variable N necessary for performing the new channel sensing operation 540 at operation 407 shown in FIG. 4 is selected) or the latest one of the data reception results. That is, if at least one NACK 555 is included in the data reception results 550 and 555 or in the latest one of the reception results 550 and 555 received between the previous channel sensing period 520 and the new channel sensing period 540, the LAA cell may configure the contention period to be longer than or equal to the previous contention period. If no NACK is included in the data reception results 550 and 555 or in the latest one of the reception results 550 and 555 received between the previous channel sensing period 520 and the new channel sensing period 540, the LAA cell may configure the contention period to be equal to or less than the previous contention period. At this time, the LAA cell may configure the contention period for the new channel sensing period 540 as the initial contention period.

At this time, the LAA cell may use the A/N information received from part or all of the UEs at the configured contention period configuration reference time for configuration of the contention period. For example, it is possible to configure all UEs transmitting the data reception results in the contention configuration time as the contention period change reference UEs. In another example, it is possible to configure UEs selected, based on the channel quality information (or allocated MCS value), among all UEs transmitting the data reception results in the contention period configuration reference time as the contention period change reference UEs. For example, it may be possible to configure the UEs configured with the lowest MCS or preconfigured or allocated an MCS in the range selected by the LAA cell as the contention period change reference UE. That is, the UE having a low MCS may be regarded as a victim of significant interferences from the neighboring devices so as to be used as the contention period change reference. It may be also possible to configure the UE which transmits measured channel information to the LAA cell most recently or which transmits a signal predefined for reporting the UE channel condition (e.g. RSSI) among the UEs transmitting data reception results in the contention period configuration reference time as the contention period change reference UE. The contention period configuration reference UE may be configured based on one or any combination of the above methods.

Also, the contention period configuration reference time may be configured in such a way of combining or extending the aforementioned method as well as applying each method without modification. For example, the contention period configuration reference time may be configured based on the channel occupancy time of at least one LAA cells in Method A-1. For example, a period corresponding to two channel occupancy periods 530 and 535 may be configured as the contention period configuration reference time. The aforementioned methods and cases are just examples but the present disclosure is not limited thereto. That is, although Methods A-1 to A-6 are directed to the cases of configuring the contention period configuration reference time for contention period configuration based on one channel occupancy time, it may be possible to configure the contention period configuration reference time corresponding to at least one channel occupancy period as the contention period configuration reference time for the contention period configuration.

The LAA cell may configure the contention period for the second channel sensing operation based on part or all of the data reception results transmitted by the UEs using at least one or any combination of the above method. At this time, the contention period change method is described in association with the application to the channel sensing operation based on the ACK/NACK received from the UEs in association with the second channel sensing operation, but it may also be used to change at least one of the first and third channel sensing operation criteria using the contention period change method or at least one of the criteria. For example, it is determined that it is necessary to change the contention period using the methods to be described hereinafter, it may be possible to change at least one of the first or third channel sensing operation criteria (e g channel sensing reference time) according to a predetermined method or set to other values. The LAA cell applies a contention period change method to the second channel sensing operation using the contention period configuration reference time and ACK/NACK received from the contention period configuration reference UE as follows.

Method B-1: If at least one NACK is received from the contention period configuration reference UE during the contention period configuration reference time, then it maintains or changes the contention period applied to the next second channel sensing operation.

Method B-2: Maintain or change the contention period applied to the next second channel sensing operation based on the number or ratio of NACKs (or ACKs) received from the contention period configuration reference UE during the contention period configuration reference time.

A description is made of Method B-1 in detail hereinafter with reference to FIG. 5. In the case that the contention period configuration reference time is configured to [n+4~n+8] corresponding to the channel occupancy time 530 as in Method A-1 and all UEs which transmit data reception results in the contention period configuration reference time as the contention period configuration reference UEs, the LAA cell receives the NACK 555 from the UE2 511 during the configured contention period configuration reference time and thus may change (e.g. increase) the contention period. At this time, the contention period may be changed exponentially (i.e., 16→32→64→128, . . . , →1024). That is, the contention period may increase exponentially from the minimum contention period value (or initial value) of 16 to the maximum contention period value of 1024. The exponential increment method is just an example, and it is possible to use a linear increment method or a method of selecting one of the preconfigured contention period candidate values (or a set of values {16, 32, 64, 256, 1024}) sequentially or randomly. If neither ACK nor NACK is received from the contention period configuration reference UEs in the configured contention period configuration reference time, the LAA cell may assume receipt of NACK and increase the contention period. If neither ACK nor NACK is received from the contention period configuration reference UEs in the contention period configuration reference time configured as above, the LAA cell may reuse the previously configured contention period without change or initialize the content period to the initial length. If one or more NACK is not received from the contention period configuration reference UEs in the configured contention period configuration reference time or if all of the received are ACKs received, the LAA cell may change (e.g. decrease) the contention period. At this time, the contention period may be maintained as a predetermined length or decreased exponentially (e.g., 1024→512→ . . . →32→16). At this time, the exponential decrement method is just an example, and it may be possible to use a linear decrement method or a method of selecting one of the preconfigured contention period candidate values (or a set of values {16, 32, 64, 256, 1024}) sequentially or randomly. The aforementioned contention period value denotes the maximum value of the contention period. However, the minimum contention period value may also be configured in the aforementioned method. For example, a description thereof is made under the assumption of the initial contention period configuration period of [1, 16]. If at least one NACK is received from the contention period configuration reference UE during the contention period configuration reference time, the LAA may change the contention period to be applied to the subsequent channel sensing operation to [1, 32]. Alternatively, it may be possible to change the maximum value of the previous contention period with the maximum value of the contention period. In the above example, the contention period may be set to [16, 32]. Changing from the maximum value of the contention period to the minimum value of the contention period is just an example, and it may also be possible to set the contention period to the minimum value in various ways. For example, it is possible to set the contention period to a fixed minimum value of 0 or 1 which is predefined.

Referring to FIG. 5, a description is made of Method B-2 in detail. If the contention period configuration reference time of the LAA cell is set to (n+4~n+8) corresponding to the channel occupancy time 530 of the LAA cell and if all UEs which transmit data reception results in the contention period configuration reference time is configured as the contention period configuration reference UEs, the eNB receives 1 NACK 555 from the UE2 511 during the contention period configuration reference time configured as shown in FIG. 5. If it is determined that when the number of NACKs is equal to or greater than K (e.g. K=2) or when the percentage of NACKs is equal to or greater than P % (e.g. 10%) the contention period change reference is configured in Method B-2, the contention period may not be changed but be maintained or may be decreased or initialized to the initial length in the example of FIG. 5. If the number or percentage of the NACKs received from the contention period configuration reference UEs during the contention period configuration reference time configured as above is equal to or K or P %, the LAA cell may maintain or increase the contention period. The contention period may be increased exponentially (e.g., 16→32→64→128→ . . . 4 1024) or decreased exponentially (e.g., 1024→ 512→ . . . →32→16). The exponential increment and decrement methods are just examples, and it may be possible to use a linear increment or decrement method or a method of selecting one of the preconfigured contention period candidate values (or a set of values {16, 32, 64, 256, 1024}) sequentially or randomly. If neither ACK nor NACK is received from the contention period configuration UEs during the contention period configuration reference time as configured above, the LAA cell may assume the receipt of NACK to increase the contention period or reuse the preconfigured contention period. At this time, the LAA cell may change the contention period even when the condition of Method B-2 is not fulfilled. That is, although the contention period change condition is configured to be fulfilled when the number of NACKs received from the contention period configuration reference UE during the contention period configuration reference time is equal to or greater than 2 in Method B-2, if neither ACK nor NACK is received from the contention period configuration reference UEs during the contention period configuration reference time, the LAA may change the contention period according to the configured threshold or regardless of the configured threshold. Also, if it is configured that when the number or percentage of the received NACKs is equal to or greater than K or P % the contention period is changed in Method B-2, the contention period may be changed according to the number or percentage of the received NACKs. For example, if the percentage of NACKs among the data reception results received from the UEs during the previous data transmission period is P % or if the percentage of the NACKs among the data reception results received during the period starting from the previous channel sensing period start time and ending right before the new channel sensing period start time or starting from the time when generating a random variable (e.g. random backoff number) for the previous channel sensing period and ending right before the time when generating a random variable (e.g., random backoff number) of the new channel sensing period operation is P %, the contention period may increase as much as P % from the previous contention period. In more detail, if an exponential increment method (e.g., 16→32→64→128→ . . . →1024) or an exponential decrement method (e.g., 1024→ 512→ . . . →32→16) is used for the contention period and if the percentage of NACKs among the data reception results received from part or all of the UEs during the period from the previous channel sensing operation start time to the new channel sensing operation start time is 40% (e.g., 4 of 10 A/N values are NACKs) as in Method A-7, it may be possible to increase the contention period for the new channel sensing operation as much as 40% (22.4, 22, or 23) in comparison to the previous channel contention period (e.g., 16). At this time, the increased contention period may be rounded off to an integer. If the percentage of NACKs of the data reception results received from part or all of the UEs during a period the previous channel sensing operation start time to the new channel sensing operation start time is higher than a predetermined threshold value (e.g. 50%), it may be possible to increase the contention period (16→32) regardless of the percentage of NACKs. At this time, if the number of NACKs is equal to or less than (or less than) K or the percentage of the NACKs is equal to or less than (or less than) P % (K and P may be 0), the contention period for the new channel sensing operation is set to the same value as the previous contention period or initialized to the initial length.

As described above, if neither ACK nor NACK is received from the contention period configuration reference UEs during the contention period configuration reference time (DTX), the LAA cell assumes receipt of NACK to increase the contention period according to the contention period determination criteria or reuse the previously configured contention period. A description is mad of the case where the LAA cell receives neither ACK nor NACK from the contention period configuration reference UEs during the configured contention period configuration reference time in more detail hereinafter. The LAA cell performs DL data transmission to the UE in the channel occupancy period, and the UE which receives the data transmits to the LAA cell the data reception result through one of the licensed band or the unlicensed band through which the data has been received or another unlicensed band. Typically, the LAA cell sends the UE a DL control channel (PDCCH) carrying DL data scheduling information for transmitting DL data (PDSCH). The UE checks the scheduling information included in the UL control channel and performs DL data reception operation as scheduled. However, if the UE does not receive the control channel carrying the scheduling information through the DL control channel, it determines that it has not been scheduled by the LAA cell and thus neither perform the DL data reception operation nor transmit any data reception result. Also, it may be possible that the LAA cell has transmitted the scheduling information to the UE through the DL control channel and the UE checks the scheduling information received through the DL control channel and transmits the data reception result to the LAA cell through a licensed band or an unlicensed band but the LAA cell does not receive the data reception result. At this time, if the UE is configured to transmit the data reception result through the licensed band and if the LAA cell receives neither ACK nor NACK from the contention period configuration reference UEs during the contention period configuration reference time (DTX), it may be possible not to increase the contention period for unlicensed band channel sensing but to maintain the previous contention period or use the initial value. Also, if the LAA cell receives the DTX or NACK/DTX from the contention period configuration reference UEs during the contention period configuration reference time, it regards the receipt of the DTX or NACK/DTX as the receipt of NACK or distinguishes between the NACK/DTX and DTX. For example, since LAA cell cannot identify whether the NACK/DTX information is NACK or DTX transmitted by the LAA UE, it interprets the NACK/DTX as NACK and the DTX as not receiving ACK/NACK so as not to be included in determining the contention period. That is, the DTX may be excluded in determining the contention period. For more details on ACK, NACK, NACK/DTX, and DTX configuration and transmission method, see TS36.211, TS36.212, and TS36.213. For example, a UE configured to transmit ACK/NACK information to the LAA with 2 antenna ports and PUCCH format 1b with channel selection can transmit to the LAA cell four types of reception status information of ACK, NACK, DTX, and NACK/DTX. At this time, the LAA cell may interpret the DTX and NACK/DTX information as NACK or distinguish NACK/DTX and DTX among the ACK/NACK status information types. For example, since the LAA cell cannot identify whether the NACK/DTX information transmitted by the LAA UE is NACK or DTX, it interprets the NACK/DTX as NACK and the DTX as not receiving ACK/NACK so as to be excluded in determining the contention period. At this time, it may be possible to interpret both the NACK/DTX and DTX as not receiving ACK/NACK so as to be excluded in determining the contention period.

If the LAA UE which is configured with the ACK/NACK information transmission scheme for cell 1 and cell 2 with the PUCCH format 1b with channel selection does not receive PDCCH scheduling PDSCH to the cell 1 and cell 2 (DTX) or if the combination of ACK/NACK information for cell 1 and cell 2 includes only DTX or NACK/DTX without ACK and NACK, the LAA cell does not transmit any ACK/NACK information to the LAA cell (no transmission).

The LAA UE configured with the PUCCH format 1b with channel selection does not transmit ACK/NACK information, and the LAA cell which has not received the ACK/NACK information from the LAA UE interprets the DTX or NACK/DTX as not receiving ACK/NACK so as not to be included in determining the contention period. At this time, it may be possible to interpret both the DTX and NACK/DTX for the LAA cell as NACK or distinguish between NACK/DTX and DTX. For example, since the LAA cell cannot identify whether the NACK/DTX information is NACK or DTX transmitted by the LAA UE, it interprets the NACK/DTX as NACK and the DTX as not receiving ACK/NACK so as not to be included in determining the contention period. At this time, assuming that cell 1 is a licensed band cell (licensed carrier and cell 2 as an LAA cell, if the LAA UE configured with the PUCCH format 1b with channel selection determines cell 1 as DTX and cell 2 as NACK/DTX, the LAA UE may transmit no ACK/NACK information to the LAA cell. In this case, the LAA cell cannot identify whether the NACK/DTX information is NACK or DTX for cell 2 of the LAA UE, it interprets the NACK/DTX as NACK so as to be included in determining the contention period.

The contention period may be changed according to the above described criteria and schemes in such a way of comparing the data reception results received from the contention period configuration reference UEs during the configuration period configuration reference time with the contention period channel threshold set by the LAA cell to determine whether to change the contention period and changing the contention period based on the determination result and contention period change scheme. However, since a new channel sensing operation 630 may be executed before the change of the contention period, there is a need of a contention period configuration method for the channel sensing operation 630 executed before the contention period change time point.

Referring to FIG. 6, the LAA cell 600 performs the channel sensing operation 610 during the preconfigured contention period to determine whether the channel is occupied, for data transmission to the UE 605. If it is determined that the channel is idle, the LAA cell 600 occupies the channel during the configured channel occupancy period 620 or predetermined or preconfigured maximum channel occupancy period to transmit data to the UE 605. At this time, it is assumed that the contention period configuration reference time of the LAA cell is configured with Method A-2, the contention period configuration reference UEs are all UEs which transmit data reception results during the contention period configuration reference time, and the contention period change method is Method B-1. That is, the LAA cell 600 changes the contention period based on the A/N 674 corresponding to the last subframe among the A/N's corresponding to data transmitted during the channel occupancy period 620. The LAA cell 600 may perform the channel sensing operation 630 to secure further channel occupancy period 640 before receipt of the A/N 674 for the channel sensing period 620, i.e. before the changed contention period application timing. In the typical Wi-Fi operation, the contention period is changed for reoccupying the channel. That is, the contention period may increase or decrease according to the data reception results of the UEs during the channel occupancy period. However, since the LAA cell 600 may perform the channel sensing operation 630 before the contention period is changed, it is necessary to configure the contention period for the channel sensing operation 630 which is performed before the changed contention period application timing.

The contention period may be configured for the channel sensing operation 630, which is performed before the contention period change timing, as follows.

Method C-1: Reuse contention period configured for previous channel occupancy

Method C-2: Use initial value of contention period

Method C-3: Change according to UE reception performance received before channel sensing operation Method C-4: Use predefined contention period Method C-1 is described hereinafter in more detail. As shown in FIG. 6, the contention period for the channel sensing operation 630 executed before the changed contention period application timing may be configured to be identical with the contention period used for the latest channel sensing operation 610. Alternatively, the contention period for the channel sensing operation 630 which is performed before the changed contention period application timing is configured to use the initial value of the contention period as in Method C-2 or to use a predetermined period as in Method C-4. Alternatively, the contention period may be changed based on the A/N information received from the UEs before the channel sensing operation 630 which is performed before the changed contention period application timing. At this time, it may be possible to change the contention period based on the A/N information received from the UEs by excluding at least one of the configured contention period configuration reference time and the contention period configuration reference UE or changing the method.

With reference to FIG. 6, the LAA cell 600 may perform the channel sensing operation 650 to further occupy the channel after the channel occupancy period 640. At this time, the channel sensing operation 650 may be performed based on the previously changed contention period.

In addition, the LAA cell 600 may use another contention period, other than the previously changed contention period, for the channel sensing operation after the contention period change time point. That is, it may be possible to perform the channel sensing operation by not using the previously changed contention period or using a separately defined contention period according to the type of the signal which the LAA 600 wants to transmit on the occupied channel.

For example, it may be possible to perform the channel sensing operation with another contention period configured for the channel occupancy to transmit a control channel (e.g. (E)PDCCH, Discovery RS, SRS, and CSI-RS as denoted by reference number 685 of FIG. 6) without common data transmission (PDSCH/PUSCH) as denoted by reference numbers 620, 640, and 660 and UE-specific data transmission. For example, in the case of attempting channel occupancy for transmitting a control channel (e.g. (E)PDCCH, Discovery RS, SRS, and CSI-RS as denoted by reference number 685 of FIG. 6) without UE-specific data transmission, it may be possible to use another contention period 680 different from the previously change contention period. For example, it may be possible to perform the channel sensing operation using the initially configured contention period or the contention period configured separately for transmitting control information for transmitting a control channel (e.g. (E)PDCCH, Discovery RS, SRS, and CSI-RS as denoted by reference number 685 of FIG. 6) without UE-specific data transmission. At this time, it may be possible to occupy the channel to transmit the control channel without extra channel sensing operation. It may also be possible to occupy the channel without at least one of the first to third channel sensing operations. It may also be possible to perform the channel sensing operation for transmitting control information (e.g. (E)PDCCH, Discovery RS, SRS, and CSI-RS as denoted by reference number 685 of FIG. 6) without UE-specific data transmission by setting at least one of the first to third channel sensing operation thresholds to the minimum value. If it is necessary to occupy the channel for normal data transmission 695 after the channel occupancy for control channel transmission, the LAA cell 600 may perform the channel sensing operation with the previously configured contention period (e.g., contention period changed through the channel occupancy period 660), the contention period 650 used for channel occupancy for previous data transmission, or the initial contention period.

Method C-3 is described hereinafter in more detail with reference to FIG. 6. The LAA cell 600 operating in the FDD mode may receive the data reception results 670,671,672, and 673 corresponding to the data, which have transmitted to the UE 605 during the channel occupancy period 620, within the period [n+4~n+8]. Although the description is made with a relationship between the data transmission time of the LAA cell and the data reception result transmission time of the UE under the assumption of the LAA cell and LAA UE, it may be possible to apply all of the methods proposed in the above embodiments to the communication between the LAA cell and UEs operating in the TDD mode according to a predefined timing (e.g., HARQ feedback timing defined in TS36.213).

At this time, it may be possible to configure the contention period for the channel sensing operation 630 based on the data reception results received from the UEs till before performing the new channel sensing operation 630 including the previous channel sensing operation 610. At this time, since the LAA cell 600 does not receive the data reception result from the UEs in the duration from the previous channel sensing operation 610 to the new channel sensing operation 630, it may be possible to reuse the contention period configured for the previous channel sensing operation 610, the initial contention period, or a predetermined contention period as the contention period for the new channel sensing operation 630. A description is made of a case where the LAA cell 600 performs the channel sensing operation 630 to occupy the unlicensed band as denoted by reference number 640. The LAA cell 600 receives the data reception results 670, 671, 672, and 673 from the UE 605 in the channel sensing and occupancy periods 630 and 640. If it is necessary to reoccupy the unlicensed band after the channel occupancy period, the LAA cell may perform the new channel sensing operation 650 to reoccupy the unlicensed and. At this time, according to Method C-3, the contention period for the channel sensing operation 650 may be configured based on the data reception results 670, 671, 672, and 673 received in the duration from the start time of the previous channel sensing operation 630 to the start time of the new channel sensing operation 650 or the most recently received data reception result 673. For example, if the data reception result 673 received most recently from the UE in the duration from the start time of the previous channel sensing operation 630 to the start time of the new channel sensing operation 650 is NACK, it may be possible to configure the contention period for the new channel sensing operation 650 by maintaining or increasing the contention period of the previous channel sensing operation exponentially or linearly or selecting one of the preconfigured contention period candidate values. If the data reception result 673 transmitted by the UE is ACK, it may be possible to configure the contention period by maintaining or decreasing the contention period of the previous channel sensing operation 630 exponentially or linearly or selecting one of the preconfigured contention period candidate values.

Figure 7:
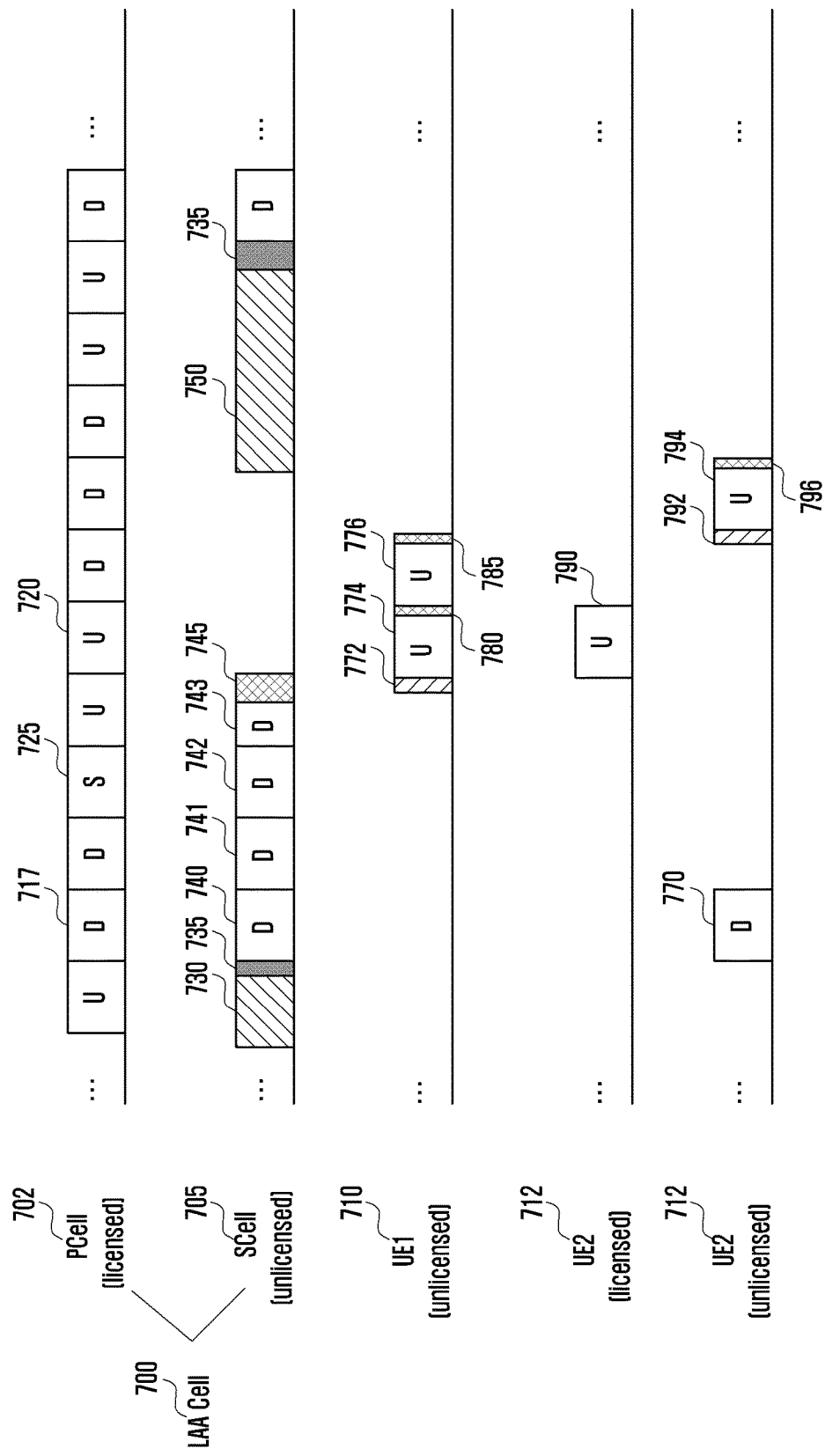
FIG. 7 is a diagram illustrating a contention period configuration method according to various embodiments of the present disclosure.

FIG. 7 is a diagram illustrating a contention period configuration method according to various embodiments of the present disclosure.

Referring to FIG. 7, a description is made of the method for using the unlicensed band for both the UL and between the LAA cell and UE hereinafter with reference to FIG. 7. At this time, this method may be applicable to the case of using the unlicensed band for one of UL and DL between the LAA cell and UE.

The LAA cell 700 configures the cell 702 operating in the licensed band as a PCell and the cell 705 operating in the unlicensed band as a SCell to communicate with the LAA UEs 710 and 712 on the licensed and unlicensed bands. Although the description is directed to the case of a CA aggregating one licensed band and one unlicensed band, it may also be possible to aggregate one or more licensed bands and one or more unlicensed bands according to the capabilities of the LAA cell and LAA UE and minimum values of the LAA cell and UE capabilities. Although FIG. 7 is directed to the case where the PCell is operating in the TDD mode (UL/DL configuration 1, Table 4.2-2 in TS36.211), this embodiment may also be applicable to the cell operating in the FDD mode. The TDD licensed band cell 702 may be comprised of the DL subframe 717, UL subframe 720, and special subframe 725. The structure of the special subframe is out of the scope of the disclosure, detailed description thereof is omitted herein. For detailed description of the special subframe 725 of the TDD cell operating in the licensed band, see the LTE standard TS36.211 and TS36.213. In order to use the SCell 705 operating in the unlicensed band, the LAA cell 700 may perform the channel sensing operation 730 and transmit a channel occupancy signal or initial signal to occupy the channel in a predefined data or control signal transmission available period as denoted by reference number 735. Although it is assumed that the data or control signal transmission available time is used as start time point of every subframe (or first OFDM symbol of the subframe) in FIG. 7, the data or control signal transmission available time may be predefined or configured through higher layer signaling to include at least the start time of the subframe. After performing the channel sensing operation 730 in the unlicensed band, the LAA SCell 705 occupied the unlicensed band may transmit at least one signal such as DL control channel, DL control signal, DL data, and UL control information in the unlicensed band. For example, the LAA SCell 705 may transmit the DL control channel, DL control signal, and DL data to the UE 710 and the unlicensed band UL control information to the UE 710 in the unlicensed band. At this time, the unlicensed band UL control information of the UEs 710 and 712 may be transmitted to the UE through the licensed band LAA PCell 702 or the unlicensed LAA SCell 705 depending on the LAA cell configuration. If the DL data are received from the LAA SCell 705 in the unlicensed band DL subframe 720, the UE 712 transmits the data reception result (e.g. ACK and NACK) to the LAA PCell 702 using the licensed UL resource predefined or configured by received UL control signal as denoted by reference number 790. If the DL data 779 is received from the LAA SCell 705 in the unlicensed band DL subframe 740, the UE 712 may transmit the data reception result (e.g. ACK and NACK) to the LAA SCell 705 using the unlicensed UL resource predefined or configured by a received UL control signal. If the unlicensed band UL control information is received from the LAA SCell 705 in the DL subframe 740, the UE 710 may perform UL transmission in the unlicensed band using the unlicensed resource and transmission time configured by the LAA SCell 705 (e.g. UL signal transmission timing defined based on the UL control signal reception timing) as denoted by reference number 774. At this time, the UE 710 may perform the unlicensed band channel sensing operation 772 before the UL transmission 774. At this time, the channel sensing operation for unlicensed band UL transmission of the UE may differ from the channel sensing operation 730 for unlicensed band DL transmission of the SCell. For example, the UE may perform the unlicensed band UL transmission without channel sensing operation 772 for the unlicensed band UL transmission. Alternatively, the channel sensing operation for unlicensed band UL transmission of the UE may be performed during a fixed channel sensing time period (e.g. fixed CCA length and predefined number of (E)CCA slots). Alternatively, with reference to FIG. 7, the channel sensing operation 772 for the unlicensed band UL transmission of the UE may be performed with a fixed contention period (e.g. set to minimum value of the contention period) or a period set to a value shorter than the maximum value of the contention period for the channel sensing operation 730 for the unlicensed band DL transmission of the SCell.

At this time, the LAA cell may notify the UE of the reception result corresponding to the UL data through the DL control channel. That is, if the UL data are received from the UE, the LAA cell may send the UE the data reception result along with the UL scheduling information through the DL control channel. At this time, the UE may determine the data reception result corresponding to the UL data based on at least one of new data indicator (NDI), HARQ Process number, and redundancy version (RV) carried in the UL scheduling information transmitted by the LAA cell. For example, if the UL data transmitted by the UE is not received correctly, the LAA cell transmits the scheduling information including the NDI bit which is not toggled to be identical with that of the previous UL scheduling information. That is, since the NDI is toggled when new data is transmitted, the UE may determine the UL data reception result at the LAA cell based on the NDI value. If a RV configuration order for retransmission is predefined, the UE may determine the UL data reception result at the LAA cell according to the RV value included in the UL scheduling information. For example, if the current NDI and RV match the NDI and RV carried in the previous scheduling information, it may be possible to determine that the data reception result is NACK. At this time, the UL data reception result determination based on the NDI and RV may be applied to the same HARQ process number.

At this time, referring to FIG. 7, if the UE needs to perform the channel sensing operation 772 for unlicensed band UL transmission, the LAA SCell 705 may not perform the unlicensed band DL signal or channel transmission during the period of the channel sensing operation 772 for UL transmission of the UE. For example, the LAA SCell 705 may not transmit any DL signal or channel in the unlicensed band for the duration including the period of channel sensing operation 772 for the unlicensed band UL transmission 774. At this time, the period 745 during which the LAA SCell 705 does not transmit any DL signal or channel for unlicensed band channel sensing operation of the UE may be configured to include at least one of channel sensing time of the UE, a period for the UE to transmit a UL signal in advance to compensate for signal transmission/reception delay caused by distance between the LAA cell and the UE (e.g. Timing Advance (TA)), and the time required for the UE to switch from DL reception to UL transmission.

The UE 710 may transmit the UL data or control signal to the LAA cell 700 using the unlicensed UL depending on the result of the unlicensed band channel sensing operation 772 performed before the time of the unlicensed band UL transmission 774 configured by the LAA SCell 705 through the licensed DL 717 or unlicensed DL 740. At this time, the time periods 780, 785 and 796 during the UL transmission 774 of the UE 710 (e.g. last SC-OFDM symbol duration of the UL subframe) may be configured not to transmit the UL signal in order for the UE or other UEs or the LAA cells to perform the channel sensing operation correctly. For example, it may be possible to puncture the last SC-OFDMA symbol or transmit the data or control signal using the UL SC-OFDM symbols with the exception of the last SC-OFDM symbol. At this time, the period in which the UL signal is not transmitted may be predefined or configured by the LAA cell through higher layer signaling. In the case that the LAA cell schedules the UE to perform the UL transmission consecutively in one or more UL subframes, e.g. the UE is scheduled to perform UL transmission in the UL subframes 774 and 776, the UE may transmit UL signals without the period 774 having no UL transmission for channel sensing operation in the consecutive UL subframes. At this time, although the LAA cell schedule the UE to perform UL transmission consecutively in one or more UL subframes, it may always be possible to use the period in which the UL signal for channel sensing operation is not transmitted. In the case that the UE is scheduled to perform the UL transmission consecutively in one or more UL subframe and configured to transmit the UL signal without the period 774 having no UL transmission for channel sensing operation in the consecutive UL subframes, the UE may apply the period 785 having no UL signal transmission for the channel sensing operation in the last UL subframe among the consecutive UL subframes. Also, the UE may receive the information on the UL subframes which can be used with extra channel sensing operation or the information on the available time from the LAA cell through a separate licensed or unlicensed signal or may recognize the information according to the predetermined UL use time of the LAA SCell. In this case, the UE may transmit the UL signal with or without applying the period 796 having no UL signal transmission for channel sensing operation in the last UL subframe among the UL subframe which the LAA SCell can use without channel sensing period.

The LAA SCell 705 which occupies the unlicensed band during the predefined or configured channel occupancy period after performing channel sensing operation 730 has to perform the channel sensing operation 750 for reoccupy the unlicensed band. At this time, the LAA SCell 705 may configure the contention period required for the channel sensing operation 750 in the method B-1 or B-2 or another method based on the DL signal transmission results which the LAA cell 700 receives from the UE through the licensed or unlicensed band or the UL signal transmission result which the LAA cell transmits to the UE through the licensed or unlicensed band in the duration from the start of the previous sensing operation 730 to the start of the channel sensing operation 750.

Method D-1: Configure the contention period based on both the DL signal transmission results which the LAA cell 700 receives from the UE through the licensed or unlicensed band and the UL signal transmission result which the LAA cell transmits to the UE through the licensed or unlicensed band in the duration from the start of the previous sensing operation 730 to the start of the channel sensing operation 750.

Method D-2: Configure the contention period based on the DL signal transmission result which the LAA cell 700 receives most recently from the UE through the licensed or unlicensed band and the UL signal transmission result which the LAA cell transmits most recently to the UE through the licensed or unlicensed band in the duration from the start of the previous sensing operation 730 to the start of the channel sensing operation 750.

Method D-3: Configure the contention period based on the most recently received or transmitted one of the DL transmission result which the LAA cell 700 receives from the UE through the licensed or unlicensed band and the UL signal transmission result which the LAA cell transmits most recently to the UE through the licensed or unlicensed band in the duration from the start of the previous sensing operation 730 to the start of the channel sensing operation 750.

Method D-4: Configure the contention period of the channel sensing operation 750 based on the signal transmission result corresponding to the data carried a specific DL subframe (e.g. first or last DL subframe) of the LAA SCell which the LAA cell 700 receives through the licensed or unlicensed band and the signal transmission result corresponding to the data carried in a specific UL subframe of the UE which the LAA cell transmits through the licensed or licensed band in the duration from the start of the previous sensing operation 730 to the start of the channel sensing operation 750.

Although the channel sensing operation start time has been described under the assumption that a random value for configuring the channel sensing period necessary for performing the channel sensing operation is selected right before starting the channel sensing operation, if the channel sensing operation start time and the time of selecting the random value in the contention period for the channel sensing period configuration mismatch, Method D-1, D-2, D-3, or D4 may be applied based on the timing of selecting the random value in the contention period for the channel sensing period configuration.

Although the DL and UL channel sensing operations and contention period configuration methods have been described from the viewpoint of the LAA cell for explanation convenience, it may be possible to interpret and apply from the viewpoint of the UE because the time point when the LAA cell transmits the UL signal transmission result to the UE through the licensed or unlicensed band matches the time point when the UE receives the signal. For example, it may be possible to change or configure the contention period for a new channel sensing operation at the UE based on the UL signal transmission result which the UE receives from the LAA cell through the licensed or unlicensed band in the duration from the start of the previous sensing operation 730 to the start of the channel sensing operation 750.

A description is made of the example of using Method D-1 hereinafter with reference to FIG. 7. The LAA SCell 705 may configure the contention period of the channel sensing operation 750 based on both the DL signal transmission result which the LAA cell 700 receives from the UE through the licensed or unlicensed band and the UL signal transmission which the LAA cell transmits to the UE through the licensed or unlicensed band in the duration from the start of the previous sensing operation 730 to the start of the channel sensing operation 750. That is, if the DL signal transmission result which the LAA cell 700 receives from the UE through the licensed or unlicensed band and the UL signal transmission result which the LAA cell transmits to the UE through the licensed or unlicensed band in the duration from the start of the previous sensing operation 730 to the start of the channel sensing operation 750 includes at least one NACK, the LAA SCell 705 may increase the contention period for the new channel sensing period 750 so as to be longer than the contention period configured in the previous channel sensing operation 730 or configure or maintain the contention period for the new channel sensing period 750 to be equal to the previously configured contention period. If the DL signal transmission result which the LAA cell 700 receives from the UE through the licensed or unlicensed band and the UL signal transmission result which the LAA cell transmits to the UE through the licensed or unlicensed band in the duration from the start of the previous sensing operation 730 to the start of the channel sensing operation 750 includes no NACK, the LAA SCell 705 may configure or maintain the contention period for the new channel sensing period 750 to be equal to the contention period configured in the previous channel sensing operation 730 or decrease the contention period for the new channel sensing period 750 so as to be shorter than the previously configured contention period. At this time, the LAA cell may set the contention period for the new channel sensing period 750 to the value of the initial contention period or a predefined value.

A description is made of the example of using Method D-2 hereinafter with reference to FIG. 7. The LAA SCell 705 may configure the contention period of the channel sensing operation 750 based on the DL signal transmission result which the LAA cell 700 receives most recently from the UE through the licensed or unlicensed band and the UL signal transmission result which the LAA cell transmits most recently to the UE through the licensed or unlicensed band in the duration from the start of the previous sensing operation 730 to the start of the channel sensing operation 750. At this time, if the LAA SCell 705 receives more than one DL signal transmission result or transmits more than one UL signal transmission result to the UE, it may configure the contention period of the channel sensing operation 750 based on all of the transmission results. At this time, it may be possible to configure the contention period of the channel sensing operation 750 based on part of the transmission results carried in a specific DL subframe of a specific UE or LAA SCell (e.g. the first or last DL subframe) or a specific UL subframe of the UE (e.g. the first or last UL subframe). That is, if the DL signal transmission result which the LAA cell 700 receives most recently from the UE through the licensed or unlicensed band and the UL signal transmission result which the LAA cell transmits most recently to the UE through the licensed or unlicensed band in the duration from the start of the previous sensing operation 730 to the start of the channel sensing operation 750 includes at least one NACK, the LAA SCell 705 may increase the contention period for the new channel sensing period 750 to be longer than the contention period configured in the channel sensing operation 730 or configure or maintain the contention period to be equal to the previously configured contention period. If the DL signal transmission result which the LAA cell 700 receives most recently from the UE through the licensed or unlicensed band and the UL signal transmission result which the LAA cell transmits most recently to the UE through the licensed or unlicensed band in the duration from the start of the previous sensing operation 730 to the start of the channel sensing operation 750 includes no NACK, the LAA SCell 705 may configure or maintain the contention period for the new channel sensing period 750 to be equal to the contention period configured in the previous channel sensing operation 730 or decrease the contention period for the new channel sensing period 750 to be shorter than the previously configured contention period. At this time, the LAA cell may set the contention period for the new channel sensing period 750 to the value of the initial period or a predetermined value.

A description is made of the example of using Method D-3 hereinafter with reference to FIG. 7. The LAA SCell 705 may configure the contention period of the channel sensing operation 750 based on the most recently received or transmitted one of the DL transmission result which the LAA cell 700 receives from the UE through the licensed or unlicensed band and the UL signal transmission result which the LAA cell transmits most recently to the UE through the licensed or unlicensed band in the duration from the start of the previous sensing operation 730 to the start of the channel sensing operation 750. At this time, if the LAA SCell 705 receives more than one DL signal transmission result from the UE or transmits more than one UL signal transmission result in the same subframe, it may be possible to configure the contention period of the channel sensing operation 750 based on all of the signal transmission results. At this time, it may be possible to configure the contention period of the channel sensing operation 750 based on part of the transmission results carried in a specific DL subframe (e.g. the first or last DL subframe) of the LAA SCell or the transmission results carried in a specific UL subframe (e.g. the first or last UL subframe) of the UE. That is, if the DL signal transmission result which the LAA cell 700 receives most recently from the UE through the licensed or unlicensed band and the UL signal transmission result which the LAA cell transmits most recently to the UE through the licensed or unlicensed band in the duration from the start of the previous sensing operation 730 to the start of the channel sensing operation 750 includes at least one NACK, the LAA SCell 705 may increase the contention period for the new channel sensing period 750 to be longer than the contention period configured in the channel sensing operation 730 or configure or maintain the contention period to be equal to the previously configured contention period. If the DL signal transmission result which the LAA cell 700 receives most recently from the UE through the licensed or unlicensed band and the UL signal transmission result which the LAA cell transmits most recently to the UE through the licensed or unlicensed band in the duration from the start of the previous sensing operation 730 to the start of the channel sensing operation 750 includes no NACK, the LAA SCell 705 may configure or maintain the contention period for the new channel sensing period 750 to be equal to the contention period configured in the previous channel sensing operation 730 or decrease the contention period for the new channel sensing period 750 to be shorter than the previously configured contention period. At this time, the LAA cell may set the contention period for the new channel sensing period 750 to the value of the initial period or a predetermined value.

A description is made of the example of using Method D-4 hereinafter with reference to FIG. 7. The LAA SCell 705 may configure the contention period of the channel sensing operation 750 based on the signal transmission result corresponding to the data carried in a specific DL subframe (e.g. first or last DL subframe) of the LAA SCell which the LAA cell 700 receives through the licensed or unlicensed band and the signal transmission result corresponding to the data carried in a specific UL subframe of the UE which the LAA cell transmits through the licensed or licensed band in the duration from the start of the previous sensing operation 730 to the start of the channel sensing operation 750. At this time, if the LAA SCell 705 receives more than one DL signal transmission result from the UE or transmits more than one UL signal transmission result in the same subframe, it may be possible to configure the contention period of the channel sensing operation 750 based on all of the signal transmission results. At this time, it may be possible to configure the contention period of the channel sensing operation 750 based on the transmission result related to a specific UE among all of the transmission results. That is, if the DL signal transmission result which the LAA cell 700 receives from the UE in correspondence to the data carried in a specific DL subframe through the licensed or unlicensed band and the UL signal transmission result which the LAA cell transmits to the UE in correspondence to the data carried in a specific UL subframe through the licensed or unlicensed band in the duration from the start of the previous sensing operation 730 to the start of the channel sensing operation 750 includes at least one NACK, the LAA SCell 705 may increase the contention period for the new channel sensing period 750 to be longer than the contention period configured in the channel sensing operation 730 or configure or maintain the contention period to be equal to the previously configured contention period. If the DL signal transmission result which the LAA cell 700 receives from the UE in correspondence to the data carried in a specific DL subframe through the licensed or unlicensed band and the UL signal transmission result which the LAA cell transmits to the UE in correspondence to the data carried in a specific UL subframe through the licensed or unlicensed band in the duration from the start of the previous sensing operation 730 to the start of the channel sensing operation 750 includes no NACK, the LAA SCell 705 may configure or maintain the contention period for the new channel sensing period 750 to be equal to the contention period configured in the previous channel sensing operation 730 or decrease the contention period for the new channel sensing period 750 to be shorter than the previously configured contention period. At this time, the LAA cell may set the contention period for the new channel sensing period 750 to the value of the initial period or a predetermined value.

With reference to FIG. 7, if the LAA cell 705 neither receives any DL signal transmission result from the UE nor transmits any UL signal transmission result to the UE through the licensed or unlicensed band in the duration from the end of the previous channel sensing operation 730 to the start of the channel sensing operation 750, the contention period of the channel sensing operation 750 may be configured to maintain or reuse the contention period used for the previous channel sensing operation 730 or set to the initial value or a predefined value of the contention period. The contention period configuration method may change depending on whether the DL signal transmission result or UL signal transmission result is transmitted in the licensed or unlicensed band, if there is neither any DL signal transmission result transmitted by the UE nor UL signal transmission result transmitted by the LAA SCell in the licensed or unlicensed band. In more detail, in the case that the LAA cell 700 is configured to receive the DL signal transmission result of the LAA SCell from the UE in the licensed band and to transmit the UL signal transmission result to the UE in the licensed band in the duration from the end of the channel sensing operation 730 to the start of the channel sensing operation 750, if there is neither the DL signal transmission result received from the UE nor the UL signal transmission result transmitted to the UE, the contention period of the channel sensing operation 750 may be configured to maintain or reuse the contention period used for the previous channel sensing operation 730. In the case that the LAA cell 700 is configured to receive the DL signal transmission result of the LAA SCell from the UE in the licensed band and to transmit the UL signal transmission result to the UE in the unlicensed band in the duration from the end of the channel sensing operation 730 to the start of the channel sensing operation 750, if there is neither the DL signal transmission result received from the UE nor the UL signal transmission result transmitted to the UE, the signal transmission result is regarded as NACK and thus the contention period of the channel sensing operation 750 is configured to be longer than the contention period used for the previous channel sensing operation 730.

If the LAA cell 700 neither receive any DL signal transmission result of the LAA SCell from the UE nor transmit any UL signal transmission result to the UE through the licensed or unlicensed band in the duration from the end of the previous channel sensing operation 730 to the start of the channel sensing operation 750, the contention period of the channel sensing operation 750 may be configured to maintain or reuse the contention period used for the previous channel sensing operation 730 or set to the initial value or a predefined value of the contention period.

Also, if there is no data to transmit in the LAA SCell 705 or if the contention period is not changed during a predefined or configured time period, the contention period for the channel sensing operation may be set to the initial value.

At this time, the method for configuring the contention period required for the channel sensing operation 750 based on at least one of the DL signal transmission result received from the UE and the UL signal transmission result transmitted to the UE through the licensed or unlicensed band in the duration from the start of the previous channel sensing operation 730 to the start of the channel sensing operation 750 may be applied for the UE to configure the contention period and update the contention period based on the signal transmission/reception result in the unlicensed band as described above. At this time, the UE may configure the contention period based on the DL signal reception result corresponding to the signal received in the unlicensed band and the UL signal reception result transmitted by the LAA cell using one of the above methods. The UE may also configure the contention period based on the UL signal transmission result corresponding to the signal which it has transmitted in the unlicensed band, i.e. the UL signal transmission result received from the LAA cell using one of the above method. The UE may also configure the contention period based on the DL signal reception result corresponding to the signal received in the unlicensed band. A description is made of the contention period configuration method of the eNB for the channel sensing operation according to an embodiment of the present disclosure hereinafter with reference to FIG. 8. The eNB configures the contention period configuration criteria at operation 801. A specific time point configured based on whole or part of the A/N transmission period of the UE in the channel occupancy period or an A/N transmission relationship may be configured as the contention period configuration reference time. It may also possible to configure at least one of the DL signal transmission result of the LAA SCell which the LAA cell receives from the UE and the UL signal transmission result of the UE which the LAA cell transmits to the UE in the licensed or unlicensed band during the period between channel sensing operations of the LAA SCell as the contention period reference.

Figure 8:
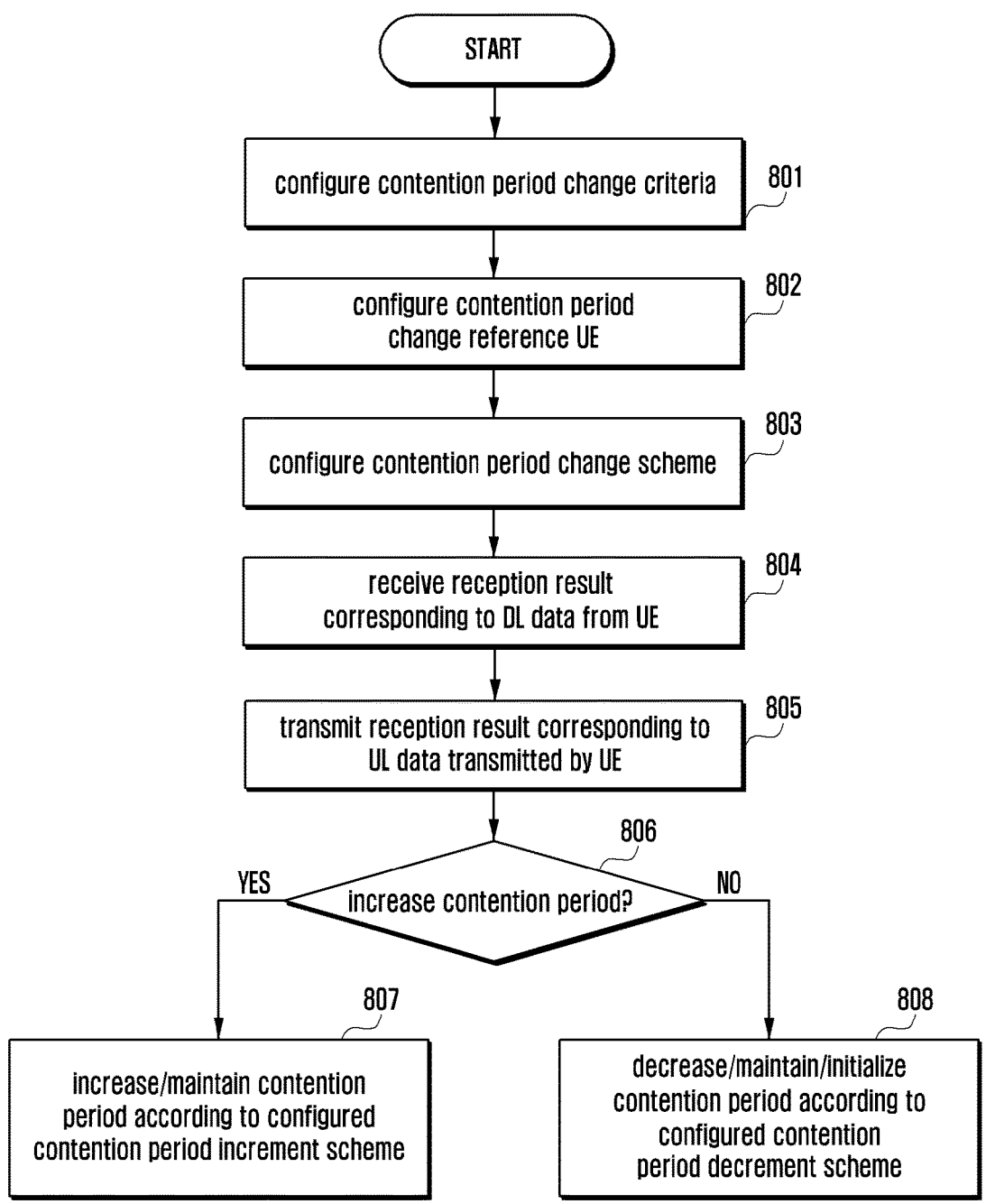
FIG. 8 is a flowchart illustrating a contention period configuration method of an (evolved node B) eNB for channel sensing operation according to various embodiments of the present disclosure.

FIG. 8 is a flowchart illustrating a contention period configuration method of an eNB for channel sensing operation according to various embodiments of the present disclosure.

Referring to FIG. 8, the LAA cell may configure at least one of the minimum and maximum values of the contention period differently depending on the service quality requirements (Quality of Service (QoS)) of the data to be transmitted in the channel occupancy period. In more detail, in the case of providing a real time service such as VoIP and streaming service of which service quality drops due to the data transmission delay, it may be possible to configure the minimum and maximum values of the contention period so as to minimize the contention period for channel sensing required for data transmission. For example, it may be possible to set the minimum and maximum contention period values for VoIP service to 7 and 15 respectively. In the case of providing an FTP service or HTTP service of which service quality is less influenced by data transmission delay, it may be possible to set the minimum and maximum contention periods to values greater than those for the VoIP service. For example, it may be possible to set the minimum and maximum values of the contention period for the FTP service to 15 and 1023 respectively. At this time, if the data transmitted from the LAA cell to the UE in the channel occupancy period include two or more different QoSs, the contention period for the channel sensing operation of the LAA cell may be configured differently depending on the QoS. That is, if the LAA cell transmits multiple data having different QoSs to multiple UEs in the channel occupancy period, the contention period for the channel occupancy operation of the LAA cell may be configured differently as follows.

Method G-1: Configure contention period according to QoS having the least contention period configuration value among multiple QoSs Method G-2: Configure contention period according to QoS having maximum contention period configuration value among multiple QoSs Method G-3: Configure contention period using contention period configuration values of part or all of multiple QoSs For example, it is assumed that the LAA cell transmits data to at least two UEs (e.g., UE1 and UE2). At this time, UE1 is receiving data for a VoIP service, and UE2 is receiving data for a FTP service. The minimum and maximum contention periods for VoIP service are 7 and 15 respectively, and the minimum and maximum contention periods for the FTP service are 15 and 1023 respectively according to QoS. That is, the maximum and minimum contention periods are determined based on the QoS of the service. In the case of transmitting the data for VoIP and FTP services to UE1 and UE2 during the channel occupancy period of the LAA cell, Method G-1 determines the contention period for the channel sensing operation necessary for the channel occupancy period based on the QoS having the least contention period configuration values among the contentions period configuration values for the VoIP and FTP services (e.g. minimum and maximum contention period values of 7 and 15). That is, the contention period may be configured with the minimum contention period value of 7 and maximum contention period value of 15. Method G-2 determines the contention period for the channel sensing operation necessary for the channel sensing period based on the QoS having the greatest contention period configuration value among the contention period configuration values for the VoIP and FTP services (e.g. minimum and maxim contention periods of 15 and 1023). That is, the contention period may be configured with the minimum contention period value of 15 and maximum contention period value of 1023. Method G-3 determines the contention period by averaging the contention period configuration values for the VoIP and FTP services. That is, it may be possible to determine the contention period for the channel sensing operation necessary for the channel occupancy period based on the contention period configuration values for the VoIP and FTP services, e.g. values of (11, 519) obtained by averaging the minimum contention period value (7, 15) and the maximum contention period value (15, 1023).

At this time, the QoS of the data transmitted in the previous channel occupancy period and the QoS of the data to be transmitted in the new channel occupancy period may differ from each other. At this time, it may be possible to configure the contention period for the channel sensing operation performed to occupy the channel newly based on the QoS of the data to be transmitted in the new channel occupancy period. At this time, the contention period for the new channel sensing operation may be configured differently depending on the data reception results transmitted in the previous channel occupancy period. A description is made thereof with reference to FIG. 5. It is assumed that the FTP service data are transmitted to UE1 and UE2 in the previous channel occupancy period 530. At this time, if the contention period for the case of performing the channel sensing operation 520 for the channel occupancy period 530 is configured according to Method G-1 among Methods G-1, G-2, and G-3, the minimum and maximum values of the contention period may be set to 15 and 1023 respectively. If the contention period for the channel sensing operation 520 is set to the minimum value of the contention period, the LAA cell 505 selects a random value in the contention period [0, 15] or [1, 15] and senses the channel during the channel sensing operation period corresponding to the selected value. In the case that the LAA cell transmits data to UE1 and UE2 in the channel occupancy period 530 and then wants to occupy the channel again during the channel occupancy period 535, the LAA cell has to perform the channel sensing operation 540. However, if the VoIP service data are transmitted to the UE3 and UE4 in the channel occupancy period 535, the contention period for the channel sensing operation 540 may be configured with the minimum value of 7 and the maximum value of 15 according to Method G-1. That is, the LAA cell 505 selects a random value in the contention period [0, 7] or [1, 7] and senses the channel during the channel sensing operation period. In the case of using Method A-7, if there is a NACK among the data reception results received from the UEs in the duration from the previous channel sensing period 520 to the new channel sensing period 540 or the mostly recently received data reception result is NACK, the new channel contention period 540 may increase according to Method B-1 or B-2. That is, if the new channel contention period is configured with the exponential increment scheme, it has to increase [0, 15] or [1, 15] to [1, 15] or [0, 31]. In the case of transmitting data having different QoSs, however, the contention period configuration value may vary according to QoS of the data to be transmitted in the new channel occupancy period and the contention period configuration method (e.g. contention period is configured as [0, 7] or [1, 7] with Method G-1) but the number of contention period increments may be maintained. That is, if the VoIP service data are transmitted in the new channel occupancy period, the contention period for the new channel sensing operation may be configured according to the channel sensing period configuration for the VoIP service. In the case of using Method A-7, however, if there is a NACK among the data reception results received from the UEs in the duration from the previous channel sensing period 520 till right before the new channel sensing period 540 or the most recently received data reception result is NACK, the new channel contention period 540 should be increased and thus the contention period for the new channel sensing operation increases from [0, 7] or [1, 7] to [0, 15] or [1, 15]. That is, the contention period for the channel sensing operation may be configured differently depending on QoS, but the number of contention period increments may be configured regardless of QoS. For example, if the contention period is increased from [0, 15] to [0, 31] and then to [0, 63], the number of contention period increments is 2. If the contention period is initialized from [0, 63] to the initial value, the number of contention period increments is 0. That is, in the case that there is a NACK among the data reception results received from the UEs in the duration from the previous channel sensing period 520 till right before the new channel sensing period 540 or the most recently received data reception result is NACK, if it is necessary to increase the contention period according to Method B-1 or B-2, it may be possible to configure the new channel contention period 540 by applying the number of contention period increments which is increased by 1 in comparison to the number of previous contention period increments. That is, if the number of contention period increments in the previous channel sensing period 520 is 2, if there is a NACK among the data reception results received from the UEs in the duration from the previous channel sensing period 520 till right before the new channel sensing period 540 or the most recently received data reception result is NACK, and if it is necessary to increase the contention period according to Method B-1 or B-2, it may be possible to configure the new channel contention period 540 by applying the number of contention period increments of 3. That is, the contention period becomes [0, 127].

Embodiment 3

With reference to FIGS. 4 and 5, descriptions are made of the DL channel sensing operation and channel access method for DL transmission of the LAA cell and the UL channel sensing operation for UL transmission and channel access method of the LAA UE from the viewpoint of the UE1 510 which is receiving data from the LAA cells 505 and 510 with reference to FIG. 5. The LAA cell 505 attempts to occupy the unlicensed band channel for DL data transmission to UE1 510. That is, the LAA cell 505 performs the channel sensing operation 520 and, if it is determined that the channel is idle, performs DL data transmission during the maximum allowed occupancy time in the unlicensed band. At this time, the channel sensing operation 520 may be performed using at least one of operations 403, 408, and 413 of FIG. 4 as described in embodiment 1. From the viewpoint of UE1 510, the UE1 510 may receive the DL data from the LAA cell 505 in subframes n, n+1, n+3, and n+4 of the channel occupancy time 530. At this time, the LAA cell 505 may perform the DL data transmission to multiple UEs using different frequency resources (e.g. Resource Block) or different spatial resources (spatial domain) through MU-MIMO. In the case of the FDD system, UE1 510 and UE2 511 which receive data in subframe n may transmit DL data reception results 550 and 555 to the LAA cell 505 at subframe n+4. The LAA cell 505 may retransmit the DL data depending on the received DL data reception results. That is, the LAA cell 505 which has transmitted the DL data to UE1 510 and UE2 511 during the channel occupancy time 530 may receive the DL data reception results from the UEs in the subframes n+4 to n+8. At this time, the eNB may change the contention period for channel sensing operation based on the received data reception results. Although the description is made based on the transmission relationship between data transmission time of the LAA cell and the data reception result transmission time of the UEs assuming the LAA cell and UE operating in the FDD mode for explanation convenience, the methods according to the above embodiment can be applied to the LAA cell and UE operating in the TDD mode identically according to the predefined time (e.g. HARQ feedback timing specified in TS36.213).

At this time, the contention period for channel sensing operation may be changed (or configured) based on the DL data reception result from the UE as follows.

Method A-1: Use DL data reception results from part or all of the UEs in correspondence to all data transmitted during the channel occupancy time of the LAA cell Method A-2: Use DL data reception results from part or all of the UEs in correspondence to the data transmitted at specific data transmission time during the channel occupancy time of the LAA cell Method A-3: Use data reception results received from part or all of the UEs before the new channel sensing operation start time or the most recently received one of the data reception results Although the channel sensing operation start time has been described under the assumption that a random variable is selected, right before the channel sensing operation start time, to configure the channel sensing period necessary for perform new channel sensing operation, if the real channel sensing operation start time and the time at which the random variable is selected in the contention period for the channel sensing period configuration mismatch, the above described method may be applied based on the time of selecting the random variable within the contention period for configuring the channel sensing period configuration.

For the case where the LAA cell receives no data reception results corresponding to data which it has transmitted in the channel occupancy period before the new channel sensing operation execution time point or the UE receives no data reception result corresponding to the UL data or the LAA cell receives all data reception results corresponding to the DL data transmitted in the channel occupancy period before the new channel sensing operation execution time point, it may be possible to apply different contention period configuration methods. A description is made with a DL example hereinafter. If the LAA cell receives all data reception results from the UEs in correspondence to the DL data transmitted in the channel occupancy duration before the new channel sensing operation start time, it may configure the contention period for a new channel occupancy period based on the all or part of the data reception results in correspondence to the DL data transmitted in the channel occupancy period (e.g. Method A-1). If the LAA cell does not receive all data reception results from the UEs in correspondence to the DL data transmitted in the channel occupancy duration before the new channel sensing operation start time, it may configure the contention period for a new channel occupancy period based on part of the data reception results from the UEs in correspondence to the DL data transmitted in the previous channel occupancy period like Method A-7.

It is also possible to configure such that the new channel sensing operation start time of the LAA cell arrives after receiving all of the ACKs corresponding to the DL data transmitted in the previous channel occupancy period.

A description is made of Method A-1 hereinafter with reference to FIG. 5. The LAA cell 505 receives the data reception result (ACK/NACK) corresponding to the data transmitted by the LAA in the channel occupancy duration 530 from the UEs in the duration [n+4~n+8]. Accordingly, it may be possible to change (or configure) the contention period for new channel sensing operation based on the data reception results corresponding to all data transmitted from the LAA cell to one or more UEs during the channel occupancy period. At this time, the data reception results transmitted in the time duration shorter than a normal LTE subframe (1 ms) may not be included in determining the contention period change reference. If the data reception results corresponding to all data transmitted from the LAA cell to one or more UEs during the channel occupancy period include at least one NACK, the LAA cell may increase the length of the contention period for new channel sensing operation or maintain the previous length of the contention period to be equal to the previous contention period. If the data reception results corresponding to all data transmitted from the LAA cell to one or more UEs during the channel occupancy period include n NACK, the LAA cell maintains the contention period for new channel sensing operation to be equal to the previous contention period or decreases the length of the contention period. At this time, the contention period may be set to the initial value.

Referring to FIG. 5, a description is made of Method A-2. The LAA cell 505 receives data reception results corresponding to the data transmitted by the LAA in the channel occupancy duration 530 from the UEs in the duration [n+4~n+8]. At this time, the LAA may change (or configure) the contention period for use in performing the new channel sensing operation based on the data reception result corresponding to the data transmitted at a specific data transmission timing e.g. the data reception result corresponding to the data transmitted at the last subframe n+4 having the length of 1 ms during the channel occupancy period 530, data reception result corresponding to the data transmitted at the first subframe n having the length of 1 sm during the channel occupancy period 530 of the LAA cell, or the data reception result corresponding to the data transmitted at a subframe predefined or configured according to the A/N transmission time relationship predefined between the LAA cell and UE and channel occupancy period. For example, in the case of FDD mode, the A/N transmission time relationship of the UE predefined between the LAA cell and UE is transmitting A/N 4 ms after the data transmission timing of the LAA cell. Accordingly, if the channel occupancy period of the LAA cell is subframes n to n+10, it may be possible to use the data reception results corresponding to the data transmitted by the LAA cell at a specific subframe n+6 or specific subframe set (e.g. subframe n~n+6). At this time, if the data reception results corresponding to the data transmitted to at least one UE in a predefined or configured specific subframe during the channel occupancy period include at least one NACK, the LAA cell may increase the contention period for performing new channel sensing operation or maintain the contention period to be equal to the previous contention period. If the data reception results corresponding to the data transmitted to at least one UE in a predefined or configured specific subframe during the channel occupancy period include no NACK, the LAA cell may maintain the contention period for performing new channel sensing operation to be equal to the previous contention period or decrease the contention period. At this time, the contention period may be set to the initial contention period value.

With reference to FIG. 5, a description is made of the Method of A-3. The LAA 505 operating in the FDD mode receives the channel reception results in the duration [n+4~n+8] in correspondence to the data transmitted by the LAA 505 to the UEs 510 and 511 in the channel occupancy time 530.

At this time, the LAA cell 505 may configure the contention period for a new channel sensing operation 540 based on the reception results received from the UEs in the duration starting from the previous channel sensing operation start time till right before the new channel sensing operation 540 in correspondence to the DL data transmitted by the LAA in the unlicensed band or the data reception results 550 and 555 that are most recently received from the UEs. That is, it may be possible to change or configure the contention period for the new channel sensing operation based on the data reception result corresponding to the DL data which are received from the UE before the start of the new channel sensing operation or before selecting the random variable N for use in performing the new channel sensing operation 540 or the most recently received one of the data reception results. That is, if at least one NACK 555 is included in the data reception results received in the duration from the previous channel sensing period 520 to the new channel sensing period 540 or in the most recent data reception results 550 and 555 received between the previous channel sensing period 520 and the new channel sensing period 540, the LAA cell may configure the contention period to be longer than or equal to the previous contention period. If no NACK is included in the data reception results or in the most recent data reception results 550 and 555 received between the previous channel sensing period 520 and the new channel sensing period 540, the LAA cell may configure the contention period to be equal to or less than the previous contention period. At this time, the LAA cell may initialize the contention period for the new channel sensing period 540 to the initial contention period.

At this time, although the above descriptions have been made to the cases where the LAA cell changes or configures the contention period for channel sensing operation based on the DL data reception results corresponding to the data transmitted to the UE during one occupancy period, the above methods may be applied in the cases where the LAA cell changes or configures the contention period for the channel sensing operation based on the DL data reception results corresponding to the data transmitted to the UE during a plurality of channel occupancy periods. For example, Method-1 may be used for changing or reconfiguring the contention period based on the DL data reception results corresponding to the data transmitted to the UE during the two channel occupancy periods 530 and 535.

At this time, the LAA cell may uses the A/N information received from part or all of the UEs as the contention period change reference. For example, some UEs selected from all of the UEs which have transmitted the data reception results based on the channel quality information or allocated MCS value may be configured as the contention period change reference UEs according to the contention period change method. For example, the UEs allocated lowest MCS or the MCSs in a range selected by the LAA cell may be configured as the contention period change reference UEs according to the contention period change method. That is, the UEs with low MCSs may be regarded as victims of interference from neighboring devices so as to be used as the contention period change reference UEs. It may also be possible to configure the UE which transmits the measured channel information to the LAA cell most recently among the UEs transmitting the data reception results or the UE which transmits a signal (e.g. RSSI) predefined separately for conveying the channel condition of the UE as the contention period change reference UE according to the contention period change method. The contention period configuration reference UE may be configured based on one or any combination of the above methods.

The LAA cell may configure the contention period for the second channel sensing operation based on part or all of the data reception results transmitted by the UEs using at least one or any combination of the above method. At this time, the contention period change method is described in association with the application to the channel sensing operation based on the ACK/NACK received from the UEs in association with the second channel sensing operation, but it may also be used to change at least one of the first and third channel sensing operation criteria using the contention period change method or at least one of the criteria. For example, it is determined that it is necessary to change the contention period using the methods to be described hereinafter, it may be possible to change at least one of the first or third channel sensing operation criteria (e g channel sensing reference time) according to a predetermined method or set to other values.

The LAA cell applies a contention period change method to the second channel sensing operation using the contention period configuration reference time and ACK/NACK received from the contention period configuration reference UE as follows.

Method B-1: If at least one NACK is received from the contention period configuration reference UE during the contention period change reference time, then it maintains or changes the contention period applied to the next second channel sensing operation.

Method B-2: Maintain or change the contention period applied to the next second channel sensing operation based on the number or ratio of NACKs (or ACKs) received from the contention period configuration reference UE during the contention period configuration reference time.

With reference to FIG. 5, a description is made of Method B-1 in detail. In the case that the contention period configuration reference time is configured to [n+4 n+8] corresponding to the channel occupancy time 530 as in Method A-1 and all UEs which transmit data reception results in the contention period configuration reference time as the contention period configuration reference UEs, the LAA cell receives the NACK 555 from the UE2 511 during the configured contention period configuration reference time and thus may change (e.g. increase) the contention period. At this time, the contention period may be changed exponentially (i.e., 16→32→64→128, . . . , →1024). That is, the contention period may increase exponentially from the minimum contention period value (or initial value) of 16 to the maximum contention period value of 1024. The exponential increment method is just an example, and it is possible to use a linear increment method or a method of selecting one of the preconfigured contention period candidate values (or a set of values {16, 32, 64, 256, 1024}) sequentially or randomly. If neither ACK nor NACK is received from the contention period configuration reference UEs in the configured contention period configuration reference time, the LAA cell may assume receipt of NACK and increase the contention period. If neither ACK nor NACK is received from the contention period configuration reference UEs in the contention period configuration reference time configured as above, the LAA cell may reuse the previously configured contention period without change or initialize the content period to the initial length. If no ACK is received from the contention period configuration reference UEs in the configured contention period configuration reference time or if all of the received are ACK, the LAA cell may change (e.g. decrease) the contention period. At this time, the contention period may be maintained as a predetermined length or decreased exponentially (e.g., 1024→512→. . . →32→16). At this time, the exponential decrement method is just an example, and it may be possible to use a linear decrement method or a method of selecting one of the preconfigured contention period candidate values (or a set of values {16, 32, 64, 256, 1024}) sequentially or randomly. The aforementioned contention period value denotes the maximum value of the contention period. However, the minimum contention period value may also be configured in the aforementioned method. For example, a description thereof is made under the assumption of the initial contention period configuration period of [1, 16]. If at least one NACK is received from the contention period configuration reference UE during the contention period configuration reference time, the LAA may change the contention period to be applied to the subsequent channel sensing operation to [1, 32]. Alternatively, it may be possible to change the maximum value of the previous contention period with the maximum value of the contention period. In the above example, the contention period may be set to [16, 32]. Changing from the maximum value of the contention period to the minimum value of the contention period is just an example, and it may also be possible to configure the contention period to the minimum value in various ways. For example, it is possible to set the contention period to a fixed minimum value of 0 or 1 which is predefined.

With reference to FIG. 5, a description is made of Method B-2 in detail. If the contention period change threshold of the LAA cell is set to (n+4~n+8) corresponding to the channel occupancy time 530 of the LAA cell and if all UEs which transmit data reception results in the contention period change threshold as the contention period configuration reference UEs, the eNB receives 1 NACK 555 from the UE2 511 during the configured contention period configuration change threshold as shown in FIG. 5. If it is determined that when the number of NACKs is equal to or greater than K (e.g. K=2) or when the percentage of NACKs is equal to or greater than P % (e.g. 10%) the contention period is changed in Method B-2, the contention period may not be changed but be maintained or may be decreased or initialized to the initial length in the example of FIG. 5. If the number or percentage of the NACKs received from the contention period configuration reference UEs during the contention period configuration reference time configured as above is equal to or K or P %, the LAA cell may maintain or increase the contention period. The contention period may be increased exponentially (e.g., 16→32→64→128→ . . . →1024) or decreased exponentially (e.g., 1024→512→ . . . →32→16). The exponential increment and decrement methods are just examples, and it may be possible to use a linear increment or decrement method or a method of selecting one of the preconfigured contention period candidate values (or a set of values {16, 32, 64, 256, 1024}) sequentially or randomly. If neither ACK nor NACK is received from the contention period configuration UEs during the contention period configuration reference time as configured above, the LAA cell may assume the receipt of NACK to increase the contention period or reuse the pre-configured contention period. At this time, the LAA cell may change the contention period even when the condition of Method B-2 is not fulfilled. That is, although the contention period change condition is configured to be fulfilled when the number of NACKs received from the contention period configuration reference UE during the contention period configuration reference time is equal to or greater than 2 in Method B-2, if neither ACK nor NACK is received from the contention period configuration reference UEs during the contention period configuration reference time, the LAA may change the contention period according to the configured threshold or regardless of the configured threshold. Also, if it is configured that when the number or percentage of the received NACKs is equal to or greater than K or P % the contention period is changed in Method B-2, the contention period may be changed according to the number or percentage of the received NACKs. For example, if the percentage of NACKs among the data reception results received from the UEs during the previous data transmission period is P % or if the percentage of the NACKs among the data reception results received during the period starting from the previous channel sensing period start time and ending right before the new channel sensing period start time or starting from the time when generating a random variable (e.g. random backoff number) for the previous channel sensing period and ending right before the time when generating a random variable (e.g., random backoff number of the new channel sensing period operation is P %, the contention period may increase as much as P % from the previous contention period. In more detail, if an exponential increment method (e.g., 16→32→64→128→ . . . →1024) or an exponential decrement method (e.g., 1024→512→ . . . →32→16) is used for the contention period and if the percentage of NACKs among the data reception results received from part or all of the UEs during the period from the previous channel sensing operation start time to the new channel sensing operation start time is 40% (e.g., 4 of 10 A/N values are NACKs) as in Method A-7, it may be possible to increase the contention period for the new channel sensing operation as much as 40% (22.4, 22, or 23) in comparison to the previous channel contention period (e.g., 16). At this time, the increased contention period may be rounded off to an integer. If the percentage of NACKs of the data reception results received from part or all of the UEs during a period the previous channel sensing operation start time to the new channel sensing operation start time is higher than a predetermined threshold value (e.g. 50%), it may be possible to increase the contention period (16→32) regardless of the percentage of NACKs. At this time, if the number of NACKs is equal to or less than (or less than) K or the percentage of the NACKs is equal to or less than (or less than) P % (K and P may be 0), the contention period for the new channel sensing operation is set to the same value as the previous contention period or initialized to the initial length.

As described above, if neither ACK nor NACK is received from the contention period configuration reference UEs during the contention period configuration reference time (DTX) the LAA cell assumes receipt of NACK to increase the contention period according to the contention period determination criteria or reuse the previously configured contention period. A description is mad of the case where the LAA cell receives neither ACK nor NACK from the contention period configuration reference UEs during the configured contention period configuration reference time in more detail hereinafter. The LAA cell performs DL data transmission to the UE in the channel occupancy period, and the UE which receives the data transmits to the LAA cell the data reception result through one of the licensed band or the unlicensed band through which the data have been received or another unlicensed band. Typically, the LAA cell sends the UE a DL control channel (PDCCH) carrying DL data scheduling information for transmitting DL data (PDSCH). The UE checks the scheduling information included in the UL control channel and performs DL data reception operation as scheduled. However, if the UE does not receive the control channel carrying the scheduling information through the DL control channel, it determines that it has not been scheduled by the LAA cell and thus neither perform the DL data reception operation nor transmit any data reception result. Also, it may be possible that the LAA cell has transmitted the scheduling information to the UE through the DL control channel and the UE checks the scheduling information received through the DL control channel and transmits the data reception result to the LAA cell through a licensed band or an unlicensed band but the LAA cell does not receive the data reception result. At this time, if the UE is configured to transmit the data reception result through the licensed band and if the LAA cell receives neither ACK nor NACK from the contention period configuration reference UEs during the contention period configuration reference time (DTX), it may be possible to do not increase the contention period for unlicensed band channel sensing but to maintain the previous contention period or use the initial value. Also, if the LAA cell receives the DTX or NACK/DTX from the contention period configuration reference UEs during the contention period configuration reference time, it determines regards the receipt of the DTX or NACK/DTX as the receipt of NACK or distinguishes between the NACK/DTX and DTX. For example, since LAA cell cannot identify whether the NACK/DTX information is NACK or DTX transmitted by the LAA UE, it interprets the NACK/DTX as NACK and the DTX as not receiving ACK/NACK so as not to be included in determining the contention period. That is, the DTX may be excluded in determining the contention period. For more details on ACK, NACK, NACK/DTX, and DTX configuration and transmission method, see TS36.211, TS36.212, and TS36.213. For example, a UE configured to transmit ACK/NACK information to the LAA with 2 antenna ports and PUCCH format 1b with channel selection can transmit to the LAA cell four types of reception status information of ACK, NACK, DTX, and NACK/DTX. At this time, the LAA cell may interpret the DTX and NACK/DTX information as NACK or distinguish NACK/DTX and DTX among the ACK/NACK status information types. For example, since the LAA cell cannot identify whether the NACK/DTX information is NACK or DTX, it interprets the NACK/DTX as NACK and the DTX as not receiving ACK/NACK so as to be excluded in determining the contention period. At this time, it may be possible to interpret both the NACK/DTX and DTX as not receiving ACK/NACK so as to be excluded in determining the contention period.

If the LAA UE which is configured with the ACK/NACK information transmission scheme for cell 1 and cell 2 with the PUCCH format 1b with channel selection does not receive PDCCH scheduling PDSCH to the cell 1 and cell 2 (DTX) or if the combination of ACK/NACK information for cell 1 and cell 2 includes only DTX or NACK/DTX without ACK and NACK, the LAA cell does not transmit any ACK/NACK information to the LAA cell (not transmission). The LAA UE configured with the PUCCH format 1b with channel selection does not transmit ACK/NACK information, and the LAA cell which has not received the ACK/NACK information from the LAA UE interprets the DTX or NACK/DTX as not receiving ACK/NACK so as not to be included in determining the contention period. At this time, it may be possible to interpret both the DTX and NACK/DTX for the LAA cell as NACK or distinguish between NACK/DTX and DTX. For example, since the LAA cell cannot identify whether the NACK/DTX information is NACK or DTX transmitted by the LAA UE, it interprets the NACK/DTX as NACK and the DTX as not receiving ACK/NACK so as not to be included in determining the contention period. At this time, assuming that cell 1 is a licensed band cell (licensed carrier) and cell 2 as an LAA cell, if the LAA UE configured with the PUCCH format 1b with channel selection determines cell 1 as DTX and cell 2 as NACK/DTX, the LAA UE may transmit no ACK/NACK information to the LAA cell. In this case, the LAA cell cannot identify whether the NACK/DTX information is NACK or DTX for cell 2 of the LAA UE, it interprets the NACK/DTX as NACK so as to be included in determining the contention period.

The contention period may be changed according to the above described criteria and schemes in such a way of using the data reception results received from the contention period configuration reference UEs during the configuration period configuration reference time with the contention period channel threshold set by the LAA cell to determine whether to change the contention period and changing the contention period based on the determination result and contention period change scheme. However, since a new channel sensing operation 630 may be executed before the change of the contention period, there is a need of a contention period configuration method for the channel sensing operation 630 executed before the contention period change time point.

With reference to FIG. 6, the LAA cell 600 may perform the channel sensing operation 610 during the preconfigured contention period to determine whether the channel is occupied, for data transmission to the UE 605. If it is determined that the channel is idle, the LAA cell 600 occupies the channel during the configured channel occupancy period 620 or predetermined or preconfigured maximum channel occupancy period to transmit data to the UE 605. At this time, it is assumed that the contention period change threshold of the LAA cell is configured with Method A-2 using the data reception result corresponding to the data transmitted in the last subframe of 1 ms in the channel occupancy period of the LAA cell, the contention period configuration reference UEs are all UEs which transmit data reception results during the contention period configuration reference time, and the contention period change method is Method B-1. That is, the LAA cell 600 changes the contention period based on the A/N 674 corresponding to the last subframe among the A/N's corresponding to data transmitted during the channel occupancy period 620. However, it may be necessary for the LAA cell 600 to perform the channel sensing operation 630 for additional channel occupancy before the receipt of the A/N 674 corresponding to the channel sensing period 620, i.e. before applying the changed contention period as shown in FIG. 6.

Since the LAA cell 600 may perform the channel sensing operation 630 before the contention period is changed, it is necessary to configure the contention period for the channel sensing operation 630 which is performed before the changed contention period application timing.

The contention period may be configured for the channel sensing operation 630, which is performed before the contention period change timing, as follows.

Method C-1: Reuse contention period configured for previous channel occupancy

Method C-2: Use initial value of contention period

Method C-3: Change according to UE reception performance received before channel sensing operation Method C-4: Use predefined contention period Method C-1 is described hereinafter in more detail. Referring to FIG. 6, the contention period for the channel sensing operation 630 executed before the changed contention period application timing may be configured to be identical with the contention period used for the latest channel sensing operation 610. Alternatively, the contention period for the channel sensing operation 630 which is performed before the changed contention period application timing is configured to use the initial value of the contention period as in Method C-2 or to use a predetermined period as in Method C-4. Alternatively, the contention period may be changed based on the DL data reception result, i.e. the A/N information received from the UEs, before the channel sensing operation 630 which is performed before the changed contention period application timing. For example, it may be possible to change the contention period for the channel sensing operation based on the DL data reception results, or most recent A/N information, received in the duration from time of the previous channel sensing operation 610 to the new channel sensing operation 630. At this time, it may be possible to change the contention period using the DL data reception results from the UE by excluding at least one of the configured contention period change threshold and contention period configuration reference UE.

Method C-3 is described hereinafter in more detail with reference to FIG. 6. The LAA cell 600 operating in the FDD mode may receive the data reception results 670,671,672, and 673 corresponding to the data, which have transmitted to the UE 605 during the channel occupancy period 620, within the period [n+4~n+8]. Although the description is made with a relationship between the data transmission time of the LAA cell and the data reception result transmission time of the UE under the assumption of the LAA cell and LAA UE, it may be possible to apply all of the methods proposed in the above embodiments to the communication between the LAA cell and UEs operating in the TDD mode according to a predefined timing (e.g., HARQ feedback timing defined in TS36.213).

At this time, it may be possible to configure the contention period for the channel sensing operation 630 based on the data reception results received from the UEs till before performing the new channel sensing operation 630 including the previous channel sensing operation 610 as in Method C-3. At this time, if the LAA cell 600 does not receive the data reception result from the UEs in the duration from the start time of the previous channel sensing operation 610 till just before the start time of the new channel sensing operation 630, it may be possible to reuse the contention period configured for the previous channel sensing operation 610, the initial contention period, or a predetermined contention period as the contention period for the new channel sensing operation 630. A description is made of a case where the LAA cell 600 performs the channel sensing operation 630 to occupy the unlicensed band as denoted by reference number 640. The LAA cell 600 receives the data reception results 670, 671, 672, and 673 from the UE 605 in the channel sensing and occupancy periods 630 and 640. If it is necessary to reoccupy the unlicensed band after the channel occupancy period, the LAA cell may perform the new channel sensing operation 650 to reoccupy the unlicensed and. At this time, according to Method C-3, the contention period for the channel sensing operation 650 may be configured based on the data reception results 670, 671, 672, and 673 received in the duration from the start time of the previous channel sensing operation 630 to the start time of the new channel sensing operation 650 or the most recently received data reception result 673. For example, if the data reception result 673 received most recently from the UE in the duration from the start time of the previous channel sensing operation 630 to the start time of the new channel sensing operation 650 is NACK, it may be possible to configure the contention period for the new channel sensing operation 650 by maintaining or increasing the contention period of the previous channel sensing operation exponentially or linearly or selecting one of the preconfigured contention period candidate values assuming that the LAA cell is configured to change or configure the contention period based on the data reception results received most recently from the UE. If the data reception result 673 transmitted by the UE is ACK, it may be possible to configure the contention period by maintaining or decreasing the contention period of the previous channel sensing operation 630 exponentially or linearly or selecting one of the preconfigured contention period candidate values.

It may be possible not to use the previously changed contention period or to perform the channel sensing operation by applying a separately defined contention period. For example, it may be possible to perform the channel sensing operation with another contention period configured for the channel occupancy to transmit a control channel (e.g. (E)PDCCH, Discovery RS, SRS, and CSI-RS as denoted by reference number 685 of FIG. 6) without common data transmission (PDSCH/PUSCH) as denoted by reference numbers 620, 640, and 660 and UE-specific data transmission. For example, in the case of attempting channel occupancy for transmitting a control channel (e.g. (E)PDCCH, Discovery RS, SRS, and CSI-RS as denoted by reference number 685 of FIG. 6) without UE-specific data transmission, it may be possible to use another contention period 680 different from the previously changed contention period. For example, it may be possible to perform the channel sensing operation using the initially configured contention period or the contention period configured separately for transmitting control information (e.g. (E)PDCCH, Discovery RS, SRS, and CSI-RS as denoted by reference number 685 of FIG. 6) without UE-specific data transmission. In the case of transmitting a signal, it may also be possible to perform the channel sensing operation during a fixe contention period or a predefined or preconfigured period to occupy the channel according to the channel sensing operation result. At this time, it may also be possible to occupy the channel to transmit the control information without extra channel sensing operation. It may also be possible to occupy the channel without at least one of the first to third channel sensing operations. It may also be possible to perform the channel sensing operation for transmitting control information (e.g. (E)PDCCH, Discovery RS, SRS, and CSI-RS as denoted by reference number 685 of FIG. 6) without UE-specific data transmission by setting at least one of the first to third channel sensing operation thresholds to the minimum value. If it is necessary to occupy the channel for normal data transmission 695 after the channel occupancy for control channel transmission, the LAA cell 600 may perform the channel sensing operation with the previously configured contention period (e.g., contention period changed through the channel occupancy period 660), the contention period 650 used for channel occupancy for previous data transmission, or the initial contention period.

A description is made of the method for using the unlicensed band for both the UL and DL between the LAA cell and UE hereinafter with reference to FIG. 7. At this time, this method may be applicable to the case of using the unlicensed band for one of UL and DL between the LAA cell and UE.

Referring to FIG. 7, the LAA cell 700 configures the cell 702 operating in the licensed band as a PCell and the cell 705 operating in the unlicensed band as a SCell to communicate with the LAA UEs 710 and 712 on the licensed and unlicensed bands. Although the description is directed to the case of a CA aggregating one licensed band and one unlicensed band, it may also be possible to aggregate one or more licensed bands and one or more unlicensed bands according to the capabilities of the LAA cell and LAA UE and minimum values of the LAA cell and UE capabilities. Although FIG. 7 is directed to the case where the PCell is operating in the TDD mode (UL/DL configuration 1, Table 4.2-2 in TS36.211), this embodiment may also be applicable to the cells operating in the FDD mode or in other TDD configuration modes. The TDD licensed band cell 702 is comprised of the DL subframe 717, UL subframe 720, and special subframe 725. The structure of the special subframe is out of the scope of the disclosure, detailed description thereof is omitted herein. For detailed description of the special subframe 725 of the TDD cell operating in the licensed band, see the LTE standard TS36.211 and TS36.213. In order to use the SCell 705 operating in the unlicensed band, the LAA cell 700 may perform the channel sensing operation 730 and transmit a channel occupancy signal (reservation signal) or initial signal to occupy the channel and/or acquire synchronization of the UE in a predefined data or control signal transmission available period as denoted by reference number 735. Although it is assumed that the data or control signal transmission available time is used as start time point of every subframe (or first OFDM symbol of the subframe) in FIG. 7, the data or control signal transmission available time may be predefined or configured as one or more OFDM symbols including at least the start time of the subframe through higher layer signaling. After performing the channel sensing operation 730 in the unlicensed band, the LAA SCell 705 occupied the unlicensed band may transmit at least one signal such as DL control channel, DL control signal, DL data, and UL control information in the unlicensed band. For example, the LAA SCell 705 may transmit the DL control channel, DL control signal, and DL data to the UE 710 and the unlicensed band UL control information to the UE 710 in the unlicensed band. At this time, the unlicensed band UL control information of the UEs 710 and 712 may be transmitted to the UE through the licensed band LAA PCell 702 or the unlicensed LAA SCell 705 depending on the LAA cell configuration. If the DL data are received from the LAA SCell 705 in the unlicensed band DL subframe 740, the UE 712 transmits the data reception result (e.g. ACK and NACK) to the LAA PCell 702 using the licensed UL resource predefined or configured by received UL control signal as denoted by reference number 790. If the DL data 779 is received from the LAA SCell 705 in the unlicensed band DL subframe 740, the UE 712 may transmit the data reception result (e.g. ACK and NACK) to the LAA SCell 705 using the unlicensed UL resource predefined or configured by a received UL control signal. The UE which has received the unlicensed band UL control information from the LAA PCell 702 or LAA SCell 705 in the DL subframe 740 may perform UL band UL transmission 774 in the UL signal transmission timing (subframe n+4) configured by the LAA PCell 702 or the LAA SCell 705. At this time, the UE 710 may perform unlicensed band channel sensing operation 772 before the unlicensed band UL transmission 774 timing configured by the LAA SCell 705.

The channel sensing operation 772 for the unlicensed band UL transmission of the UE may be different from the channel sensing operation 730 for the unlicensed band DL transmission of the SCell. For example, the channel sensing operation 730 for the unlicensed band DL transmission is performed with the changed contention period or fixed contention period or fixed channel sensing period, and the channel sensing operation 772 for the unlicensed band UL transmission of the LAA UE is performed in such a way of transmitting the unlicensed band UL transmission without extra channel sensing operation. Alternatively, the channel sensing operation for the unlicensed band DL transmission of the LAA SCell is configured to change the contention period, and the channel sensing operation 772 for the unlicensed band UL transmission of the LAA UE may be configured to fix the contention period or to be performed during a fixed channel sensing period (e.g. fixed CCA length or predefined number of (E)CCA slots). Alternatively, although both the channel sensing operation 730 for the unlicensed band DL transmission of the LAA SCell and the channel sensing operation 772 for the unlicensed band UL transmission of the LAA UE are configured to change the contention period, the minimum and maximum values of the contention period for the channel sensing operation 772 for the unlicensed band UL transmission of the LAA UE may be set to values less than the minimum and maximum values of the contention period used in the channel sensing operation 730 for the unlicensed band DL transmission of the SCell.

The channel sensing operation 772 for unlicensed band UL transmission of the UE may differ from the channel sensing operation 730 for unlicensed band DL transmission of the SCell. For example, the channel sensing operation 730 for the unlicensed band DL transmission of the LAA SCell At this time, the LAA cell may notify the UE of the reception result corresponding to the UL data through the DL control channel. That is, if the UL data are received from the UE, the LAA cell may send the UE the data reception result along with the UL scheduling information through the DL control channel. At this time, the UE may determine the data reception result corresponding to the UL data based on at least one of New Data Indicator (NDI), HARQ Process number, and Redundancy Version (RV) carried in the UL scheduling information transmitted by the LAA cell. For example, if the UL data transmitted by the UE is not received correctly, the LAA cell transmits the scheduling information including the NDI bit which is not toggled to be identical with that of the previous UL scheduling information. That is, since the NDI is toggled when new data is transmitted, the UE may determine the UL data reception result at the LAA cell based on the NDI value. If a RV configuration order for retransmission is predefined, the UE may determine the UL data reception result at the LAA cell according to the RV value included in the UL scheduling information. For example, if the current NDI and RV match the NDI and RV carried in the previous scheduling information, it may be possible to determine that the data reception result is NACK. At this time, the UL data reception result determination based on the NDI and RV may be applied to the same HARQ process number.

Also, the channel sensing operation for DL of UL transmissions may be configured depending on the type and mode of the cell configuring (or scheduling) the DL or UL transmission in the unlicensed band. That is, the channel sensing operation schemes of the LAA cell and LAA UE may be determined differently for:

(E-1) the case of configuring or scheduling DL reception and UL transmission in the LAA SCell or unlicensed band cell of the UE using the DL control channel of the LAA PCell or licensed band cell, (E-2) the case of configuring or scheduling the UL transmission in the LAA SCell of the UE using the DL control channel of the LAA PCell and configuring or scheduling DL reception in the LAA SCell of the UE using the DL control channel of the LAA SCell, and (E-3) the case of configuring or scheduling the DL reception and UL transmission in the LAA SCell of the UE using the DL control channel of the LAA SCell.

For example, with reference to FIG. 7, the channel sensing operation scheme for the case of configuring or scheduling UL transmission in the LAA SCell of the LAA UEs 710 and 712 using the DL control channel of the LAA SCell 750, i.e. the case where the cell for scheduling the UL transmission of the UE is identical with the cell for use in UL transmission of the UE, may be configured to be different from the case of configuring or scheduling the UL transmission through the LAA SCell of the LAA UEs 710 and 712 using the DL control channel of the LAA PCell, i.e. the case where the cell for scheduling the UL transmission of the UE is different from the cell for use in UL transmission of the UE. For example, the contention period for channel sensing operation is configured to change for the case of configuring or scheduling the UL transmission through the LAA SCell of the LAA UEs 710 and 712 using the DL control channel of the LAA PCell 702 or to be fixed (e.g. to the minimum contention period), to perform the channel sensing operation with no contention period (e.g. maximum value of the contention period is set to 0 or the channel sensing operation is performed in the fixed CCA period), or to perform UL transmission without extra channel sensing operation for the case of configuring or scheduling the UL transmission through the LAA SCell of the LAA UEs 710 and 712. Alternatively, it may be possible to configure the size of the contention period for the channel sensing operation for the case of configuring or scheduling the UL transmission through the LAA SCell of the LAA UEs 710 and 712 using the DL control channel of the LAA PCell 702 to be different from (less than) the size of the contention period for the channel sensing operation for the case of configuring or scheduling the UL transmission through the LAA SCell of the LAA UEs 710 and 712 using the DL control channel of the LAA SCell 701.

At this time, if the UE needs to perform the channel sensing operation 772 for unlicensed band UL transmission, the LAA SCell 705 may not perform the unlicensed band DL signal or channel transmission during the period of the channel sensing operation 772 for UL transmission of the UE. For example, the LAA SCell 705 may not transmit any DL signal or channel in the unlicensed band for the duration including the period of channel sensing operation 772 for the unlicensed band UL transmission 774. At this time, the period 745 during which the LAA SCell 705 does not transmit any DL signal or channel for unlicensed band channel sensing operation of the UE may be configured to include at least one of channel sensing time of the UE, a period for the UE to transmit a UL signal in advance to compensate for signal transmission/reception delay caused by distance between the LAA cell and the UE (e.g. Timing Advance (TA)), and the time required for the UE to switch from DL reception to UL transmission.

The UE 710 may transmit the UL data or control signal to the LAA cell 700 using the unlicensed UL depending on the result of the unlicensed band channel sensing operation 772 performed before the time of the unlicensed band UL transmission 774 configured by the LAA SCell 705 through the licensed DL 717 or unlicensed DL 740 (and similarly for unlicensed DL 741, 742, and 743). At this time, the time periods 780, 785 and 796 during the UL transmission 774 of the UE 710 (e.g. last SC-OFDM symbol duration of the UL subframe) may be configured not to transmit the UL signal in order for the UE or other UEs or the LAA cells to perform the channel sensing operation correctly. For example, it may be possible to puncture the last SC-OFDMA symbol or transmit the data or control signal using the UL SC-OFDM symbols with the exception of the last SC-OFDM symbol. At this time, the period in which the UL signal is not transmitted may be predefined or configured by the LAA cell through higher layer signaling. In the case that the LAA cell schedules the UE to perform the UL transmission consecutively in one or more UL subframes, e.g. the UE is scheduled to perform UL transmission in the UL subframes 774 and 776, the UE may transmit UL signals without the period 774 having no UL transmission for channel sensing operation in the consecutive UL subframes. That is, the UE configured to transmit consecutive UL subframes may not perform the channel sensing operation in the configured consecutive UL subframes. At this time, although the LAA cell schedules the UE to perform UL transmission consecutively in one or more UL subframes, it may a be possible to transmit the UL data assuming the period in which a UL signal for channel sensing operation is not transmitted. In the case that the UE is scheduled to perform the UL transmission consecutively in one or more UL subframe and configured to transmit the UL signal without the period 774 having no UL transmission for channel sensing operation in the consecutive UL subframes, the UE may apply the period 785 having no UL signal transmission for other UEs with the exception of the corresponding UE or LAA cells to perform the channel sensing operation correctly in the last UL subframe among the consecutive UL subframes. Also, the UE may receive the information on the UL subframes which can be used with extra channel sensing operation or the information on the available time from the LAA cell through a separate licensed or unlicensed signal or may recognize the information according to the predetermined UL use time of the LAA SCell. In this case, the UE may transmit the UL signal with or without applying the period 796 having no UL signal transmission for channel sensing operation in the last UL subframe among the UL subframe which the LAA SCell can use without channel sensing period. In addition, the UE 712 may perform the unlicensed band channel sensing operation 792 before the UL transmission 794, and the UE 712 may transmit the data reception result using the licensed UL resource predefined or configured by the received UL control signal as denoted by reference number 770, as shown in FIG. 7.

The LAA SCell 705 which occupies the unlicensed band during the predefined or configured channel occupancy period after performing channel sensing operation 730 has to perform the channel sensing operation 750 for reoccupying the unlicensed band. At this time, the LAA SCell 705 may configure the contention period required for the channel sensing operation 750 in the method B-1 or B-2 or another method based on the DL signal transmission results which the LAA cell 700 receives from the UE through the licensed or unlicensed or the UL signal transmission result which the LAA cell transmits to the UE through the licensed or unlicensed band in the duration from the start of the previous sensing operation 730 to the start of the channel sensing operation 750.

Method D-1: Change or configure the contention period for the new channel sensing operation 750 of the LAA cell based on both the DL signal transmission results which the LAA cell 700 receives from the UE through the licensed or unlicensed band and the UL signal transmission result which the LAA cell transmits to the UE through the licensed or unlicensed band in the duration from the start of the previous sensing operation 730 to the start of the channel sensing operation 750.

Method D-2: Change or configure the contention period for the new channel sensing operation 750 (shown in FIG. 7) of the LAA cell based on the DL signal transmission result which the LAA cell 700 receives most recently from the UE through the licensed or unlicensed band and the UL signal transmission result which the LAA cell transmits most recently to the UE through the licensed or unlicensed band in the duration from the start of the previous sensing operation 730 to the start of the channel sensing operation 750.

Method D-3: Change or configure the contention period for the new channel sensing operation 750 of the LAA cell based on the most recently received or transmitted one of the DL transmission result which the LAA cell 700 receives from the UE through the licensed or unlicensed band and the UL signal transmission result which the LAA cell transmits most recently to the UE through the licensed or unlicensed band in the duration from the start of the previous sensing operation 730 to the start of the channel sensing operation 750.

Method D-4: Change or configure the contention period for the new channel sensing operation 750 of the LAA cell based on the signal transmission result corresponding to the data carried a specific DL subframe (e.g. first or last DL subframe) of the LAA SCell which the LAA cell 700 receives through the licensed or unlicensed band and the signal transmission result corresponding to the data carried in a specific UL subframe of the UE which the LAA cell transmits through the licensed or licensed band in the duration from the start of the previous sensing operation 730 to the start of the channel sensing operation 750.

Although the channel sensing operation start time has been described under the assumption that the a random value for configuring the channel sensing period necessary for performing the channel sensing operation is selected right before starting the channel sensing operation, if the channel sensing operation start time and the time of selecting the random value in the contention period for the channel sensing period configuration mismatch, Method D-1, D-2, D-3, or D4 may be applied based on the timing of selecting the random value in the contention period for the channel sensing period configuration.

Although the DL and UL channel sensing operations and contention period configuration methods have been described from the viewpoint of the LAA cell for explanation convenience, it may be possible to interpret and apply from the viewpoint of the UE because the time point when the LAA cell transmits the UL signal transmission result to the UE through the licensed or unlicensed band matches the time point when the UE receives the signal. For example, it may be possible to change or configure the contention period for a new channel sensing operation at the UE based on the UL signal transmission result which the UE receives from the LAA cell through the licensed or unlicensed band in the duration from the start of the previous sensing operation 730 to the start of the channel sensing operation 750.

A description is made of the example of using Method D-1 hereinafter with reference to FIG. 7. The LAA SCell 705 may configure the contention period of the channel sensing operation 750 based on both the DL signal transmission result which the LAA cell 700 receives from the UE through the licensed or unlicensed band and the UL signal transmission which the LAA cell transmits to the UE through the licensed or unlicensed band in the duration from the start of the previous sensing operation 730 to the start of the channel sensing operation 750. That is, if the DL signal transmission result which the LAA cell 700 receives from the UE through the licensed or unlicensed band and the UL signal transmission which the LAA cell transmits to the UE through the licensed or unlicensed band in the duration from the start of the previous sensing operation 730 to the start of the channel sensing operation 750 includes at least one NACK, the LAA SCell 705 may increase the contention period for the new channel sensing period 750 so as to be longer than the contention period configured in the previous channel sensing operation 730 or configure or maintain the contention period for the new channel sensing period 750 to be equal to the previously configured contention period. If the DL signal transmission result which the LAA cell 700 receives from the UE through the licensed or unlicensed band and the UL signal transmission which the LAA cell transmits to the UE through the licensed or unlicensed band in the duration from the start of the previous sensing operation 730 to the start of the channel sensing operation 750 includes no NACK, the LAA SCell 705 may configure or maintain the contention period for the new channel sensing period 750 to be equal to the contention period configured in the previous channel sensing operation 730 or decrease the contention period for the new channel sensing period 750 so as to be shorter than the previously configured contention period. At this time, the LAA cell may set the contention period for the new channel sensing period 750 to the value of the initial contention period or a predefined value.

A description is made of the example of using Method D-2 hereinafter with reference to FIG. 7. The LAA SCell 705 may configure the contention period of the channel sensing operation 750 based on the DL signal transmission result which the LAA cell 700 receives most recently from the UE through the licensed or unlicensed band and the UL signal transmission result which the LAA cell transmits most recently to the UE through the licensed or unlicensed band in the duration from the start of the previous sensing operation 730 to the start of the channel sensing operation 750. At this time, if the LAA SCell 705 receives more than one DL signal transmission result or transmits more than one UL signal transmission result to the UE, it may configure the contention period of the channel sensing operation 750 based on all of the transmission results. At this time, it may be possible to configure the contention period of the channel sensing operation 750 based on part of the transmission results carried in a specific DL subframe of a specific UE or LAA SCell (e.g. the first or last DL subframe) or a specific UL subframe of the UE (e.g. the first or last UL subframe). That is, if the DL signal transmission result which the LAA cell 700 receives most recently from the UE through the licensed or unlicensed band and the UL signal transmission which the LAA cell transmits most recently to the UE through the licensed or unlicensed band in the duration from the start of the previous sensing operation 730 to the start of the channel sensing operation 750 includes at least one NACK, the LAA SCell 705 may increase the contention period for the new channel sensing period 750 to be longer than the contention period configured in the channel sensing operation 730 or configure or maintain the contention period to be equal to the previously configured contention period. If the DL signal transmission result which the LAA cell 700 receives most recently from the UE through the licensed or unlicensed band and the UL signal transmission result which the LAA cell transmits most recently to the UE through the licensed or unlicensed band in the duration from the start of the previous sensing operation 730 to the start of the channel sensing operation 750 includes no NACK, the LAA SCell 705 may configure or maintain the contention period for the new channel sensing period 750 to be equal to the contention period configured in the previous channel sensing operation 730 or decrease the contention period for the new channel sensing period 750 to be shorter than the previously configured contention period. At this time, the LAA cell may set the contention period for the new channel sensing period 750 to the value of the initial period or a predetermined value.

A description is made of the example of using Method D-3 hereinafter with reference to FIG. 7. The LAA SCell 705 may configure the contention period of the channel sensing operation 750 based on the most recently received or transmitted one of the DL transmission result which the LAA cell 700 receives from the UE through the licensed or unlicensed band and the UL signal transmission result which the LAA cell transmits most recently to the UE through the licensed or unlicensed band in the duration from the start of the previous sensing operation 730 to the start of the channel sensing operation 750. At this time, if the LAA SCell 705 receives more than one DL signal transmission result from the UE or transmits more than one UL signal transmission result in the same subframe, it may be possible to configured the contention period of the channel sensing operation 750 based on all of the signal transmission results. At this time, it may be possible to configure the contention period of the channel sensing operation 750 based on part of the transmission results carried in a specific DL subframe (e.g. the first or last DL subframe) of the LAA SCell or the transmission results carried in a specific UL subframe (e.g. the first or last UL subframe) of the UE. That is, if the DL signal transmission result which the LAA cell 700 receives most recently from the UE through the licensed or unlicensed band and the UL signal transmission result which the LAA cell transmits most recently to the UE through the licensed or unlicensed band in the duration from the start of the previous sensing operation 730 to the start of the channel sensing operation 750 includes at least one NACK, the LAA SCell 705 may increase the contention period for the new channel sensing period 750 to be longer than the contention period configured in the channel sensing operation 730 or configure or maintain the contention period to be equal to the previously configured contention period. If the DL signal transmission result which the LAA cell 700 receives most recently from the UE through the licensed or unlicensed band and the UL signal transmission result which the LAA cell transmits most recently to the UE through the licensed or unlicensed band in the duration from the start of the previous sensing operation 730 to the start of the channel sensing operation 750 includes no NACK, the LAA SCell 705 may configure or maintain the contention period for the new channel sensing period 750 to be equal to the contention period configured in the previous channel sensing operation 730 or decrease the contention period for the new channel sensing period 750 to be shorter than the previously configured contention period. At this time, the LAA cell may set the contention period for the new channel sensing period 750 to the value of the initial period or a predetermined value.

A description is made of the example of using Method D-4 hereinafter with reference to FIG. 7. The LAA SCell 705 may configure the contention period of the channel sensing operation 750 based on the signal transmission result corresponding to the data carried a specific DL subframe (e.g. first or last DL subframe) of the LAA SCell which the LAA cell 700 receives through the licensed or unlicensed band and the signal transmission result corresponding to the data carried in a specific UL subframe of the UE which the LAA cell transmits through the licensed or licensed band in the duration from the start of the previous sensing operation 730 to the start of the channel sensing operation 750. At this time, if the LAA SCell 705 receives more than one DL signal transmission result from the UE or transmits more than one UL signal transmission result in the same subframe, it may be possible to configure the contention period of the channel sensing operation 750 based on all of the signal transmission results. At this time, it may be possible to configure the contention period of the channel sensing operation 750 based on the transmission result related to a specific UE among all of the transmission results. That is, if the DL signal transmission result which the LAA cell 700 receives from the UE in correspondence to the data carried in a specific DL subframe through the licensed or unlicensed band and the UL signal transmission result which the LAA cell transmits to the UE in correspondence to the data carried in a specific UL subframe through the licensed or unlicensed band in the duration from the start of the previous sensing operation 730 to the start of the channel sensing operation 750 includes at least one NACK, the LAA SCell 705 may increase the contention period for the new channel sensing period 750 to be longer than the contention period configured in the channel sensing operation 730 or configure or maintain the contention period to be equal to the previously configured contention period. If the DL signal transmission result which the LAA cell 700 receives from the UE in correspondence to the data carried in a specific DL subframe through the licensed or unlicensed band and the UL signal transmission result which the LAA cell transmits to the UE in correspondence to the data carried in a specific UL subframe through the licensed or unlicensed band in the duration from the start of the previous sensing operation 730 to the start of the channel sensing operation 750 includes no NACK, the LAA SCell 705 may configure or maintain the contention period for the new channel sensing period 750 to be equal to the contention period configured in the previous channel sensing operation 730 or decrease the contention period for the new channel sensing period 750 to be shorter than the previously configured contention period. At this time, the LAA cell may set the contention period for the new channel sensing period 750 to the value of the initial period or a predetermined value.

If the LAA cell 700 neither receives any DL signal transmission result from the UE nor transmit any UL signal transmission result to the UE through the licensed or unlicensed band in the duration from the end of the previous channel sensing operation 730 to the start of the channel sensing operation 750, the contention period of the channel sensing operation 750 may be configured to maintain or reuse the contention period used for the previous channel sensing operation 730 or set to the initial value or a predefined value of the contention period. The contention period configuration method may change depending on whether the DL signal transmission result or UL signal transmission result is transmitted in the licensed or unlicensed band, if there is neither any DL signal transmission result transmitted by the UE nor UL signal transmission result transmitted by the LAA SCell in the licensed or unlicensed band. In more detail, in the case that the LAA cell 700 is configured to receive the DL signal transmission result of the LAA SCell from the UE in the licensed band and to transmit the UL signal transmission result to the UE in the licensed band in the duration from the end of the channel sensing operation 730 to the start of the channel sensing operation 750, if there is neither the DL signal transmission result received from the UE nor the UL signal transmission result transmitted to the UE, the contention period of the channel sensing operation 750 may be configured to maintain or reuse the contention period used for the previous channel sensing operation 730. In the case that the LAA cell 700 is configured to receive the DL signal transmission result of the LAA SCell from the UE in the licensed band and to transmit the UL signal transmission result to the UE in the unlicensed band in the duration from the end of the channel sensing operation 730 to the start of the channel sensing operation 750, if there is neither the DL signal transmission result received from the UE nor the UL signal transmission result transmitted to the UE, the signal transmission result is regarded as NACK and thus the contention period of the channel sensing operation 750 is configured to be longer than the contention period used for the previous channel sensing operation 730.

If the LAA cell 700 neither receive any DL signal transmission result of the LAA SCell from the UE nor transmit any UL signal transmission result to the UE through the licensed or unlicensed band in the duration from the end of the previous channel sensing operation 730 to the start of the channel sensing operation 750, the contention period of the channel sensing operation 750 may be configured to maintain or reuse the contention period used for the previous channel sensing operation 730 or set to the initial value or a predefined value of the contention period. Also, if there is no data to transmit in the LAA SCell 705 or if the contention period is not changed during a predefined or configured time period, the contention period for the channel sensing operation may be set to the initial value.

Also, the channel sensing operation for UL transmission may be configured differently depending on the type of the cell configuring (or scheduling) the unlicensed band UL transmission. That is, the channel sensing operation for the case of configuring or scheduling the DL reception and/or UL transmission through the LAA SCell 705 (or unlicensed band cell) of the UE using the DL control channel of the LAA PCell 702 (licensed band cell) (i.e. the case where the cell for transmitting the scheduling information for the DL reception and/or UL transmission differs from the cell in which the UE transmits UL data) may differ from the channel sensing operation for the case of configuring or scheduling the DL reception and/or UL transmission through the LAA SCell 705 of the UE using the DL control channel of the LAA SCell 705. Also, the channel sensing operation for the case of configuring or scheduling the DL reception and UL transmission through the LAA SCell 705 of the UE using the DL control channel of the LAA SCell 705 may differ from the channel sensing operation for the case of configuring or scheduling the DL reception through the LAA SCell 705 of the UE but not configuring or scheduling the UL transmission (or configuring or scheduling the UL transmission through the LAA SCell of the UE at the LAA PCell), i.e. the case where the cells configuring or scheduling the DL reception and UL transmission differ from each other. That is, the channel sensing operation of the LAA cell and LAA UE and the contention period change method for the channel sensing operation may be determined differently for:

(F-1) the case of configuring or scheduling DL reception and UL transmission in the LAA SCell or unlicensed band cell of the UE using the DL control channel of the LAA PCell or licensed band cell, (F-2) the case of configuring or scheduling the UL transmission in the LAA SCell of the UE using the DL control channel of the LAA PCell and configuring or scheduling DL reception in the LAA SCell of the UE using the DL control channel of the LAA SCell, and (F-3) the case of configuring or scheduling the DL reception and UL transmission in the LAA SCell of the UE using the DL control channel of the LAA SCell.

For example, the LAA cell and/or LAA UE configured to configure or schedule the DL reception and UL transmission through the LAA SCell 705 of the UE using the DL control channel of the LAA PCell 702 as in (F-1) (typically, referred to as cross-carrier scheduling) and to change the contention periods of all channel sensing operations and may change or configure the contention period for the channel sensing operation of the LAA SCell using at least one of methods D-1, D-2, D-3, and D-4 based on the DL signal transmission results corresponding to the DL transmission of the LAA SCell through the licensed or unlicensed band from the UE, during the period from the start time of the previous channel sensing operation 730 to the start of the channel sensing operation 750, and may change or configure the contention period for the channel sensing operation of the LAA UE using at least one of methods D-1, D-2, D-3, and D-4 based on the UL signal transmission results corresponding to the UL transmission of the UE through the licensed or unlicensed band which is transmitted from the LAA cell to the UE. At this time, it may be possible to change or configure the contention period of the channel sensing operation of the LAA SCell, using at least one of methods D-1, D-2, D-3, and D-4, based on the DL signal transmission results (DL A/N) of the LAA SCell which the LAA cell 700 receives from the UE through the licensed or unlicensed band during the period from the start time of the previous channel sensing operation 730 to the start of the channel sensing operation 750 and the UL signal transmission results (UL A/N) which the LAA cell transmits to the UE through the licensed or unlicensed band.

Alternatively, with reference to FIG. 7, in the case of configuring or scheduling the UL transmission through the LAA SCell 705 of the UE using the DL control channel of the LAA PCell 702 and configuring or scheduling the DL reception through the LAA SCell 705 and LAA SCell 705 of the UE using the DL control channel of the LAA SCell 705 as in (F-2), the LAA cell and/or LAA UE configured to change the contention period for all channel sensing operations may change or configure the contention period for channel sensing operation of the last SCell using at least one of methods D-1, D-2, D-3, and D-4 based on the DL signal transmission results of the LAA SCell which the LAA cell 7000 receives from the UE through the licensed or unlicensed band in the duration from the start of the previous channel sensing operation 730 to the start of the channel sensing operation 750 and may change or configured the contention period for channel sensing operation of the LAA UE using at least one of methods D-1, D-2, D-3, and D-4 based on the UL signal transmission result of the UE which the LAA cell transmits to the UE. At this time, it may be possible to change or configure the contention period for the channel sensing operation of the LAA cell using at least one of methods D-1, D-2, D-3, and D-4 based on the DL signal transmission result (DL A/N) of the LAA SCell which the LAA SCell 700 received from the UE in the licensed or unlicensed band the UL signal transmission result (UL A/N) of the UE which the LAA cell transmits to the UE through in the licensed or unlicensed band in the duration from the start time of the previous channel sensing operation 730 to the start of the channel sensing operation 750.

Alternatively, in the case that the LAA cell is configured to configure or schedule the DL reception and UL transmission through the LAA SCell 705 of the UE using the DL control channel of the LAA SCell 705 as in (F-3) (typically, referred to as self-scheduling), to change the contention period for the channel sensing operation in the LAA cell, and to use no channel sensing operation of the LAA UE, fixed channel sensing period, or fixed contention period, it may be possible to change or configure the contention period for the channel sensing operation of the LAA SCell using at least one of methods D-1, D-2, D-3, and D-4 based on the DL signal transmission result of the LAA SCell which the LAA cell 700 receives from the UE in the licensed or unlicensed band in the duration from the start time of the previous channel sensing operation 730 to the start time of the channel sensing operation 750 or to change or configure the contention period for the channel sensing operation of the LAA SCell using at least one of methods D-1, D-2, D-3, and D-4 based on the DL signal transmission result of the LAA SCell which the LAA cell 700 receives from the UE in the licensed or unlicensed band in the duration from the start time of the previous channel sensing operation 730 to the start time of the channel sensing operation 750. At this time, if it is configured to change the contention period for all channel sensing operations of the LAA cell and LAA UE, it may be possible to change or configure the contention period for the channel sensing operation of the LAA SCell using at least one of methods D-1, D-2, D-3, and D-4 based on the DL signal transmission result of the LAA SCell which the LAA cell 700 receives from the UE in the licensed or unlicensed band in the duration from the start time of the previous channel sensing operation 730 to the start time of the channel sensing operation 750 or to change or configure the contention period for the channel sensing operation of the LAA UE using at least one of method D-1, D-2, D-3, and D-4 based on UL signal transmission result of the UE which the LAA cell transmits to the UE in the licensed or unlicensed band. At this time, it may be possible to change or configure the contention period for the channel sensing operation of the LAA SCell using at least one of methods D-1, D-2, D-3, and D-4 based on the DL signal transmission results (DL A/N) of the LAA SCell which the LAA cell 700 receives from the UE in the licensed or unlicensed band and the UL signal transmission results (UL A/N) of the UE which the LAA cell transmits to the UE in the licensed or unlicensed band, in the duration from the start time of the previous channel sensing operation 730 to the start time of the channel sensing operation 750 shown in FIG. 7.

At this time, the UL signal transmission results of the UE which the LAA cell sends to the UE in the licensed or unlicensed band for use in changing or configuring the contention period for the channel sensing operation of the LAA UE may be only the reception results corresponding to the UL signals transmitted from the UE to the LAA cell.

Also, the LAA cell may configure at least one of the minimum and maximum values of the contention period differently depending on the service quality requirements QoS) of the data to be transmitted in the channel occupancy period. In more detail, in the case of providing a real time service such as VoIP and streaming service of which service quality drops due to the data transmission delay, it may be possible to configure the minimum and maximum values of the contention period so as to minimize the contention period for channel sensing required for data transmission. For example, it may be possible to set the minimum and maximum contention period values for VoIP service to 7 and 15 respectively. In the case of providing an FTP service or HTTP service of which service quality is less influenced by data transmission delay, it may be possible to set the minimum and maximum contention periods to values greater than those for the VoIP service. For example, it may be possible to set the minimum and maximum values of the contention period for the FTP service to 12 and 1023 respectively. At this time, if the data transmitted from the LAA cell to the UE in the channel occupancy period include two or more different QoSs, the contention period for the channel sensing operation of the LAA cell may be configured differently depending on the QoS. That is, if the LAA cell transmits multiple data having different QoSs to multiple UEs in the channel occupancy period, the contention period for the channel occupancy operation of the LAA cell may be configured differently as follows.

Method G-1: Configure contention period according to QoS having the least contention period configuration value among multiple QoSs Method G-2: Configure contention period according to QoS having maximum contention period configuration value among multiple QoSs Method G-3: Configure contention period using contention period configuration values of part or all of multiple QoSs For example, it is assumed that the LAA cell transmit data to two UEs. At this time, UE1 is receiving data for a VoIP service, and UE2 is receiving data for a FTP service. The minimum and maximum contention periods for VoIP service are 7 and 15 respectively, and the minimum and maximum contention periods for the FTP service are 15 and 1023 respectively according to QoS. That is, the maximum and minimum contention periods are determined based on the QoS of the service. In the case of transmitting the data for VoIP and FTP services to UE1 and UE2 during the channel occupancy period of the LAA cell, Method G-1 determines the contention period for the channel sensing operation necessary for the channel occupancy period based on the QoS having the least contention period configuration values among the contentions period configuration values for the VoIP and FTP services (e g minimum and maximum contention period values of 7 and 15). That is, the contention period may be configured with the minimum contention period value of 7 and maximum contention period value of 15. Method G-2 determines the contention period for the channel sensing operation necessary for the channel sensing period based on the QoS having the greatest contention period configuration value among the contention period configuration values for the VoIP and FTP services (e g minimum and maxim contention periods of 15 and 1023). That is, the contention period may be configured with the minimum contention period value of 15 and maximum contention period value of 1023. Method G-3 determines the contention period by averaging the contention period configuration values for the VoIP and FTP services. That is, it may be possible to determine the contention period for the channel sensing operation necessary for the channel occupancy period based on the contention period configuration values for the VoIP and FTP services, e.g. values of (11, 519) obtained by averaging the minimum contention period value (7, 15) and the maximum contention period value (15, 1023).

At this time, the QoS of the data transmitted in the previous channel occupancy period and the QoS of the data to be transmitted in the new channel occupancy period may differ from each other. At this time, it may be possible to configure the contention period for the channel sensing operation performed to occupy the channel newly based on the QoS of the data to be transmitted in the new channel occupancy period. At this time, the contention period for the new channel sensing operation may be configured differently depending on the data reception results transmitted in the previous channel occupancy period. A description is made thereof with reference to FIG. 5. It is assumed that the FTP service data are transmitted to UE1 and UE2 in the previous channel occupancy period 530 (shown in FIG. 5). At this time, if the contention period for the case of performing the channel sensing operation 520 for the channel occupancy period 530 is configured according to Method G-1 among Methods G-1, G-2, and G-3, the minimum and maximum values of the contention period may be set to 15 and 1023 respectively. If the contention period for the channel sensing operation 520 is set to the minimum value of the contention period, the LAA cell 505 selects a random value in the contention period [0, 15] or [1, 15] and senses the channel during the channel sensing operation period corresponding to the selected value. In the case that the LAA cell transmits data to UE1 and UE2 in the channel occupancy period 530 and then wants to occupy the channel again during the channel occupancy period 535, the LAA cell has to perform the channel sensing operation 540. However, if the VoIP service data are transmitted to the UE3 and UE4 in the channel occupancy period 535, the contention period for the channel sensing operation 540 may be configured with the minimum value of 7 and the maximum value of 15 according to Method G-1. That is, the LAA cell 505 selects a random value in the contention period [0, 7] or [1, 7] and senses the channel during the channel sensing operation period. In the case of using Method A-7, if there is a NACK among the data reception results received from the UEs in the duration from the previous channel sensing period 520 to the new channel sensing period 540 or the mostly recently received data reception result is NACK, the new channel contention period 540 may increase according to Method B-1 or B-2. That is, if the new channel contention period is configured with the exponential increment scheme, it has to increase [0, 15] or [1, 15] to [1, 15] or [0, 31]. In the case of transmitting data having different QoSs, however, the contention period configuration value may vary according to QoS of the data to be transmitted in the new channel occupancy period and the contention period configuration method (e.g. contention period is configured as [0, 7] or [1, 7] with Method G-1) but the number of contention period increments may be maintained. That is, if the VoIP service data are transmitted in the new channel occupancy period, the contention period for the new channel sensing operation may be configured according to the channel sensing period configuration for the VoIP service. In the case of using Method A-7, however, if there is a NACK among the data reception results received from the UEs in the duration from the previous channel sensing period 520 till right before the new channel sensing period 540 or the most recently received data reception result is NACK, the new channel contention period 540 should be increased and thus the contention period for the new channel sensing operation increases from [0, 7] or [1, 7] to [0, 15] or [1, 15]. That is, the contention period for the channel sensing operation may be configured differently depending on QoS, but the number of contention period increments may be configured regardless of QoS. For example, if the contention period is increased from [0, 15] to [0, 31] and then to [0, 63], the number of contention period increments is 2. If the contention period is initialized from [0, 63] to the initial value, the number of contention period increments is 0. That is, in the case that there is a NACK among the data reception results received from the UEs in the duration from the previous channel sensing period 520 till right before the new channel sensing period 540 or the most recently received data reception result is NACK, if it is necessary to increase the contention period according to Method B-1 or B-2, it may be possible to configure the new channel contention period 540 by applying the number of contention period increments which is increase by 1 in comparison to the number of previous contention period increments. That is, if the number of contention period increments in the previous channel sensing period 520 is 2, if there is a NACK among the data reception results received from the UEs in the duration from the previous channel sensing period 520 till right before the new channel sensing period 540 or the most recently received data reception result is NACK, and if it is necessary to increase the contention period according to Method B-1 or B-2, it may be possible to configure the new channel contention period 540 by applying the number of contention period increments of 3. That is, the contention period becomes [0, 127].

Referring to FIG. 8, a description is made of the contention period configuration method of an eNB for channel sensing operation according to embodiments 1, 2, and 3 of the present disclosure. Specific time configured based on whole or part of the A/N transmission period of the UE in a channel occupancy period is configured as the contention period configuration reference time. It may also be possible to configure at least one of the DL signal transmission result of the LAA SCell which the LAA cell receives from the UE and the UL signal transmission result of the UE which the LAA cell transmits to the UE in the licensed or unlicensed between channel sensing operations of the LAA SCell as the contention period determination criterion. At this time, the contention period configuration criteria may be predefined.

The eNB configures the contention period configuration criteria at operation 801. The eNB configures a contention period configuration reference UE at operation 802. It may be possible to configure all or part of the UEs transmitting or receiving A/N as the contention period configuration reference UEs. The eNB configures the contention period change scheme at operation 803. That is, the eNB may determine whether to change the contention period exponentially or linearly or based on a predetermined value at operation 803. The eNB receives the reception result corresponding to the DL data at operation 804, transmits the reception result corresponding to the UL data at operation 805. At operation 806, the eNB determines whether to change the contention period based on the contention period change scheme configured through steps 801, 802, and 803 and the signal transmission results received at operation 804 and transmitted at operation 805. If it is determined that there is no need to increase the contention period, the eNB may decrease or maintain the contention period or initialize the convention period to the initial value at operation 808 according to the contention period decrement scheme configured at operation 803. If it is determined that there is a need to increase the contention period at operation 806, the eNB may increase or maintain the contention period at operation 807 according to the contention period increment scheme configured at operation 803.

Figure 9:
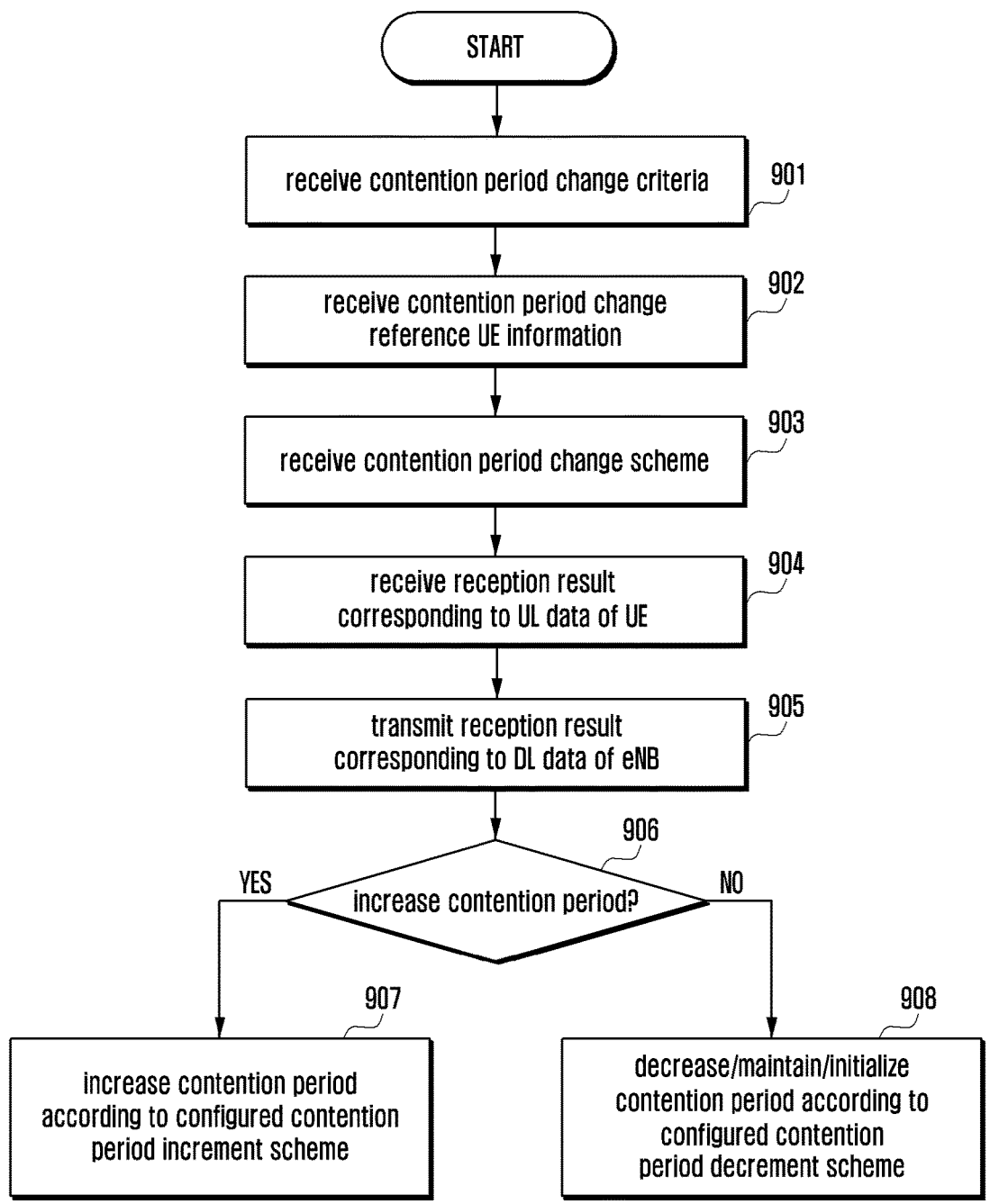
FIG. 9 is a flowchart illustrating a contention period configuration method of a user equipment (UE) for channel sensing operation according to various embodiments of the present disclosure.

FIG. 9 is a flowchart illustrating a contention period configuration method of a UE for channel sensing operation according to various embodiments of the present disclosure.

Referring to FIG. 9, a description is made of the contention period configuration method of a UE for channel sensing operation according to embodiments 1, 2, and 3 of the present disclosure with reference to FIG. 9. The UE receives the contention period configuration criteria configured by the eNB at operation 901. Specific time configured based on whole or part of the A/N transmission period of the UE in a channel occupancy period is configured as the contention period configuration reference time. It may also be possible to receive at least one of the DL signal transmission result of the LAA SCell which the LAA cell receives from the UE and the UL signal transmission result of the UE which the LAA cell transmits to the UE in the licensed or unlicensed band between channel sensing operations of the LAA SCell as the contention period determination criterion. At this time, the contention period configuration criteria may be predefined.

The UE receives the configuration about the contention period configuration reference UE at operation 902. The UE may configure all or part of the UEs transmitting or receiving A/N as contention period configuration reference UE. The UE receives the contention period change scheme at operation 903. That is, it may be possible to change the contention period based on the number or percentage of the ACK/NACKs among the signal transmission results received at operation 904 and transmitted at operation 905 according to the contention period configuration criteria received at operation 901 and the contention period configuration reference UE information received at operation 902. It may also be possible to change the contention period exponentially or linearly or based on a predetermined value according to the contention period change scheme received at operation 903. At this time, operations 901, 902, and 903 may be preconfigured. The UE determines whether to change the contention period based on the contention period change scheme received through operations 801, 802, and 803 and the signal transmission results received at operation 904 and transmitted at operation 905. If it is determined that there is no need to increase the contention period at operation 906, the UE may decrease or maintain the contention period or initialize the convention period to the initial value at operation 908 according to the contention period decrement scheme configured at operation 903. If it is determined that there is a need to increase the contention period at operation 906, the UE may increase the contention period or maintain the previous contention period at operation 907 according to the contention period increment scheme configured at operation 906.

Figure 10:
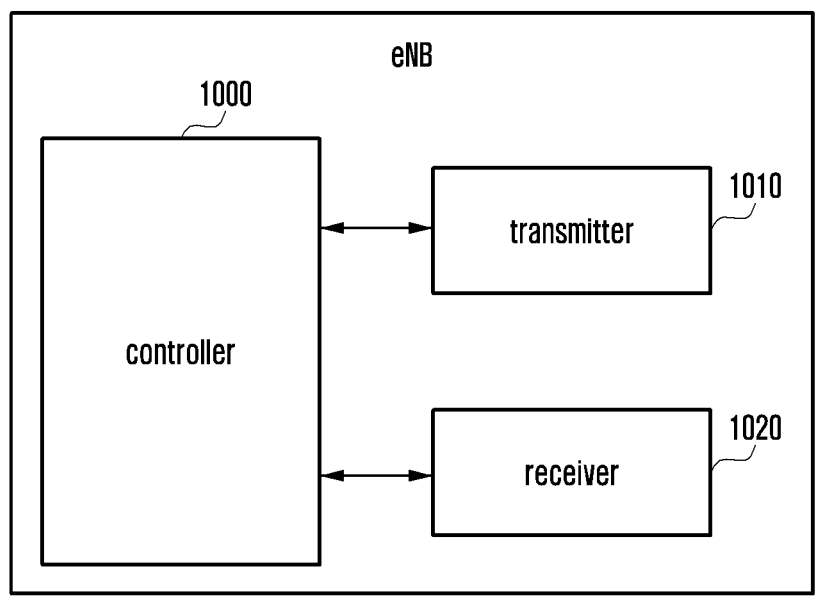
FIG. 10 is a diagram illustrating an eNB apparatus according to various embodiments of the present disclosure.

FIG. 10 is a diagram illustrating a configuration of the eNB for configuring the contention period for channel occupancy operation of the UE using the unlicensed band according to various embodiments of the present disclosure (particularly embodiments 1, 2, and 3). The UE may increase or maintain the contention period at operation 907 according to the contention period increment scheme configured at operation 903.

The receiver 1020 of the eNB receives signals from other eNBs or UEs, measures channels from the other eNBs and UEs, and senses an unlicensed band channel based on the channel measurement operation configuration values configured by the controller 1000. The controller 1000 determines whether the unlicensed band is idle based on the information of the unlicensed band sensed by the receiver 1020. If it is determined that the unlicensed band is idle, the controller 1000 of the eNB may transmit a signal for channel occupancy and control and data channel information to a specific UE by means of the transmitter 1010. If it is determined that the unlicensed band is not idle, the controller 1000 controls the receiver 1020 to continue the channel sensing operation.

The controller 1000 may control configuring control channels such as PDCCH/EPDCCH and various reference signal transmission parameters, scheduling PDSCH/EPDSCH, and sets parameters and variables for use in channel sensing operation such as contention period. The controller may transmit the parameters necessary for communication between the eNB and the UE to the UE by means of the transmitter.

Meanwhile, the controller 1000 may control the receiver 1020 to receive feedback corresponding to the data transmitted in the first subframe arriving first after the sensing period in the unlicensed band from at least one UE.

The controller 1000 may assume the data reception state of the at least one UE as one of ACK, NACK, and Discontinuous Transmission (DTX) based on the feedback. The controller 1000 may also determine the length of the second sensing period based on the assumed data reception state of the UE.

The controller 1000 may transmit to the UE a control message for configuring the PUCCH format 1b. The controller 1000 may also control the receiver 1020 to receive the feedback predetermined in accordance with the data reception state from the UE.

The controller 1000 may also check the state predetermined in association with no receipt of the feedback when no feedback is received from the UE. If the feedback state is NACK/DTX, the controller 1000 may assume the UE's data reception state as NACK.

If it is assumed that the data reception state is DTX, the controller 1000 may not use the UE's data reception assumed as DTX in determining the length of the second sensing period.

In the case that the PUCCH format 1b is not configured to the UE, if it is assumed that the UE's data reception state is DTX, the controller 100 may interpret the DTX as NACK or may not use the DTX in determining the length of the second sensing period.

The DTX may mean that the feedback corresponding to the transmitted data is not received from the at least one UE.

The controller 100 may determine the ratio of NACK to all data reception states of the at least one UE and, if the ratio of the NACK to all data reception states is greater than a predetermined threshold, increase the range of the contention window (CW) value. The controller 1000 may determine the length of the second sensing period using a CW value in the range of the increased CW value range.

The transmitter 1010 and the receiver 1020 of the eNB may be implemented as a single component rather than two separate components.

Figure 11:
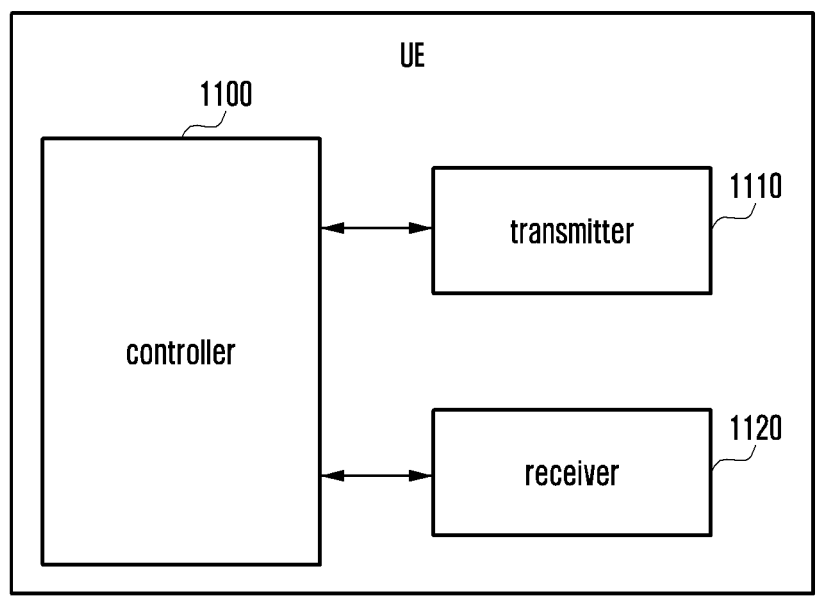
FIG. 11 is a diagram illustrating a UE apparatus according to various embodiments of the present disclosure.

FIG. 11 is a diagram illustrating a configuration of a UE considering channel occupancy state determination of the eNB operating on the unlicensed band according to various embodiments 1, 2, and 3 of the present disclosure (particularly embodiments 1, 2, and 3).

Referring to FIG. 11, the controller 1100 of the UE receives the eNB-UE configuration information for use in receiving signals from the eNB using the licensed band and unlicensed band and operates on the unlicensed band based on the received configuration value. The controller 1100 may acquire the unlicensed band state information based on at least one of the configuration value for use in determining whether the eNB can schedule data in the subframe in which configured channel sensing operation is performed and the unlicensed band state information which the eNB transmits to the UE on the licensed or unlicensed band. The controller 1100 also determines reception result of the data signal from the eNB and transmits the data reception result to the eNB by means of the transmitter 1110.

The controller 1100 may check the PDSCH/EPDSCH scheduling information based on the control information received by the receiver 1120. The controller 1100 receives the PDSCH/EPDSCH by means of the receiver and decodes the PDSCH/EPDSCH by means of a decoder.

The transmitter 1110 and the receiver 1120 of the UE may be implemented as a single component rather than two separate components.

Figure 12:
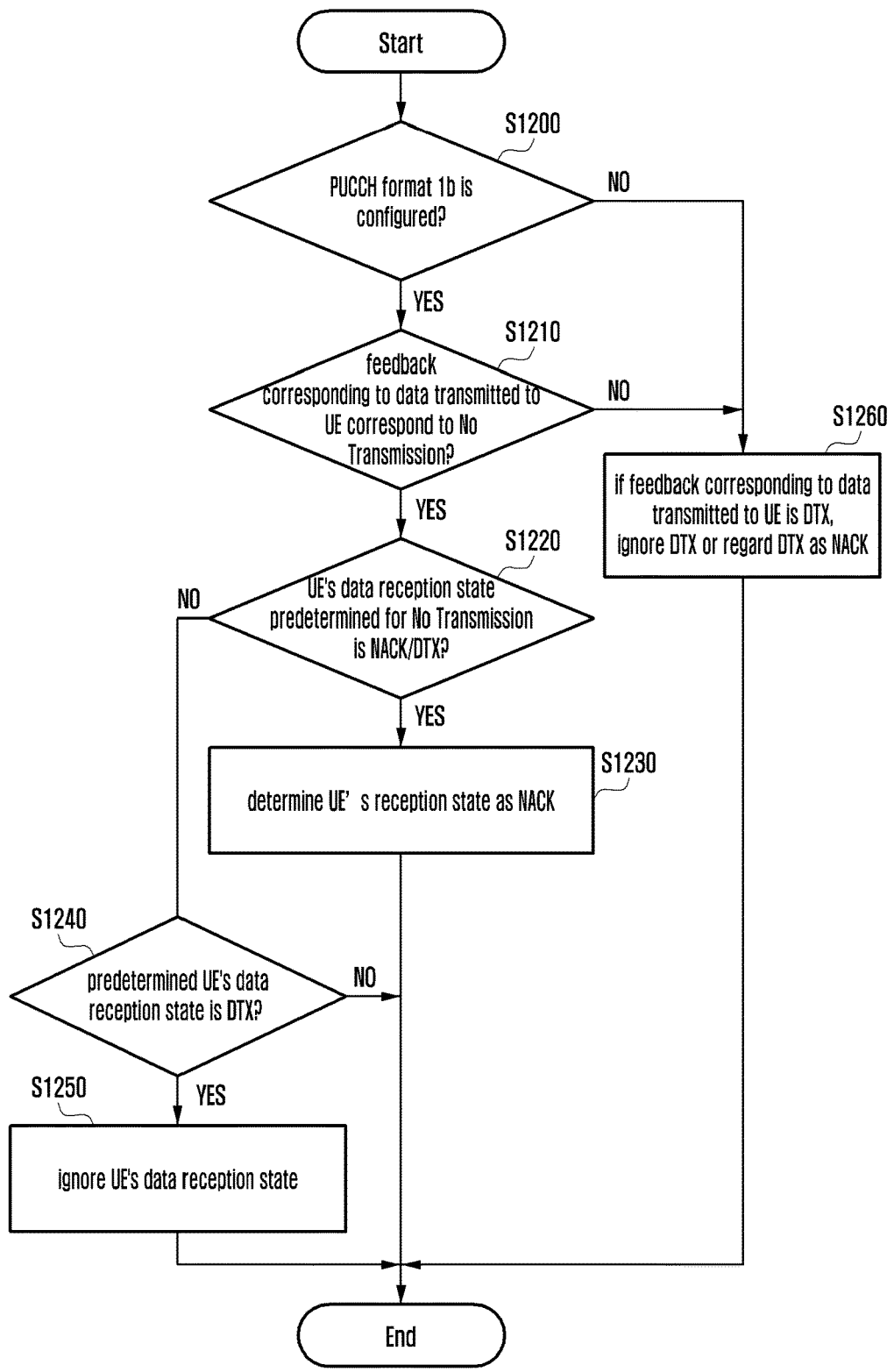
FIG. 12 is a flowchart illustrating a method of an eNB according to various embodiments of the present disclosure.

FIG. 12 is a flowchart illustrating a method of an eNB according to various embodiments of the present disclosure. Referring to FIG. 12, the eNB may configure a physical uplink control channel (PUCCH) format 1b to a UE. For example, the eNB may send the UE a control message for configuring PUCCH format 1b.

Referring to FIG. 12, if it is determined that the PUCCH format 1b is configured at operation S1200, the eNB may determine whether the feedback corresponding to the data transmitted to the UE is indicative of "No Transmission" at operation S1210.

For example, the data reception state of the UE may be predetermined according to the resource position of the feedback signal transmitted by the UE based on the PUCCH format 1b. In detail, if the feedback signal is received from the UE at a predetermined resource position, the eNB may assume that the UE's data reception state indicated by the feedback signal is ACK for cell 1 and NACK/DTX for cell 2.

If no feedback signal is received from the UE at the predetermined resource position, the eNB may assume that the UE's data reception state indicated by the feedback signal is DTX for cell 1 and NACK/DTX for cell 2.

It is determined that the feedback corresponding to the data transmitted to the UE is indicative of "No Transmission", the eNB may determine whether the UE's data reception state which corresponds to the "No Transmission" is NACK/DTX at operation S1220.

If the UE's data reception state predetermined for "No Transmission" is NACK/DTX, the eNB assumes the UE's data reception state is NACK at operation S1230. For example, the eNB may check whether the ratio of the NACK to all feedbacks is equal to or greater than P % to determine the length of the next LBT. Accordingly, the eNB may reflect the reception state determined as NACK by eNB to check the ratio of NACKs.

If the UE's data reception state predetermined for "No Transmission" is NACK/DTX, the eNB may determine whether the predetermined UE's data reception state is DTX at operation S1240.

If the predetermined data reception state of the UE is DTX, the eNB may ignore the UE's data reception state at operation S1250. As described above, the eNB may check whether the ratio of the NACKs to all feedbacks received from the UEs is equal to or greater than P % to determine the length of the next LBT. At this time, in the case of ignoring the UE's data reception state, the eNB may not reflect the ignored data reception state to the total feedbacks. In detail, the eNB may exclude the number of ignored feedbacks from the total number of received feedbacks.

If it is determined that the PUCCH format 1b is configured to the UE at operation S1200 and that the feedback corresponding to the data transmitted to the UE is not "No transmission" but DTX at operation 1210, or if it is determined that the feedback corresponding to the data transmitted to the UE is DTX, the eNB may ignore the DTX or regards the DTX as NACK at operation S1260.

The description is directed to the case where the first one of two cells is a cell operating on a licensed carrier and the second one is a cell operating on an LAA carrier. At this time, the eNB may transmit the scheduling information for the second cell through the first cell. Transmitting the scheduling information for one cell through another cell in this way is referred to as cross carrier scheduling. In the cross carrier scheduling mode, if the feedback corresponding to the data transmitted to the UE is DTX, the eNB may ignore the DTX.

In the case of self-carrier scheduling mode in which the scheduling information for the first cell is transmitted through the first cell and the scheduling information for the second cell is transmitted through the second cell, if the feedback corresponding to the data transmitted to the UE is DTX, the eNB may assume the data reception state of the UE as NACK.

However, ignoring the DTX feedback or assuming the DTX feedback as NACK received from the UE according to whether the scheduling mode is the cross carrier scheduling or self-carrier scheduling is just an example. For example, the eNB may ignore the DTX feedback or assume the DTX feedback as NACK according to the configuration between the eNB and the UE even in the same scheduling method.

As described above, the present disclosure is advantageous in terms of improving coexistence performance of the devices sharing an unlicensed band by performing the channel occupancy operation efficiently and configuring the channel occupancy operation criteria unambiguously.

According to various embodiments of the present disclosure, the method of the eNB may be stored in a non-transitory readable medium after being coded in software. The non-transitory readable medium may be installed for use in various devices.

The non-transitory readable medium is a medium capable of storing data semi-persistently, unlike a medium storing data temporarily such as a register and a cache memory, and readable by devices. Examples of the non-transitory readable medium include compact disc (CD), digital versatile disc (DVD), hard disc, Blu-ray disc, universal serial bus (USB), memory card, and read only memory (ROM).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for a wireless communication using an unlicensed band, the method comprising:
   transmitting, from a base station, data to at least one user equipment (UE) using the unlicensed band;
   identifying responses for the data from the at least one UE, each response indicating at least one state of receiving the data of the at least one user equipment;
   identifying a ratio of a negative acknowledgement (NACK) state to states indicated by the responses; and
   determining a contention period for a channel sensing operation based on the ratio of the NACK state,
   wherein the identifying of the ratio of the NACK state comprises as a result of a channel selection being configured and no response being identified, determining a NACK or discontinuous transmission (DTX) state corresponding the no response as the NACK state and a DTX state corresponding the no response being ignored from the identifying the ratio of the NACK state.

2. The method of claim 1, wherein in a result of the ratio of the NACK state being equal to or greater than a threshold value, the contention period increases exponentially.

3. The method of claim 1, wherein in a result of the ratio of the NACK state being smaller than a threshold value, the contention period is initialized to an initial value.

4. The method of claim 1, wherein the responses correspond to a first data transmission timing within a data transmission.

5. The method of claim 1, wherein the identifying of the ratio of the NACK state comprises:
   determining a DTX state as the NACK state; and
   determining a NACK or DTX state as the NACK state.

6. The method of claim 1, further comprising:
   performing the channel sensing operation based on a random variable N which is selected from the determined contention period.

7. A base station for a wireless communication using an unlicensed band, the base station comprising:
   a transceiver to transmit and receive signals to and from at least one user equipment (UE); and
   a controller coupled with the transceiver and configured to:
   control to transmit data to the at least one UE using the unlicensed band,
   identify responses for the data from the at least one UE, each responses indicating at least one state of receiving the data of the at least one user equipment,
   identify a ratio of a negative acknowledgement (NACK) state to states indicated by the responses, and
   determine a contention period for a channel sensing operation based on the ratio of the NACK state,
   wherein as a result of a channel selection being configured and no response being identified, the controller is further configured to determine a NACK or discontinuous transmission (DTX) state corresponding the no response as the NACK state and a DTX state corresponding the no response being ignored from the identifying the ratio of the NACK state.

8. The base station of claim 7, wherein if the ratio of the NACK state is equal to or greater than a threshold value, the contention period increases exponentially.

9. The base station of claim 7, wherein if the ratio of the NACK state is smaller than a threshold value, the contention period is initialized to an initial value.

10. The base station of claim 7, wherein the responses correspond to a first data transmission timing within a data transmission.

11. The base station of claim 7, wherein the controller is further configured to determine a DTX state as the NACK state and determine a NACK or DTX state as the NACK state.

12. The base station of claim 7, wherein the controller is further configured to perform the channel sensing operation based on a random variable N which is selected from the determined contention period.

* * * * *